US012225203B2

(12) United States Patent
Chen et al.

(10) Patent No.: US 12,225,203 B2
(45) Date of Patent: *Feb. 11, 2025

(54) MOTION VECTOR OBTAINING METHOD AND APPARATUS, COMPUTER DEVICE, AND STORAGE MEDIUM

(71) Applicant: HUAWEI TECHNOLOGIES CO., LTD., Guangdong (CN)

(72) Inventors: Xu Chen, Shenzhen (CN); Jianhua Zheng, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/066,578

(22) Filed: Dec. 15, 2022

(65) Prior Publication Data

US 2023/0123840 A1    Apr. 20, 2023

Related U.S. Application Data

(63) Continuation of application No. 17/190,041, filed on Mar. 2, 2021, now Pat. No. 11,563,949, which is a
(Continued)

(30) Foreign Application Priority Data

Sep. 3, 2018    (CN) .......................... 201811020181.9
Oct. 29, 2018    (CN) .......................... 201811271726.3

(51) Int. Cl.
*H04N 11/02*    (2006.01)
*H04N 19/139*   (2014.01)
(Continued)

(52) U.S. Cl.
CPC ......... *H04N 19/139* (2014.11); *H04N 19/147* (2014.11); *H04N 19/176* (2014.11)

(58) Field of Classification Search
CPC .................................................... H04N 19/139
(Continued)

(56) References Cited

U.S. PATENT DOCUMENTS 5,748,248 A * 5/1998 Parke .................. H04N 5/145
375/E7.102
2005/0226332 A1 10/2005 Uetani
(Continued)

FOREIGN PATENT DOCUMENTS

CN        1780402 A      5/2006
CN      102263947 A     11/2011
(Continued)

OTHER PUBLICATIONS

ITU-T H.265(Feb. 2018), Series H: Audiovisual and Multimedia Systems Infrastructure of audiovisual services-Coding of moving video High efficiency video coding, total 692 pages.
(Continued)

*Primary Examiner* — Leron Beck
(74) *Attorney, Agent, or Firm* — WOMBLE BOND DICKINSON (US) LLP

(57) ABSTRACT

This application discloses a motion vector obtaining method and apparatus, a computer device, and a storage medium. In the method, an initial motion vector of a to-be-processed picture block is determined by using a location relationship between a reference block and the to-be-processed picture block. When the reference block and the to-be-processed picture block are located in a same coding tree block, a decoder uses an initial motion vector of the reference block as the initial motion vector of the to-be-processed picture block. When the reference block and the to-be-processed picture block are located in different coding tree blocks, the
(Continued)

decoder uses a final motion vector of the reference block as the initial motion vector of the to-be-processed picture block.

18 Claims, 26 Drawing Sheets

Related U.S. Application Data continuation of application No. PCT/CN2019/091308, filed on Jun. 14, 2019.

(51) Int. Cl.
*H04N 19/147* (2014.01)
*H04N 19/176* (2014.01)

(58) Field of Classification Search
USPC ........................................ 375/240.01–240.29
See application file for complete search history.

(56) References Cited

U.S. PATENT DOCUMENTS

| | | | |
|---|---|---|---|
| 2009/0225845 A1* | 9/2009 | Veremeev | G06T 7/223 375/240.16 |
| 2011/0176611 A1* | 7/2011 | Huang | H04N 19/46 375/E7.123 |
| 2014/0270538 A1 | 9/2014 | Matsumura | |
| 2016/0127741 A1* | 5/2016 | Possos | H04N 19/96 375/240.16 |
| 2016/0173900 A1* | 6/2016 | Lee | H04N 19/109 375/240.08 |
| 2017/0244981 A1 | 8/2017 | Chen et al. | |
| 2017/0289570 A1 | 10/2017 | Zhou et al. | |
| 2018/0041769 A1 | 2/2018 | Chuang et al. | |
| 2020/0084441 A1* | 3/2020 | Lee | H04N 19/105 |
| 2020/0260111 A1* | 8/2020 | Liu | H04N 19/527 |
| 2021/0014522 A1* | 1/2021 | Jung | H04N 19/513 |
| 2022/0086483 A1* | 3/2022 | Zheng | H04N 19/176 |

FOREIGN PATENT DOCUMENTS

| | | |
|---|---|---|
| CN | 103188496 A | 7/2013 |
| CN | 103238319 A | 8/2013 |
| CN | 103338372 A | 10/2013 |
| CN | 103561263 A | 2/2014 |
| CN | 103841425 A | 6/2014 |
| CN | 104811729 A | 7/2015 |
| CN | 104918047 A | 9/2015 |
| CN | 108076347 A | 5/2018 |
| KR | 20180061060 A | 6/2018 |
| WO | 2018097693 A2 | 5/2018 |
| WO | 2020009898 A1 | 1/2020 |

OTHER PUBLICATIONS

Jianle Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11,7th Meeting: Torino, IT, 13 Jul. 21, 2017,Document: JVET-G1001-v1, total:51pages.

Xu Chen et al., "Decoder-Side Motion Vector Refinement Based on Bilateral Template Matching",Joint Video Exploration Team (JVET) of ITU-T SG 16 WP 3 and ISO/IEC JTC 1/SC 29/WG 11,4th Meeting: Chengdu, CN, 15 Oct. 21, 2016, Document: JVET-D0029,total:4pages.

Xu Chen et al., "CE9: DMVR extension based on template matching (Test 9.3.6)",oint Video Exploration Team (JVET) of ITU-T SG 16 WP 3 and ISO/IEC JTC 1/SC 29/WG 11, 11th Meeting: Ljubljana, SI, 10 Jul. 18, 2018, JVET-K0200, total:4pages.

Semih Esenlik et al., "CE9: DMVR with Bilateral Matching (Test2.9)",oint Video Experts Team (JVET) of ITU-T SG 16 WP 3 and ISO/IEC JTC 1/SC 29/WG 11, 11th Meeting: Ljubljana, SI, 10 Jul. 18, 2018, JVET-K0217_v1,total:5pages.

Xiaoyu Xiu et al., "CE9-related: Decoding Addressing the decoding latency improvement issue for decoder-side motion vector refinement (DMVR)",oint Video Experts Team (JVET) of ITU-T SG 16 WP 3 and ISO/IEC JTC 1/SC 29/WG 11, 11th Meeting: Ljubljana, SI, 10 Jul. 18, 2018, JVET-K0347-v1v2, total:5pages.

Zhang Shuhua et al., A Multi-Reference Frames Fast Selection Algorithm for H. 264, Acta Electronica Sinica, Jan. 2019, with an English abstract total 5 pages.

\* cited by examiner

Original merge candidate predicted motion vector list

| Merge_idx | L0 | L1 |
|---|---|---|
| 0 | mvL0_A, ref0 | - |
| 1 | - | mvL1_B, ref0 |
| 2 | mvL0_A, ref0 | mvL1_B, ref0 |
| 3 | - | - |
| 4 | - | - |

Add a zero motion vector

Candidate predicted motion vector list to which the "zero" motion vector is added

| Merge_idx | L0 | L1 |
|---|---|---|
| 0 | mvL0_A, ref0 | - |
| 1 | - | mvL1_B, ref0 |
| 2 | mvL0_A, ref0 | mvL1_B, ref0 |
| 3 | (0, 0), ref0 | (0, 0), ref0 |
| 4 | (0, 0), ref1 | (0, 0), ref1 |

MOTION VECTOR OBTAINING METHOD AND APPARATUS, COMPUTER DEVICE, AND STORAGE MEDIUM

CROSS-REFERENCE TO RELATED APPLICATIONS

This application is a continuation of U.S. patent application Ser. No. 17/190,041, filed on Mar. 2, 2021, which is a continuation of International Application No. PCT/CN2019/091308, filed on Jun. 14, 2019, which claims priority to Chinese Patent Application No. 201811020181.9, filed on Sep. 3, 2018 and Chinese Patent Application No. 201811271726.3, filed on Oct. 29, 2018. All of the aforementioned patent applications are hereby incorporated by reference in their entireties.

TECHNICAL FIELD

This application relates to the field of video compression technologies, and in particular, to a motion vector obtaining method and apparatus, a computer device, and a storage medium.

BACKGROUND

In daily life, video-related applications are increasingly popular. With maturity of computer technologies, video processing technologies have also developed greatly. Video coding technologies have developed prominently. When a coding unit in a frame of picture is encoded, redundancy may be removed as much as possible by using correlation between the coding unit and a prediction unit. During decoding, information obtained after the redundancy is removed is decoded to obtain picture information corresponding to the coding unit.

A decoding process may be as follows: After obtaining motion information of the coding unit, a decoder establishes a candidate predicted motion vector list based on the motion information, selects an optimal predicted motion vector from the candidate predicted motion vector list based on the obtained motion information, searches for a prediction unit most similar to the coding unit by using a reference unit indicated by the optimal predicted motion vector as a start point, updates the optimal predicted motion vector in the candidate predicted motion vector list to a motion vector of the prediction unit, that is, the updated predicted motion vector is a predicted motion vector of the coding unit, and obtains, based on the updated predicted motion vector and the prediction unit, the picture information corresponding to the coding unit.

In a process of implementing this application, the inventor finds that a related technology has at least the following disadvantages: A decoder may simultaneously decode a plurality of coding units during decoding. However, when a predicted motion vector of a current coding unit needs to be used for another coding unit, decoding can be performed only after an optimal predicted motion vector of the current coding unit is updated, and consequently a delay is very likely to occur.

SUMMARY

Embodiments of this application provide a motion vector obtaining method and apparatus, a computer device, and a storage medium, to resolve a decoding delay problem in a related technology.

According to an aspect, this application provides a motion vector obtaining method, including:
  determining a reference block of a to-be-processed picture block, where the reference block and the to-be-processed picture block are located in a same frame of picture;
  when the reference block falls within a preset range, obtaining a motion vector of the to-be-processed picture block based on an initial motion vector of the reference block, where the preset range is determined based on a location of the to-be-processed picture block; and
  when the reference block falls beyond the preset range, obtaining a motion vector of the to-be-processed picture block based on a final motion vector of the reference block, where the final motion vector is obtained based on the initial motion vector.

In an embodiment, that the reference block falls within a preset range includes: a coding tree block (CTB) in which the reference block is located and a coding tree block in which the to-be-processed picture block is located are located in a same row; and
  correspondingly, that the reference block falls beyond the preset range includes: the coding tree block in which the reference block is located and the coding tree block in which the to-be-processed picture block is located are located in different rows.

Based on the foregoing embodiment, different preset ranges may be provided, so that the motion vector of the to-be-processed picture block can be determined based on the different preset ranges, and a plurality of motion vectors of the to-be-processed picture block can be selected.

In an embodiment, the coding tree block in which the reference block is located and the coding tree block in which the to-be-processed picture block is located are located in different rows, and the coding tree block in which the reference block is located is above or on the top left of the coding tree block in which the to-be-processed picture block is located.

Based on the foregoing embodiment, another preset range may be provided, so that a plurality of preset conditions can be provided for motion vector selection.

In a possible implementation, that the reference block falls within a preset range includes: the reference block and the to-be-processed picture block are located in a same coding tree block; and
  correspondingly, that the reference block falls beyond the preset range includes: the reference block and the to-be-processed picture block are located in different coding tree blocks.

Based on the foregoing embodiment, a plurality of possible specific preset ranges may be provided.

In an embodiment, that the reference block falls within a preset range includes: a coding tree block in which the reference block is located is the same as a coding tree block in which the to-be-processed picture block is located, or a coding tree block in which the reference block is located is a left neighboring or right neighboring block of a coding tree block in which the to-be-processed picture block is located; and
  correspondingly, that the reference block falls beyond the preset range includes: the coding tree block in which the reference block is located is not the same as the coding tree block in which the to-be-processed picture block is located, or the coding tree block in which the reference block is located is not a left neighboring or right neighboring block of the coding tree block in which the to-be-processed picture block is located.

Based on the foregoing embodiment, a plurality of possible specific preset ranges may be provided.

In an embodiment, the determining a reference block of a to-be-processed picture block includes:

sequentially determining one or more preset candidate reference blocks as the reference block in a preset order, where the candidate reference block includes a picture block that has a preset spatial location relationship with the to-be-processed picture block.

Based on the foregoing embodiment, the reference block of the to-be-processed picture block may be determined, and then an initial motion vector of the to-be-processed picture block may be determined based on the reference block.

In an embodiment, the determining a reference block of a to-be-processed picture block includes:

parsing a bitstream to obtain one or more pieces of first identification information; and determining the reference block from a plurality of candidate reference blocks of the to-be-processed picture block based on the one or more pieces of first identification information, where the candidate reference block includes a picture block that has a preset spatial location relationship with the to-be-processed picture block.

Based on the foregoing embodiment, the reference block of the to-be-processed picture block may be determined based on the identification information in the bitstream, and then an initial motion vector of the to-be-processed picture block may be determined based on the reference block.

In an embodiment, that the final motion vector is obtained based on the initial motion vector includes:

separately adding the initial motion vector and a plurality of preset offset vectors to obtain a plurality of candidate final motion vectors; and determining a candidate final motion vector corresponding to a minimum distortion cost in the plurality of candidate final motion vectors as the final motion vector.

Based on the foregoing embodiment, the candidate final motion vector corresponding to the minimum distortion cost is used as the final motion vector, so that the final motion vector is more accurate.

In an embodiment, the method is used for bidirectional inter prediction, the final motion vector includes a first final motion vector and a second final motion vector, and the initial motion vector includes a first initial motion vector and a second initial motion vector; the first final motion vector and the first initial motion vector indicate a motion compensation block based on a first reference frame list of the to-be-processed picture block, and the second final motion vector and the second initial motion vector indicate a motion compensation block based on a second reference frame list of the to-be-processed picture block; and that the final motion vector is obtained based on the initial motion vector includes:

separately adding the first initial motion vector and a plurality of preset offset vectors to obtain a plurality of candidate first final motion vectors;

determining a candidate first final motion vector corresponding to a minimum distortion cost in the plurality of candidate first final motion vectors as the first final motion vector, where the first final motion vector corresponds to a first offset vector in the plurality of preset offset vectors;

obtaining a second offset vector, where a size of the second offset vector is equal to that of the first offset vector, and a direction of the second offset vector is opposite to that of the first offset vector; and adding the second initial motion vector and the second offset vector to obtain the second final motion vector.

Based on the foregoing embodiment, the final motion vector is obtained based on the initial motion vector in the bidirectional prediction mode.

In an embodiment, the method is used for bidirectional inter prediction, the final motion vector includes a first final motion vector and a second final motion vector, and the initial motion vector includes a first initial motion vector and a second initial motion vector; the first final motion vector and the first initial motion vector indicate a motion compensation block based on a first reference frame list of the to-be-processed picture block, and the second final motion vector and the second initial motion vector indicate a motion compensation block based on a second reference frame list of the to-be-processed picture block; and that the final motion vector is obtained based on the initial motion vector includes:

separately adding the first initial motion vector and a plurality of preset first offset vectors to obtain a plurality of candidate first final motion vectors;

determining a candidate first final motion vector corresponding to a minimum distortion cost in the plurality of candidate first final motion vectors as the first final motion vector;

separately adding the second initial motion vector and a plurality of preset second offset vectors to obtain a plurality of candidate second final motion vectors; and determining a candidate second final motion vector corresponding to a minimum distortion cost in the plurality of candidate second final motion vectors as the second final motion vector.

Based on the foregoing embodiment, another manner of obtaining the final motion vector based on the initial motion vector in the bidirectional prediction mode is provided, so that a plurality of manners of obtaining the final motion vector in the bidirectional prediction mode can be provided.

According to a second aspect, this application provides a motion vector residual determining method, including:

parsing a bitstream to obtain second identification information, where the second identification information is used to determine an initial motion vector of a to-be-processed picture block;

separately adding the initial motion vector and a plurality of preset offset vectors to obtain a plurality of candidate final motion vectors;

determining a candidate final motion vector corresponding to a minimum distortion cost in the plurality of candidate final motion vectors as the final motion vector; and using a difference between the final motion vector and the initial motion vector as a motion vector residual of the to-be-processed picture block, or using the final motion vector as a motion vector residual of the to-be-processed picture block.

In an embodiment, the method is used for bidirectional inter prediction, the final motion vector includes a first final motion vector and a second final motion vector, and the initial motion vector includes a first initial motion vector and a second initial motion vector; the first final motion vector and the first initial motion vector indicate a motion compensation block based on a first reference frame list of the to-be-processed picture block, and the second final motion vector and the second initial motion vector indicate a motion compensation block based on a second reference frame list of the to-be-processed picture block; and the using a difference between the final motion vector and the initial motion vector as a motion vector residual of the to-be-processed picture block includes:

using a difference between the first final motion vector and the first initial motion vector as a first motion vector residual of the to-be-processed picture block.

Based on the foregoing embodiments, the motion vector residual of the to-be-processed picture block can be determined in the bidirectional inter prediction mode.

In an embodiment, the using a difference between the final motion vector and the initial motion vector as a motion vector residual of the to-be-processed picture block further includes:

using a difference between the second final motion vector and the second initial motion vector as a second motion vector residual of the to-be-processed picture block.

In an embodiment, the using the final motion vector as a motion vector residual of the to-be-processed picture block includes:

using the first final motion vector as the first motion vector residual of the to-be-processed picture block.

In an embodiment, the using the final motion vector as a motion vector residual of the to-be-processed picture block further includes:

using the second final motion vector as a second motion vector residual of the to-be-processed picture block.

Based on the foregoing plurality of embodiments, a plurality of methods for determining the motion vector residual of the to-be-processed picture block are provided, so that an encoder and a decoder can improve encoding efficiency and decoding efficiency based on the motion vector residual.

According to a third aspect, this application provides a motion vector data storage method, including:

parsing a bitstream to obtain second identification information and third identification information, where the second identification information is used to determine an initial predicted motion vector of a to-be-processed picture block;

obtaining a final predicted motion vector based on the initial predicted motion vector and a plurality of preset offset vectors;

when the third identification information indicates that the bitstream carries a motion vector residual of the to-be-processed picture block, parsing the bitstream to obtain the motion vector residual, and storing the motion vector residual in target storage space; and when the third identification information indicates that the bitstream carries no motion vector residual of the to-be-processed picture block, storing a difference between the final predicted motion vector and the initial predicted motion vector in the target storage space, or storing the final predicted motion vector in the target storage space.

In an embodiment, that the third identification information indicates that the bitstream carries a motion vector residual of the to-be-processed picture block includes:

the third identification information indicates that a prediction mode of the to-be-processed picture block is an AMVP mode.

Based on the foregoing embodiment, motion vector data of the to-be-processed picture block can be stored in a plurality of prediction modes.

In an embodiment, that the third identification information indicates that the bitstream carries no motion vector residual of the to-be-processed picture block includes:

the third identification information indicates that the prediction mode of the to-be-processed picture block is a merge mode or a skip mode.

Based on the foregoing embodiment, different identification information is used to distinguish between different prediction modes, so that motion vector data of the to-be-processed picture block can be stored in a plurality of prediction modes.

In an embodiment, the obtaining a final predicted motion vector based on the initial predicted motion vector and a plurality of preset offset vectors includes:

separately adding the initial motion vector and the plurality of preset offset vectors to obtain a plurality of candidate final motion vectors; and determining a candidate final motion vector corresponding to a minimum distortion cost in the plurality of candidate final motion vectors as the final motion vector.

Based on the foregoing embodiment, accuracy of obtaining the final predicted motion vector by using the distortion cost is higher, and further, the stored motion vector data is more accurate.

According to a fourth aspect, this application provides a motion vector obtaining apparatus, configured to perform the foregoing motion vector obtaining method. Specifically, the motion vector obtaining apparatus includes a function module configured to perform the motion vector obtaining method provided in any one of the first aspect or the optional manners of the first aspect. The foregoing aspect is an aspect corresponding to the motion vector obtaining method.

According to a fifth aspect, this application provides a motion vector residual determining apparatus, configured to perform the foregoing motion vector residual determining method. Specifically, the motion vector residual determining apparatus includes a function module configured to perform the motion vector residual determining method provided in any one of the second aspect or the optional manners of the second aspect. The foregoing aspect is an aspect corresponding to the motion vector residual determining method.

According to a sixth aspect, this application provides a motion vector data storage apparatus, configured to perform the foregoing motion vector data storage method. Specifically, the motion vector data storage apparatus includes a function module configured to perform the motion vector data storage method provided in any one of the third aspect or the optional manners of the third aspect. The foregoing aspect is an aspect corresponding to the motion vector data storage method.

According to a seventh aspect, this application provides a computer device. The computer device includes a processor and a memory. The memory stores at least one instruction, and the instruction is loaded and executed by the processor to implement the operations performed in the foregoing motion vector obtaining method.

According to an eighth aspect, this application provides a computer device. The computer device includes a processor and a memory. The memory stores at least one instruction, and the instruction is loaded and executed by the processor to implement the operations performed in the foregoing motion vector data storage method.

According to a ninth aspect, this application provides a computer device. The computer device includes a processor and a memory. The memory stores at least one instruction, and the instruction is loaded and executed by the processor to implement the operations performed in the foregoing motion vector residual determining method.

According to a tenth aspect, this application provides a computer-readable storage medium. The storage medium stores at least one instruction, and the instruction is loaded and executed by a processor to implement the operations performed in the foregoing motion vector obtaining method.

According to an eleventh aspect, this application provides a computer-readable storage medium. The storage medium stores at least one instruction, and the instruction is loaded and executed by a processor to implement the operations performed in the foregoing motion vector residual determining method.

According to a twelfth aspect, this application provides a computer-readable storage medium. The storage medium stores at least one instruction, and the instruction is loaded and executed by a processor to implement the operations performed in the foregoing motion vector data storage method.

The technical solutions provided in this application include at least the following beneficial effects:

The motion vector of the to-be-processed picture block is determined by using the location relationship between the reference block and the to-be-processed picture block. When the reference block and the to-be-processed picture block fall within the preset range, the decoder uses the initial motion vector of the reference block as the motion vector of the to-be-processed picture block. When the reference block and the to-be-processed picture block fall beyond the preset range, the decoder uses the final motion vector of the reference block as the motion vector of the to-be-processed picture block. In this case, when the to-be-processed picture block needs to be decoded by using the final motion vector of the reference block during decoding, the decoder may use the initial motion vector of the reference block as the motion vector of the to-be-processed picture block, so that the to-be-processed picture block can be used, thereby avoiding a case in which the motion vector of the to-be-processed picture block can be obtained only after the final motion vector of the reference block is obtained, and improving decoding efficiency.

DESCRIPTION OF EMBODIMENTS

To make the objectives, technical solutions, and advantages of this application clearer, the following further describes implementations of this application in detail with reference to accompanying drawings.

Figure 1:
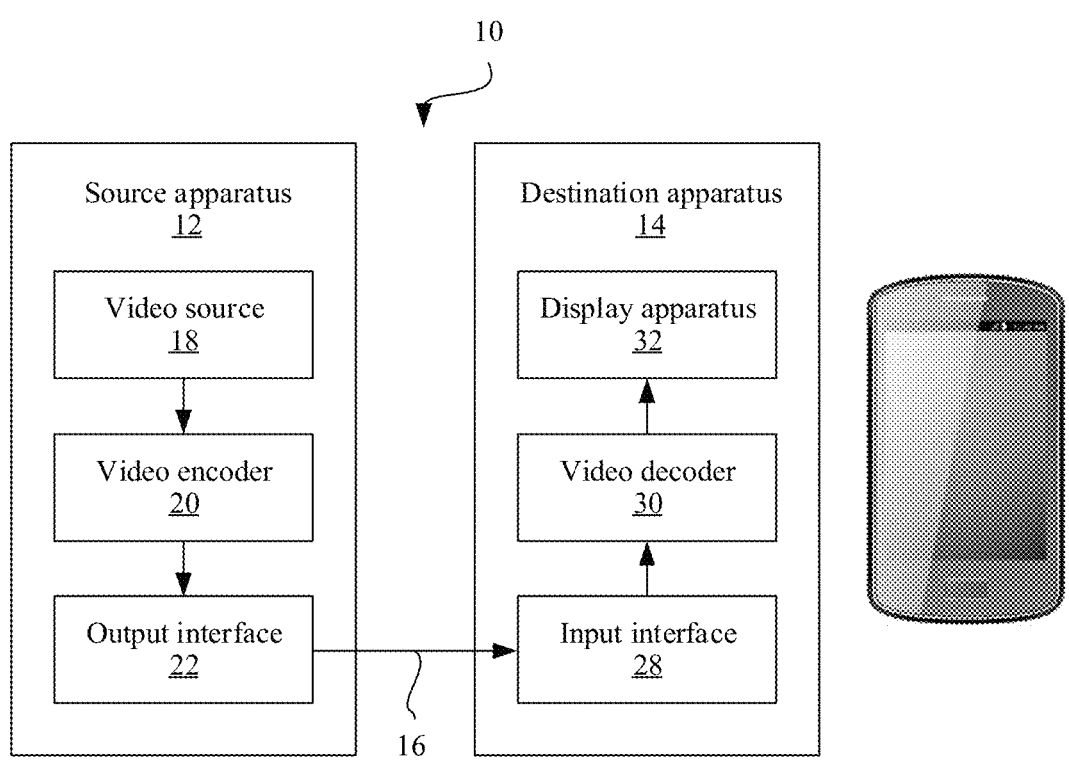
FIG. 1 is a block diagram of an example of a video coding system that may be configured for use in an embodiment of this application.

FIG. 1 is a schematic block diagram of a video coding system 10 according to an embodiment of this application. As shown in FIG. 1, the system 10 includes a source apparatus 12. The source apparatus 12 generates encoded video data that is to be subsequently decoded by a destination apparatus 14. The source apparatus 12 and the destination apparatus 14 may include any one of a wide range of apparatuses, including a desktop computer, a notebook computer, a tablet computer, a set top box, a telephone handset such as a "smart" phone, a "smart" touchpad, a television, a camera, a display apparatus, a digital media player, a video game console, a video streaming transmission apparatus, or the like. In some applications, the source apparatus 12 and the destination apparatus 14 may be equipped for wireless communication.

The destination apparatus 14 may receive the to-be-decoded encoded video data over a link 16. The link 16 may include any type of medium or apparatus that can transmit the encoded video data from the source apparatus 12 to the destination apparatus 14. In a feasible implementation, the link 16 may include a communications medium that enables the source apparatus 12 to directly transmit the encoded video data to the destination apparatus 14 in real time. The encoded video data may be modulated according to a communications standard (for example, a wireless communications protocol) and then is transmitted to the destination apparatus 14. The communications medium may include any wireless or wired communications medium, for example, a radio frequency spectrum or at least one physical transmission lines. The communications medium may constitute a part of a packet-based network (for example, a local area network, a wide area network, or a global network such as the internet). The communications medium may include a router, a switch, a base station, or any other device that may be used to facilitate communication from the source apparatus 12 to the destination apparatus 14.

Alternatively, the encoded data may be output from an output interface 22 to a storage apparatus. Similarly, the encoded data may be accessed from the storage apparatus through an input interface. The storage apparatus may include any one of a plurality of distributed data storage media or locally accessed data storage media, for example, a hard drive, a Blu-ray, a digital versatile disc (DVD), a compact disc read-only memory (CD-ROM), a flash memory, a volatile or nonvolatile memory, or any other appropriate digital storage medium configured to store the encoded video data. In another feasible implementation, the storage apparatus may correspond to a file server or another intermediate storage apparatus that can keep an encoded video generated by the source apparatus 12. The destination apparatus 14 may access stored video data from the storage apparatus through streaming transmission or downloading. The file server may be any type of server that can store the encoded video data and transmit the encoded video data to the destination apparatus 14. In a feasible implementation, the file server includes a website server, a file transfer protocol server, a network-attached storage apparatus, or a local disk drive. The destination apparatus 14 may access the encoded video data through any standard data connection including an internet connection. The data connection may include a wireless channel (for example, wireless fidelity (Wi-Fi) connection) or a wired connection (for example, a cable modem) that is suitable for accessing the encoded video data stored in the file server, or a combination thereof. Transmission of the encoded video data from the storage apparatus may be streaming transmission, downloading transmission, or a combination thereof.

The technologies in this application are not necessarily limited to wireless applications or settings. The technologies can be applied to video decoding, to support any one of a plurality of multimedia applications, for example, over-the-air television broadcasting, cable television transmission, satellite television transmission, video streaming transmission (for example, through the internet), encoding of a digital video for storage in a data storage medium, decoding of a digital video stored in a data storage medium, or another application. In some feasible implementations, the system 10 may be configured to support unidirectional or bidirectional video transmission, to support applications such as video streaming transmission, video playing, video broadcasting, and/or videotelephony.

In an embodiment of FIG. 1, the source apparatus 12 includes a video source 18, a video encoder 20, and the output interface 22. In some applications, the output interface 22 may include a modulator/demodulator (a modem) and/or a transmitter. In the source apparatus 12, the video source 18 may include, for example, the following sources: a video capture apparatus (for example, a video camera), a video archive including a previously captured video, a video feed-in interface for receiving a video from a video content provider, and/or a computer graphics system for generating computer graphics data as a source video, or a combination thereof. In a feasible implementation, if the video source 18 is the video camera, the source apparatus 12 and the destination apparatus 14 can constitute a camera phone or a video phone. For example, the technologies described in this application may be applied to, for example, video decoding, and may be applied to wireless and/or wired applications.

The video encoder 20 may encode a captured or pre-captured video or a video generated by a computer. The encoded video data may be directly transmitted to the destination apparatus 14 through the output interface 22 of the source apparatus 12. The encoded video data may also (or alternatively) be stored in the storage apparatus 24, so that the destination apparatus 14 or another apparatus subsequently accesses the encoded video data for decoding and/or playing.

The destination apparatus 14 includes an input interface 28, a video decoder 30, and a display apparatus 32. In some applications, the input interface 28 may include a receiver and/or a modem. The input interface 28 of the destination apparatus 14 receives the encoded video data over the link 16. The encoded video data transmitted or provided to the storage apparatus 24 over the link 16 may include a plurality of syntax elements that are generated by the video encoder 20 and used by a video decoder such as the video decoder 30 to decode the video data. These syntax elements may be included in the encoded video data that is transmitted on the communications medium and that is stored in the storage medium or the file server.

The display apparatus 32 may be integrated with the destination apparatus 14 or disposed outside the destination apparatus 14. In some feasible implementations, the destination apparatus 14 may include an integrated display apparatus and may also be configured to connect to an interface of an external display apparatus. In other feasible implementations, the destination apparatus 14 may be a display apparatus. Generally, the display apparatus 32 displays decoded video data to a user, and may include any one of a plurality of display apparatuses, for example, a liquid crystal display, a plasma display, an organic light-emitting diode display, or a display apparatus of another type.

The video encoder 20 and the video decoder 30 may operate according to, for example, a next-generation video coding compression standard (H.266) that is currently being developed, and may comply with an H.266 test model. Alternatively, the video encoder 20 and the video decoder 30 may operate according to, for example, other dedicated or industrial standards such as the ITU-T H.265 standard or the ITU-T H.264 standard, or extensions of these standards. The ITU-T H.265 standard is also referred to as a high efficiency video decoding standard, and the ITU-T H.264 standard is alternatively referred to as moving picture experts group (moving picture experts group, MPEG-4) Part 10, or advanced video coding (advanced video coding, AVC). However, the technologies in this application are not limited to any specific decoding standard. In other feasible implementations, video compression standards include MPEG-2 and ITU-T H.263.

Although not shown in FIG. 1, in some aspects, the video encoder 20 and the video decoder 30 may be respectively integrated with an audio encoder and an audio decoder, and may include an appropriate multiplexer-demultiplexer (multiplexer-demultiplexer, MUX-DEMUX) unit or other hardware and software, to encode both an audio and a video in a same data stream or separate data streams. If applicable, in some feasible implementations, the MUX-DEMUX unit may comply with the ITU H.223 multiplexer protocol or other protocols such as the user datagram protocol (user datagram protocol, UDP).

The video encoder 20 and the video decoder 30 each may be implemented as any one of a plurality of appropriate encoder circuits, for example, one or more microprocessors, digital signal processors (digital signal processor, DSP), application-specific integrated circuits (application specific integrated circuit, ASIC), field programmable gate arrays (field programmable gate array, FPGA), discrete logic, software, hardware, firmware, or any combination thereof. When some of the technologies are implemented as software, an apparatus may store an instruction for the software in an appropriate non-transitory computer-readable medium, and execute the instruction in a form of hardware by using one or more processors, to implement the technologies in this application. The video encoder 20 and the video decoder 30 each may be included in one or more encoders or decoders. Either of the video encoder 20 and the video decoder 30 may be integrated as a part of a combined encoder/decoder (encoder/decoder, CODEC) in a corresponding apparatus.

This application may, for example, relate to another apparatus in which the video encoder 20 "signals" specific information to, for example, the video decoder 30. However, it should be understood that the video encoder 20 may associate specific syntax elements with encoded parts of the video data, to signal information. That is, the video encoder 20 may store the specific syntax elements in header information of the encoded parts of the video data, to signal the data. In some applications, these syntax elements may be encoded and stored (for example, stored in a storage system or a file server) before being received and decoded by the video decoder 30. Therefore, the term "signal" may mean, for example, transmission of syntax or transmission of other data used for decoding compressed video data, regardless of whether the transmission is performed in real time, nearly in real time, or within a time span. For example, the transmission may be performed when a syntax element is stored in a medium during encoding, and then the syntax element may be retrieved by a decoding apparatus at any time after being stored in the medium.

The joint video experts team (joint video team, JVT) developed the H.265 high efficiency video coding (high efficiency video coding, HEVC) standard. HEVC standardization is based on an evolved model of a video decoding apparatus, where the model is referred to as an HEVC test model (HM). A latest H.265 standard document is available at http://www.itu.int/rec/T-REC-H.265. A latest version of the standard document is H.265 (12/16), and the standard document is incorporated herein by reference in its entirety. In the HM, it is assumed that the video decoding apparatus has several additional capabilities relative to an existing algorithm of ITU-TH.264/AVC. For example, H.264 provides nine intra prediction encoding modes, whereas the HM can provide up to 35 intra prediction encoding modes.

The JVET is committed to developing the H.266 standard. An H.266 standardization process is based on an evolved model of the video decoding apparatus, where the model is referred to as an H.266 test model. H.266 algorithm descriptions are available at http://phenix.int-evry.fr/jvet, and latest algorithm descriptions are included in JVET-G1001-v1. The algorithm description document is incorporated herein by reference in its entirety. In addition, reference software for a JEM test model is available at https://jvet.hhi.fraunhofer.de/svn/svn_HMJEMSoftware/, and is also incorporated herein by reference in its entirety.

Generally, as described in an HM working model, a video frame or picture may be split into a sequence of tree blocks or largest coding units (LCU) including both luma and chroma samples. The LCU is also referred to as a coding tree unit (CTU). A tree block has a function similar to that of a macroblock in the H.264 standard. A slice includes several consecutive tree blocks in a decoding order. The video frame or picture may be partitioned into one or more slices. Each tree block can be split into coding units based on a quadtree. For example, a tree block serving as a root node of the quadtree may be split into four child nodes, and each child node may also serve as a parent node and is split into four other child nodes. A final non-splittable child node serving as a leaf node of the quadtree includes a decoding node, for example, a decoded video block. In syntactic data associated with a decoded bitstream, a maximum quantity of times that the tree block can be split and a minimum size of the decoding node may be defined.

It should be noted that one CTU includes one coding tree block (CTB) and two chroma CTBs at a same location, and some corresponding syntax elements. The CTB may be directly used as one coding block (CB), or may be split into a plurality of small coding blocks CBs, one luma CB, two chroma CBs, and some corresponding syntax elements in a form of a quadtree, to form one coding unit (CU).

The CU includes a decoding node, a prediction unit (PU), and a transform unit (TU) associated with the decoding node. A size of the CU corresponds to a size of the decoding node, and a shape of the CU needs to be a square. The size of the CU may range from 8×8 pixels to a maximum of 64×64 pixels, or may be a larger tree block size. Each CU may include one or more PUs and one or more TUs. For example, syntactic data associated with the CU may describe partitioning of a CU into one or more PUs. A partitioning pattern may vary when the CU is encoded in a skip or direct mode, encoded in an intra prediction mode, or encoded in an inter prediction mode. The PU obtained through partitioning may be in a non-square shape. For example, the syntactic data associated with the CU may also describe partitioning of a CU into one or more TUS based on the quadtree. The TU may be in a square or non-square shape.

The HEVC standard allows TU-based transform. Different CUs may include different TUs. A size of a TU is usually set based on a size of a PU within a given CU defined for a partitioned LCU. However, a case may not always be like this. The size of the TU is usually the same as or less than that of the PU. In some feasible implementations, a quadtree structure referred to as a "residual quadtree" (RQT) may be used to split a residual sample corresponding to the CU into smaller units. A leaf node of the RQT may be referred to as a TU. A pixel difference associated with the TU may be transformed to generate a transform coefficient, and the transform coefficient may be quantized.

Generally, a PU includes data related to a prediction process. For example, when the PU is encoded in an intra mode, the PU may include data describing the intra prediction mode of the PU. In another feasible implementation, when the PU is encoded in an inter mode, the PU may include data defining a motion vector for the PU. For example, the data defining the motion vector for the PU may describe a horizontal component of the motion vector, a vertical component of the motion vector, a resolution (for example, 1/4 pixel precision or 1/8 pixel precision) of the motion vector, a reference picture to which the motion vector points, and/or a reference picture list (for example, a list 0, a list 1, or a list C) of the motion vector.

Generally, transform and quantization processes are used for a TU. A given CU including one or more PUs may also include one or more TUs. After performing prediction, the video encoder 20 may calculate a residual corresponding to the PU. The residual includes a pixel difference. The pixel difference may be transformed into a transform coefficient, and the transform coefficient is quantized and is scanned by using a TU, to generate a serialized transform coefficient for entropy-decoding. In this application, the term "video block" is usually used to indicate a decoding node of a CU. In some specific applications, in this application, the term "video block" may also be used to indicate a tree block including a decoding node, a PU, and a TU, for example, an LCU or a CU.

A video sequence usually includes a series of video frames or pictures. For example, a group of pictures (group of pictures, GOP) includes a series of video pictures, or one or more video pictures. The GOP may include syntactic data in header information of the GOP, header information of one or more pictures, or the like, and the syntactic data describes a quantity of pictures included in the GOP. Each slice of a picture may include slice syntactic data describing an encoding mode of the corresponding picture. The video encoder 20 usually performs an operation on a video block in an individual video slice, to encode the video data. The video block may correspond to the decoding node in the CU. A size of the video block may be fixed or changeable, and may vary with a specified decoding standard.

In an embodiment, the HM supports prediction on various PU sizes. Assuming that a size of a specific CU is 2N×2N, the HM supports intra prediction on a PU with a size of 2N×2N or N×N and inter prediction on a symmetric PU with a size of 2N×2N, 2N×N, N×2N, or N×N, and the HM also supports asymmetric partitioning of inter prediction on a PU with a size of 2N×nU, 2N×nD, nL×2N, or nR×2N. In asymmetric partitioning, the CU is not partitioned in a direction, and is partitioned into two parts in another direction, where one part accounts for 25% of the CU and the other part accounts for 75% of the CU. The part accounting for 25% of the CU is indicated by an indicator including "n" followed by "U (Up)", "D (Down)", "L (Left)" or "R (Right)". Therefore, for example, "2N×nU" refers to a horizontally partitioned 2N×2N CU, with a 2N×0.5N PU at the top and a 2N×1.5N PU at the bottom.

In this application, "N×N" and "N multiplied by N" may be used interchangeably to indicate a pixel size of a video block in a vertical dimension and a horizontal dimension, for example, 16×16 pixels or 16 multiplied by 16 pixels. Generally, a 16×16 block has 16 pixels in a vertical direction (y=16) and has 16 pixels in a horizontal direction (x=16). Similarly, an N×N block usually has N pixels in a vertical direction and has N pixels in a horizontal direction, where N is a nonnegative integer value. Pixels in a block may be arranged in rows and columns. In addition, a quantity of pixels in the horizontal direction and a quantity of pixels in the vertical direction of a block may not necessarily be the same. For example, a block may include N×M pixels, where M is not necessarily equal to N.

After performing intra or inter prediction decoding on the PU in the CU, the video encoder 20 may calculate residual data of the TU in the CU. A PU may include pixel data in spatial domain (also referred to as pixel domain), and a TU may include a coefficient in transform domain after transform (for example, discrete cosine transform (discrete cosine transform, DCT), integer transform, wavelet transform, or other conceptually similar transform) is applied to residual video data. The residual data may correspond to a pixel difference between a pixel of an unencoded picture and a predictor corresponding to the PU. The video encoder 20 may generate a TU including residual data of the CU, and then transform the TU to generate a transform coefficient of the CU.

After performing any transform to generate transform coefficients, the video encoder 20 may quantize the transform coefficients. Quantization refers to, for example, a process of quantizing the coefficients, to reduce an amount of data used for representing the coefficients and implement further compression. The quantization process can reduce a bit depth associated with some or all of the coefficients. For example, during quantization, an n-bit value may be reduced to an m-bit value through rounding, where n is greater than m.

The JEM model further improves a video picture encoding structure. Specifically, a block coding structure referred to as a "quadtree plus binary tree" (QTBT) structure is introduced. Without using concepts such as a CU, a PU, and a TU in HEVC, the QTBT structure supports more flexible CU split shapes. A CU may be in a square shape or a rectangular shape. Quadtree partitioning is first performed on a CTU, and binary tree partitioning is further performed on a leaf node of a quadtree. In addition, there are two binary tree partitioning modes: symmetric horizontal partitioning and symmetric vertical partitioning. A leaf node of a binary tree is referred to as a CU. The CU in the JEM model cannot be further partitioned during prediction and transform. In other words, the CU, the PU, and the TU in the JEM model have a same block size. In the existing JEM model, a maximum CTU size is 256×256 luma pixels.

In some embodiments, the video encoder 20 may scan the quantized transform coefficient in a predefined scanning order to generate a serialized vector that can be entropy-encoded. In other feasible implementations, the video encoder 20 may perform adaptive scanning. After scanning the quantized transform coefficient to form a one-dimensional vector, the video encoder 20 may entropy-encode the one-dimensional vector based on a context-adaptive variable-length coding (CAVLC) method, a context-based adaptive binary arithmetic coding (CABAC) method, a probability interval partitioning entropy (PIPE) coding method, or another entropy coding method. The video encoder 20 may further entropy-encode the syntax element associated with the encoded video data, so that the video decoder 30 decodes the video data.

To perform CABAC, the video encoder 20 may assign a context in a context model to a to-be-transmitted symbol. The context may be related to whether a neighboring value of the symbol is non-zero. To perform CAVLC, the video encoder 20 may select a variable-length code of the to-be-transmitted symbol. A codeword in variable-length coding (VLC) may be constructed, so that a shorter code corresponds to a more probable symbol and a longer code corresponds to a less probable symbol. In this way, compared with using equal-length codewords for all to-be-transmitted symbols, using VLC can reduce a bit rate. A probability in CABAC may be determined based on the context assigned to the symbol.

In an embodiment of this application, the video encoder may perform inter prediction to reduce temporal redundancy between pictures. As described above, a CU may have one or more prediction units PUs according to different video compression coding standards. In other words, a plurality of PUs may belong to one CU, or a PU and a CU have a same size. In this specification, when a CU and a PU have a same size, a partitioning mode of the CU is performing no partition, or partitioning the CU into one PU, where the PU is uniformly used for description. When the video encoder performs inter prediction, the video encoder may signal motion information for the PU to the video decoder. For example, the motion information for the PU may include a reference picture index, a motion vector, and a prediction direction identifier. The motion vector may indicate a displacement between a picture block (also referred to as a video block, a pixel block, a pixel set, or the like) of the PU and a reference block of the PU. The reference block of the PU may be a part of a reference picture similar to the picture block of the PU. The reference block may be located in a reference picture indicated by the reference picture index and the prediction direction identifier.

To reduce a quantity of coded bits required to represent the motion information for the PU, the video encoder may generate a candidate predicted motion vector (MV) list for each PU according to a merge prediction mode or an advanced motion vector prediction (AMVP) mode. Each candidate predicted motion vector in the candidate predicted motion vector list for the PU may indicate motion information. Motion information indicated by some candidate predicted motion vectors in the candidate predicted motion vector list may be based on motion information for other PUs. If a candidate predicted motion vector indicates motion information of one of a specified spatial candidate predicted motion vector location or a specified temporal candidate predicted motion vector location, the candidate predicted motion vector may be referred to as an "original" candidate predicted motion vector in this application. For example, in a merge mode, also referred to as the merge prediction mode in this specification, there may be five original spatial candidate predicted motion vector locations and one original temporal candidate predicted motion vector location. In some examples, the video encoder may generate additional candidate predicted motion vectors by combining some motion vectors from different original candidate predicted motion vectors, modifying the original candidate predicted motion vectors, or inserting only zero motion vectors as the candidate predicted motion vectors. These additional candidate predicted motion vectors are not considered as original candidate predicted motion vectors, and may be referred to as manually generated candidate predicted motion vectors in this application.

The technologies in this application usually include a technology for generating a candidate predicted motion vector list on the video encoder and a technology for generating the same candidate predicted motion vector list on the video decoder. The video encoder and the video decoder may generate the same candidate predicted motion vector list by implementing a same technology for constructing the candidate predicted motion vector list. For example, the video encoder and the video decoder may construct lists with a same quantity of candidate predicted motion vectors (for example, five candidate predicted motion vectors). The video encoder and the video decoder may first consider spatial candidate predicted motion vectors (for example, neighboring blocks in a same picture), then consider temporal candidate predicted motion vectors (for example, candidate predicted motion vectors in different pictures), and finally consider manually generated candidate predicted motion vectors, until a required quantity of candidate predicted motion vectors are added to the lists. According to the technologies in this application, during construction of the candidate predicted motion vector list, a pruning operation may be performed on some types of candidate predicted motion vectors to remove repeated candidate predicted motion vectors from the candidate predicted motion vector list, and a pruning operation may not be performed on other types of candidate predicted motion vectors to reduce decoder complexity. For example, for a set of spatial candidate predicted motion vectors and for a set of temporal candidate predicted motion vectors, a pruning operation may be performed to remove candidate predicted motion vectors with repeated motion information from the candidate predicted motion vector list. However, a manually generated candidate predicted motion vector may be added to the candidate predicted motion vector list when a pruning operation is not performed on the manually generated candidate predicted motion vector.

After generating the candidate predicted motion vector list for the PU of the CU, the video encoder may select a candidate predicted motion vector from the candidate predicted motion vector list and output a candidate predicted motion vector index in a bitstream. The selected candidate predicted motion vector may be a candidate predicted motion vector for generating a motion vector that most closely matches a prediction unit of a target PU that is being decoded. The candidate predicted motion vector index may indicate a location of the selected candidate predicted motion vector in the candidate predicted motion vector list. The video encoder may further generate a prediction picture block for the PU based on a reference block indicated by the motion information for the PU. The motion information for the PU may be determined based on motion information indicated by the selected candidate predicted motion vector. For example, in the merge mode, the motion information for the PU may be the same as the motion information indicated by the selected candidate predicted motion vector. In the advanced motion vector prediction mode, the motion information for the PU may be determined based on a motion vector difference for the PU and the motion information indicated by the selected candidate predicted motion vector. The video encoder may generate one or more residual picture blocks for the CU based on the prediction picture block for the PU of the CU and an original picture block for the CU. Then, the video encoder may encode the one or more residual picture blocks and output the one or more residual picture blocks in the bitstream.

The bitstream may include data identifying the selected candidate predicted motion vector in the candidate predicted motion vector list for the PU. The video decoder may determine the motion information for the PU based on the motion information indicated by the selected candidate predicted motion vector in the candidate predicted motion vector list for the PU. The video decoder may identify one or more reference blocks for the PU based on the motion information for the PU. After identifying the one or more reference blocks for the PU, the video decoder may generate the prediction picture block for the PU based on the one or more reference blocks for the PU. The video decoder may reconstruct the picture block for the CU based on the prediction picture block for the PU of the CU and the one or more residual picture blocks for the CU.

For ease of explanation, in this application, a location or a picture block may be described as having various spatial relationships with a CU or a PU. The description may be explained as follows: The location or the picture block has various spatial relationships with a picture block associated with the CU or the PU. In addition, in this application, a PU currently being decoded by the video decoder may be referred to as a to-be-processed PU, or may be referred to as a current to-be-processed picture block. In this application, a CU currently being decoded by the video decoder may be referred to as a to-be-processed CU. In this application, a picture currently being decoded by the video decoder may be referred to as a current picture. It should be understood that this application is also applicable to a case in which a PU and a CU have a same size, or a PU is a CU. The PU is uniformly used for description.

As described briefly above, the video encoder 20 may generate the prediction picture block and the motion information for the PU of the CU through inter prediction. In many examples, motion information for a given PU may be the same as or similar to motion information for one or more neighboring PUs (that is, a PU whose picture block is spatially or temporally neighboring to a picture block of the given PU). Because the neighboring PU often has similar motion information, the video encoder 20 may encode the motion information for the given PU based on the motion information for the neighboring PU. Encoding the motion information for the given PU based on the motion information for the neighboring PU can reduce a quantity of coded bits required in the bitstream for indicating the motion information for the given PU.

The video encoder 20 may encode the motion information for the given PU based on the motion information for the neighboring PU in various manners. For example, the video encoder 20 may indicate that the motion information for the given PU is the same as the motion information for the neighboring PU. In this application, the merge mode may be used to indicate that the motion information for the given PU is the same as the motion information for the neighboring PU, or may be derived from the motion information for the neighboring PU. In another feasible implementation, the video encoder 20 may calculate a motion vector difference (motion vector difference, MVD) for a given PU, and the MVD is a difference between an initial motion vector for the given PU and a final motion vector for the given PU. The video encoder 20 may include the MVD instead of the motion vector for the given PU in the motion information for the given PU. In the bitstream, a quantity of coded bits required for representing the MVD is less than a quantity of coded bits required for representing the motion vector for the given PU. In this application, the advanced motion vector prediction mode may be used to indicate that the motion information for the given PU is signaled to a decoder by using the MVD and an index value for identifying a candidate motion vector.

To signal the motion information for the given PU to the decoder in the merge mode or the AMVP mode, the video encoder 20 may generate a candidate predicted motion vector list for the given PU. The candidate predicted motion vector list may include one or more candidate predicted motion vectors. Each candidate predicted motion vector in the candidate predicted motion vector list for the given PU may specify motion information. The motion information indicated by each candidate predicted motion vector may include a motion vector, a reference picture index, and a prediction direction identifier. The candidate predicted motion vectors in the candidate predicted motion vector list may include "original" candidate predicted motion vectors, and each "original" candidate predicted motion vector indicates motion information of one of specified candidate predicted motion vector locations within a PU different from the given PU.

After generating the candidate predicted motion vector list for the PU, the video encoder 20 may select one of the candidate predicted motion vectors from the candidate predicted motion vector list for the PU. For example, the video encoder may compare each candidate predicted motion vector with a PU that is being decoded and may select a candidate predicted motion vector with a desired rate-distortion cost. The video encoder 20 may output a candidate predicted motion vector index for the PU. The candidate predicted motion vector index may identify a location of the selected candidate predicted motion vector in the candidate predicted motion vector list.

In addition, the video encoder 20 may generate a prediction picture block for the PU based on a reference block indicated by the motion information for the PU. The motion information for the PU may be determined based on motion information indicated by the selected candidate predicted motion vector in the candidate predicted motion vector list for the PU. For example, in the merge mode, the motion information for the PU may be the same as the motion information indicated by the selected candidate predicted motion vector. In the AMVP mode, the motion information for the PU may be determined based on the motion vector difference for the PU and the motion information indicated by the selected candidate predicted motion vector. As described above, the video encoder 20 may process the prediction picture block for the PU.

When the video decoder 30 receives the bitstream, the video decoder 30 may generate a candidate predicted motion vector list for each PU of the CU. The candidate predicted motion vector list generated by the video decoder 30 for the PU may be the same as the candidate predicted motion vector list generated by the video encoder 20 for the PU. A syntax element obtained by parsing the bitstream may indicate the location of the selected candidate predicted motion vector in the candidate predicted motion vector list for the PU. After generating the candidate predicted motion vector list for the PU, the video decoder 30 may generate the prediction picture block for the PU based on the one or more reference blocks indicated by the motion information for the PU. The video decoder 30 may determine the motion information for the PU based on the motion information indicated by the selected candidate predicted motion vector in the candidate predicted motion vector list for the PU. The video decoder 30 may reconstruct the picture block for the CU based on the prediction picture block for the PU and the residual picture block for the CU.

It should be understood that, in a feasible implementation, on the decoder, construction of the candidate predicted motion vector list and parsing of the bitstream to obtain the location of the selected candidate predicted motion vector in the candidate predicted motion vector list are independent of each other, and may be performed in any order or in parallel.

In another feasible implementation, on the decoder, the location of the selected candidate predicted motion vector in the candidate predicted motion vector list is first obtained by parsing the bitstream, and then the candidate predicted motion vector list is constructed based on the location obtained through parsing. In this implementation, only a candidate predicted motion vector list at the location obtained through parsing needs to be constructed to determine the candidate predicted motion vector at the location, without a need to construct all candidate predicted motion vector lists. For example, when it is learned, by parsing the bitstream, that the selected candidate predicted motion vector is a candidate predicted motion vector whose index is 3 in the candidate predicted motion vector list, only a candidate predicted motion vector list from an index 0 to the index 3 needs to be constructed to determine the candidate predicted motion vector whose index is 3. This can reduce complexity and improve decoding efficiency.

Figure 2:
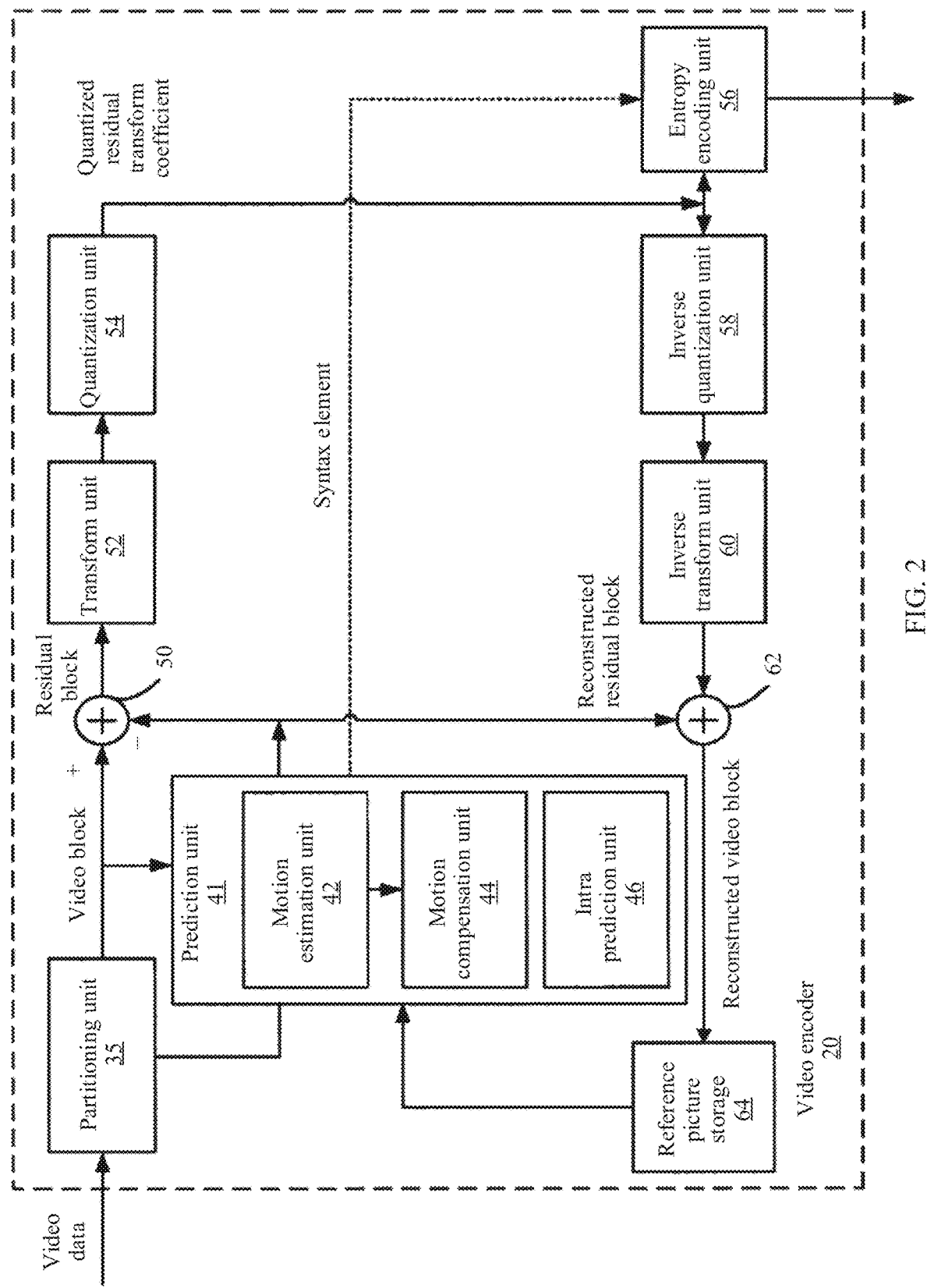
FIG. 2 is a system block diagram of an example of a video encoder that may be configured for use in an embodiment of this application.

FIG. 2 is a schematic block diagram of a video encoder 20 according to an embodiment of this application. The video encoder 20 may perform intra decoding and inter decoding on a video block in a video slice. Intra decoding relies on spatial prediction to reduce or remove spatial redundancy of a video in a given video frame or picture. Inter decoding relies on temporal prediction to reduce or remove temporal redundancy of a video in a neighboring frame or picture of a video sequence. An intra mode (I mode) may be any one of several spatial compression modes. An inter mode, such as a unidirectional prediction mode (P mode) or a bidirectional prediction mode (B mode), may be any one of several temporal compression modes.

In a feasible implementation of FIG. 2, the video encoder 20 includes a partitioning unit 35, a prediction unit 41, a reference picture storage 64, a summator 50, a transform unit 52, a quantization unit 54, and an entropy encoding unit 56.

The reference picture storage 64 may be further configured to provide target storage space to store an MVD, that is, store a difference between a final motion vector and an initial motion vector for a to-be-processed PU. In some embodiments, the reference picture storage 64 may further store a final motion vector for a to-be-processed PU. In this embodiment of this application, the MVD stored in the reference picture storage 64 may be used in an encoding process of another PU. For example, in a decoding process in a merge (merge) mode, an unupdated initial motion vector and an updated final motion vector are separately stored at different times. Therefore, when the to-be-processed PU needs to obtain a predicted motion vector for another PU, under a specific condition, the to-be-processed PU may directly use an unupdated initial motion vector for the another PU as the motion vector for the another PU, and does not need to obtain the motion vector for the another PU after the motion vector for the another PU is updated.

It should be noted that the target storage space may be provided by a memory other than the reference picture storage 64, for example, a newly added memory. This is not limited in this embodiment of this application.

It should be noted that, in a related technology, when the video encoder 20 works in the merge mode, content in the reference picture storage 64 is empty, or is a zero vector, that is, when the video encoder 20 works in the merge mode, the target storage space is not used during encoding, and in an encoding process, the predicted motion vector for the another PU that is obtained by the to-be-processed PU is an updated final motion vector for the another PU. Therefore, the to-be-processed PU can obtain the predicted motion vector for the another PU only after the predicted motion vector for the another PU is updated, and consequently an encoding delay occurs during encoding. However, when the video encoder 20 works in a non-merge mode, the reference picture storage 64 may be used. For example, in an AMVP mode, the target storage space is used to store a motion vector residual, and the video encoder 20 encodes the motion vector residual, so that after decoding a current PU, a video decoder 30 may obtain a motion vector residual of a to-be-processed PU, and obtain a final motion vector for the to-be-processed PU based on the motion vector residual of the to-be-processed PU and an initial motion vector for the to-be-processed PU.

The prediction unit 41 includes a motion estimation unit 42, a motion compensation unit 44, and an intra prediction unit 46. For video block reconstruction, the video encoder 20 further includes an inverse quantization unit 58, an inverse transform unit 60, and a summator 62. The video encoder 20 may further include a deblocking filter (not shown in FIG. 2) to perform filtering on a block boundary, to remove a blocking artifact from a reconstructed video. When necessary, the deblocking filter usually performs filtering on an output of the summator 62. In addition to the deblocking filter, an additional loop filter (in or after a loop) may also be used.

As shown in FIG. 2, the video encoder 20 receives video data, and the partitioning unit 35 partitions the data into video blocks. Such partitioning may further include partitioning into slices, picture blocks, or other larger units, and video block partitioning based on quadtree structures of an LCU and a CU. For example, the video encoder 20 is a component for encoding a video block in a to-be-encoded video slice. Usually, one slice may be partitioned into a plurality of video blocks (and may be partitioned into sets of video blocks that are referred to as picture blocks).

The prediction unit 41 may select one of a plurality of possible decoding modes, for example, one of a plurality of intra decoding modes or one of a plurality of inter decoding modes, for a current video block based on encoding quality and a cost calculation result (for example, a rate-distortion cost (rate distortion cost, RDcost)). The prediction unit 41 may provide an obtained intra-decoded or inter-decoded block to the summator 50 to generate residual block data, and provide the obtained intra-decoded or inter-decoded block to the summator 62 to reconstruct an encoded block and use the reconstructed encoded block as a reference picture.

The motion estimation unit 42 and the motion compensation unit 44 in the prediction unit 41 perform inter prediction decoding on the current video block relative to one or more prediction blocks of one or more reference pictures, to provide temporal compression. The motion estimation unit 42 may be configured to determine an inter prediction mode for the video slice based on a preset mode of the video sequence. In the preset mode, the video slice in the sequence may be specified as a P slice, a B slice, or a GPB slice. The motion estimation unit 42 and the motion compensation unit 44 may be highly integrated, but are described separately to explain concepts. Motion estimation performed by the motion estimation unit 42 is a process of generating a motion vector for estimating the video block. For example, the motion vector may indicate a displacement of a PU of a video block of a current video frame or picture relative to a prediction block of a reference picture.

The prediction block is a block of a PU that is found, based on a pixel difference, to be closely matched with a to-be-decoded video block, and the pixel difference may be determined by using a sum of absolute differences (SAD), a sum of squared differences (SSD), or another difference metric. In some feasible implementations, the video encoder 20 may calculate a value of a sub-integer pixel location of a reference picture stored in the reference picture storage 64. For example, the video encoder 20 may interpolate a value of a 1/4 pixel location, a 1/8 pixel location, or another fractional pixel location of the reference picture. Therefore, the motion estimation unit 42 may perform motion search with respect to a full pixel location and a fractional pixel location, and output a motion vector with fractional pixel precision.

The motion estimation unit 42 calculates a motion vector for the PU of the video block in the inter-decoded slice by comparing a location of the PU and a location of the prediction block of the reference picture. The reference picture may be selected from a first reference picture list (a list 0) or a second reference picture list (a list 1). Each list is used to identify one or more reference pictures stored in the reference picture storage 64. The motion estimation unit 42 sends the calculated motion vector to the entropy encoding unit 56 and the motion compensation unit 44.

Motion compensation performed by the motion compensation unit 44 may include extraction or generation of a prediction block based on the motion vector determined through motion estimation, and interpolation with sub-pixel level precision may be performed. After receiving the motion vector for the PU of the current video block, the motion compensation unit 44 may locate a prediction block to which the motion vector points in one reference picture list. The video encoder 20 subtracts a pixel value of the prediction block from a pixel value of the current video block that is being decoded to obtain a residual video block, to obtain the pixel difference. The pixel difference constitutes residual data of the block, and may include both a luma difference component and a chroma difference component. The summator 50 is one or more components that perform the subtraction operation. The motion compensation unit 44 may further generate a syntax element associated with the video block and the video slice, so that the video decoder 30 decodes the video block in the video slice.

If the PU is located in the B slice, a picture including the PU may be associated with the two reference picture lists referred to as the "list 0" and the "list 1". In some feasible implementations, the picture including the B slice may be associated with a list combination of the list 0 and the list 1.

In addition, if the PU is located in the B slice, the motion estimation unit 42 may perform unidirectional prediction or bidirectional prediction on the PU. In some feasible implementations, bidirectional prediction is prediction separately performed based on pictures in the reference picture list 0 and the reference picture list 1. In some other feasible implementations, bidirectional prediction is prediction separately performed based on a reconstructed future frame and a reconstructed past frame that are of a current frame in a display order. When the motion estimation unit 42 performs unidirectional prediction on the PU, the motion estimation unit 42 may search the reference picture in the list 0 or the list 1 for a reference block for the PU. Then, the motion estimation unit 42 may generate a reference index indicating a reference picture including the reference block in the list 0 or the list 1, and a motion vector indicating a spatial displacement between the PU and the reference block. The motion estimation unit 42 may output the reference index, a prediction direction identifier, and the motion vector as motion information for the PU. The prediction direction identifier may indicate that the reference index indicates the reference picture in the list 0 or the list 1. The motion compensation unit 44 may generate a prediction picture block for the PU based on the reference block indicated by the motion information for the PU.

When the motion estimation unit 42 performs bidirectional prediction on the PU, the motion estimation unit 42 may search the reference picture in the list 0 for a reference block for the PU, and may further search the reference picture in the list 1 for another reference block for the PU. Then, the motion estimation unit 42 may generate reference indexes indicating reference pictures including the reference blocks in the list 0 and the list 1, and motion vectors indicating spatial displacements between the reference blocks and the PU. The motion estimation unit 42 may output the reference indexes and the motion vectors for the PU as motion information for the PU. The motion compensation unit 44 may generate a prediction picture block for the PU based on the reference blocks indicated by the motion information for the PU.

In some embodiments, the motion estimation unit 42 does not output a complete set of the motion information for the PU to the entropy encoding unit 56. Instead, the motion estimation unit 42 may signal the motion information for the PU with reference to motion information for another PU. For example, the motion estimation unit 42 may determine that the motion information for the PU is similar to motion information for a neighboring PU. In this implementation, the motion estimation unit 42 may indicate an indicator value in a syntax structure associated with the PU, and the indicator value indicates, to the video decoder 30, that the motion information for the PU is the same as the motion information for the neighboring PU, or may be derived from the motion information for the neighboring PU. In another implementation, the motion estimation unit 42 may identify, in the syntax structure associated with the PU, a candidate predicted motion vector and a motion vector difference (MVD) that are associated with the neighboring PU. The MVD indicates a difference between the motion vector for the PU and the indicated candidate predicted motion vector associated with the neighboring PU. The video decoder 30 may determine the motion vector for the PU by using the indicated candidate predicted motion vector and the MVD.

As described above, the prediction unit 41 may generate a candidate predicted motion vector list for each PU of a CU. One or more candidate predicted motion vector lists may include one or more original candidate predicted motion vectors and one or more additional candidate predicted motion vectors derived from the one or more original candidate predicted motion vectors.

It should be noted that, in this embodiment of this application, when establishing the candidate predicted motion vector list in the merge mode, the prediction unit 41 may store a motion vector for a reference PU of the to-be-processed PU in the candidate predicted motion vector list, the motion vector for the reference PU may be an unupdated initial motion vector for the reference PU, or may be an updated final motion vector for the reference PU. The updated final motion vector for the reference PU may be obtained based on a motion vector stored in the target storage space. When the target storage space stores an MVD, the final motion vector for the reference PU may be obtained by adding the initial motion vector for the reference PU and the MVD stored in the target storage space. When the target storage space stores the final motion vector for the reference PU, the final motion vector for the reference PU may be directly obtained from the target storage space. The motion vector for the reference PU may be stored in the candidate predicted motion vector list in the following manner: When the reference PU and the current PU are in a same CTB or CTB row range, the unupdated initial motion vector for the reference unit is stored in the candidate predicted motion vector list; or when the reference PU and the current PU are not in a same CTB or CTB row range, the updated final motion vector for the reference unit is stored in the candidate predicted motion vector list.

The intra prediction unit 46 in the prediction unit 41 may perform intra prediction decoding on the current video block relative to one or more neighboring blocks that are in a same picture or slice as the to-be-decoded current block, to provide spatial compression. Therefore, as an alternative of inter prediction (as described above) performed by the motion estimation unit 42 and the motion compensation unit 44, the intra prediction unit 46 may perform intra prediction on the current block. Specifically, the intra prediction unit 46 may determine an intra prediction mode for encoding the current block. In some embodiments, the intra prediction unit 46 may (for example) use various intra prediction modes to encode the current block during separate encoding traversal, and the intra prediction unit 46 (or a mode selection unit 40 in some feasible implementations) may select an appropriate intra prediction mode from test modes.

After the prediction unit 41 generates a prediction block of the current video block through inter prediction or intra prediction, the video encoder 20 subtracts the prediction block from the current video block, to obtain a residual video block. Residual video data in the residual block may be included in one or more TUS, and applied to the transform unit 52. The transform unit 52 transforms the residual video data into residual transform coefficients by performing transform such as discrete cosine transform (DCT) or conceptually similar transform (for example, discrete sine transform (DST)). The transform unit 52 may transform the residual video data from pixel domain to transform domain (for example, frequency domain).

The transform unit 52 may send the obtained transform coefficients to the quantization unit 54. The quantization unit 54 quantizes the transform coefficients to further reduce a bit rate. The quantization process can reduce a bit depth associated with some or all of the coefficients. A quantization degree may be modified by adjusting a quantization parameter. In some feasible implementations, the quantization unit 54 then may scan a matrix including a quantized transform coefficient. Alternatively, the entropy encoding unit 56 may perform scanning.

After quantization, the entropy encoding unit 56 may entropy-encode the quantized transform coefficient. For example, the entropy encoding unit 56 may perform context-adaptive variable-length coding (CAVLC), context-adaptive binary arithmetic coding (CABAC), probability interval partitioning entropy (PIPE) coding, or another entropy coding method or technology. The entropy encoding unit 56 may further entropy-encode a motion vector and another syntax element of a current video slice that is being decoded. After being entropy-encoded by the entropy encoding unit 56, an encoded bitstream may be transmitted to the video decoder 30 or recorded for subsequent transmission or retrieval by the video decoder 30.

The entropy encoding unit 56 may encode information indicating the selected intra prediction mode according to the technologies in this application. The video encoder 20 may include, in transmitted bitstream configuration data that may include a plurality of intra prediction mode index tables and a plurality of modified intra prediction mode index tables (also referred to as codeword mapping tables), definitions of encoding contexts of various blocks, and indications of a most probable mode (MPM), an intra prediction mode index table, and a modified intra prediction mode index table that are used for each of the contexts.

The inverse quantization unit 58 and the inverse transform unit 60 respectively perform inverse quantization and inverse transform, to reconstruct the residual block in pixel domain that is subsequently used as a reference block of the reference picture. The motion compensation unit 44 may calculate the reference block by adding the residual block and a prediction block of one reference picture in one reference picture list. The motion compensation unit 44 may also apply one or more interpolation filters to a reconstructed residual block, to calculate a sub-integer pixel value for motion estimation. The summator 62 adds the reconstructed residual block and the motion compensated predictive block generated by the motion compensation unit 44 to generate a reference block that is stored in the reference picture storage 64. The reference block may be used by the motion estimation unit 42 and the motion compensation unit 44 as a reference block for performing inter prediction on a block in a subsequent video frame or picture.

Figure 3:
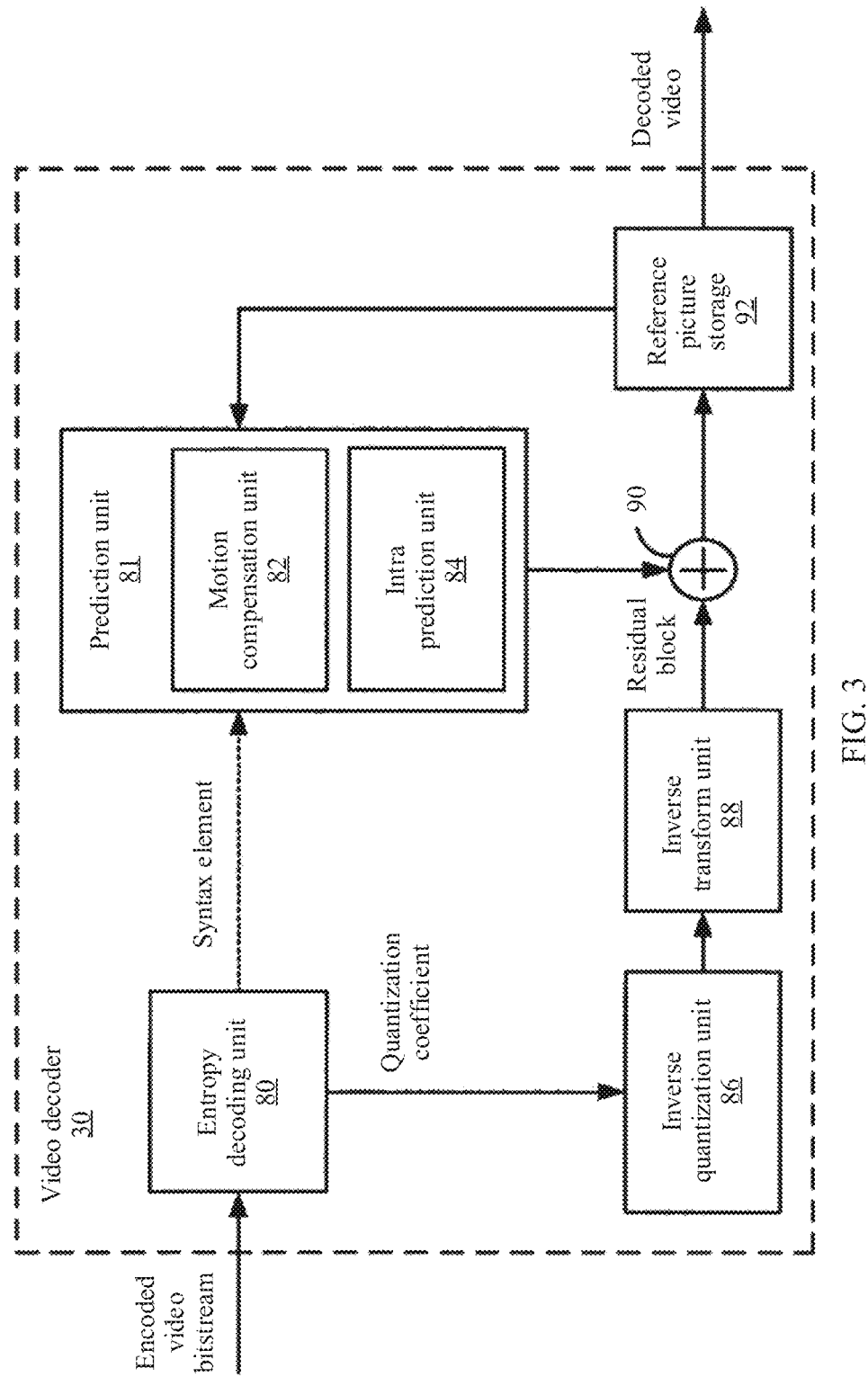
FIG. 3 is a system block diagram of an example of a video decoder that may be configured for use in an embodiment of this application.

FIG. 3 is a schematic block diagram of a video decoder 30 according to an embodiment of this application. In a feasible implementation of FIG. 3, the video decoder 30 includes an entropy decoding unit 80, a prediction unit 81, an inverse quantization unit 86, an inverse transform unit 88, a summator 90, and a reference picture storage 92.

The reference picture storage 92 may be configured to provide target storage space. The target storage space is used to store an MVD, that is, is used to store a difference between a final motion vector and an initial motion vector. In some embodiments, the target storage space is used to store a final motion vector. In this embodiment of this application, an updated final motion vector or the MVD that is stored in the target storage space may be used in an encoding process of another PU. For example, in a decoding process in a merge mode, an unupdated initial motion vector and an updated final motion vector are separately stored at different times. Therefore, when a to-be-processed PU needs to obtain a predicted motion vector for another PU, under a specific condition, the to-be-processed PU may directly use an unupdated initial motion vector for the another PU as the motion vector for the another PU, and does not need to obtain a motion vector for another block after the motion vector for the another PU is updated.

It should be noted that the target storage space may be provided by a memory other than the reference picture storage 92, for example, a newly added memory. This is not limited in this embodiment of this application.

It should be noted that, in a related technology, when the video decoder 30 works in the merge mode, content in the target storage space is empty, or is a zero vector, that is, when the video decoder 30 works in the merge mode, the target storage space is not used during decoding, and during decoding, the predicted motion vector for the another PU that is obtained by the to-be-processed PU is an updated final motion vector for the another PU. Therefore, the to-be-processed PU can obtain the predicted motion vector for the another PU only after the predicted motion vector for the another PU is updated, and consequently a decoding delay occurs during decoding. However, when the video decoder 30 works in a non-merge mode, the target storage space may be used. For example, in an AMVP mode, the video decoder 30 may obtain an MVD for a to-be-processed PU through decoding, so that the video decoder 30 can obtain a final motion vector for the to-be-processed PU based on the initial motion vector and the MVD for the to-be-processed PU.

The prediction unit 81 includes a motion compensation unit 82 and an intra prediction unit 84. In some feasible implementations, the video decoder 30 may perform an example decoding process inverse to the encoding process described with respect to the video encoder 20 in FIG. 4.

During decoding, the video decoder 30 receives, from the video encoder 20, an encoded video bitstream that represents a video block of an encoded video slice and associated syntax elements. The entropy decoding unit 80 of the video decoder 30 entropy decodes the bitstream to generate a quantized coefficient, a motion vector, and other syntax elements. The entropy decoding unit 80 transfers the motion vector and the other syntax elements to the prediction unit 81. The video decoder 30 may receive the syntax elements at a video slice level and/or a video block level.

When the video slice is decoded into an intra-decoded (I) slice, the intra prediction unit 84 of the prediction unit 81 may generate prediction data of the video block of the current video slice based on a signaled intra prediction mode and data of a previously decoded block of a current frame or picture.

When the video picture is decoded into an inter-decoded slice (for example, a B slice, a P slice, or a GPB slice), the motion compensation unit 82 of the prediction unit 81 generates a prediction block of the video block of the current video picture based on the motion vector and the other syntax elements that are received from the entropy decoding unit 80. The prediction block may be generated from one reference picture in one reference picture list. The video decoder 30 may use a default construction technology to construct reference picture lists (a list 0 and a list 1) based on a reference picture stored in the reference picture storage 92.

The motion compensation unit 82 determines prediction information of the video block of the current video slice by parsing the motion vector and the other syntax elements, and uses the prediction information to generate the prediction block of the video block that is being decoded. For example, the motion compensation unit 82 uses some of the received syntax elements to determine a prediction (for example, intra prediction or inter prediction) mode for decoding the video block of the video slice, an inter prediction slice type (for example, the B slice, the P slice, or the GPB slice), construction information of one or more reference picture lists of the slice, a motion vector for each inter encoded video block of the slice, an inter prediction status of each inter-decoded video block of the slice, and other information for decoding the video block in the current video slice.

The motion compensation unit 82 may further perform interpolation by using an interpolation filter. The motion compensation unit 82 may use, for example, an interpolation filter used by the video encoder 20 during video block encoding, to calculate an interpolation value of a sub-integer pixel of a reference block. In this application, the motion compensation unit 82 may determine, based on the received syntax elements, the interpolation filter used by the video encoder 20, and use the interpolation filter to generate the prediction block.

If a PU is encoded through inter prediction, the motion compensation unit 82 may generate a candidate predicted motion vector list for the PU. The bitstream may include data for identifying a location of a selected candidate predicted motion vector in the candidate predicted motion vector list for the PU. After generating the candidate predicted motion vector for the PU, the motion compensation unit 82 may generate a prediction picture block for the PU based on one or more reference blocks indicated by motion information for the PU. The reference block for the PU may be located in a temporal picture different from a temporal picture of the PU. The motion compensation unit 82 may determine the motion information for the PU based on selected motion information in the candidate predicted motion vector list for the PU.

It should be noted that, in this embodiment of this application, when establishing the candidate predicted motion vector list in the merge mode, the motion compensation unit 82 may store a predicted motion vector for a reference PU of the to-be-processed PU in the candidate predicted motion vector list, the predicted motion vector for the reference PU may be an unupdated initial motion vector for the reference PU, or may be an updated final motion vector for the reference PU. The updated final motion vector for the reference PU may be obtained based on a motion vector for the reference PU that is stored in the target storage space. For example, when the target storage space stores an MVD, the final motion vector for the reference PU may be obtained by adding the initial motion vector for the reference PU and the MVD stored in the target storage space. When the target storage space stores the final motion vector for the reference PU, the final motion vector for the reference PU may be directly obtained from the target storage space. The predicted motion vector for the reference PU may be stored in the candidate predicted motion vector list in the following manner: When the reference PU and the current PU are in a same CTB or CTB row range, the unupdated initial motion vector for the reference unit is stored in the candidate predicted motion vector list; or when the reference PU and the current PU are not in a same CTB or CTB row range, the updated final motion vector for the reference unit is stored in the candidate predicted motion vector list.

The inverse quantization unit 86 performs inverse quantization (for example, dequantization) on a quantized transform coefficient that is provided in the bitstream and decoded by the entropy decoding unit 80. The inverse quantization process may include: determining a quantization degree based on a quantization parameter calculated by the video encoder 20 for each video block in the video slice, and similarly determining a to-be-applied inverse quantization degree. The inverse transform unit 88 performs inverse transform (for example, inverse DCT, inverse integer transform, or a conceptually similar inverse transform process) on the transform coefficient to generate a residual block in pixel domain.

After the motion compensation unit 82 generates the prediction block of the current video block based on the motion vector and the other syntax elements, the video decoder 30 performs a summation operation on the residual block from the inverse transform unit 88 and the corresponding prediction block generated by the motion compensation unit 82, to form the decoded video block. The summator 90 is one or more components that perform the summation operation. When necessary, a deblocking filter may be used to perform filtering on the decoded block to remove a blocking artifact. Another loop filter (in or after a decoding loop) may also be used to smoothen pixels, or video quality may be improved in another manner. Then, a decoded video block in a given frame or picture is stored in the reference picture storage 92. The reference picture storage 92 stores a reference picture used for subsequent motion compensation. The reference picture storage 92 also stores the decoded video to be subsequently presented on a display apparatus such as the display apparatus 32 in FIG. 1.

As described above, the technologies in this application relate to, for example, inter decoding. It should be understood that the technologies in this application may be performed by any video decoder described in this application, and the video decoder includes (for example) the video encoder 20 and the video decoder 30 shown and described in FIG. 1 to FIG. 3. To be specific, in a feasible implementation, the prediction unit 41 described in FIG. 2 may perform a specific technology described below when inter prediction is performed during encoding of a block of video data. In another feasible implementation, the prediction unit 81 described in FIG. 3 may perform a specific technology described below when inter prediction is performed during decoding of a block of video data. Therefore, a reference to a general "video encoder" or "video decoder" may include the video encoder 20, the video decoder 30, or another video encoding or encoding unit.

Figure 4:
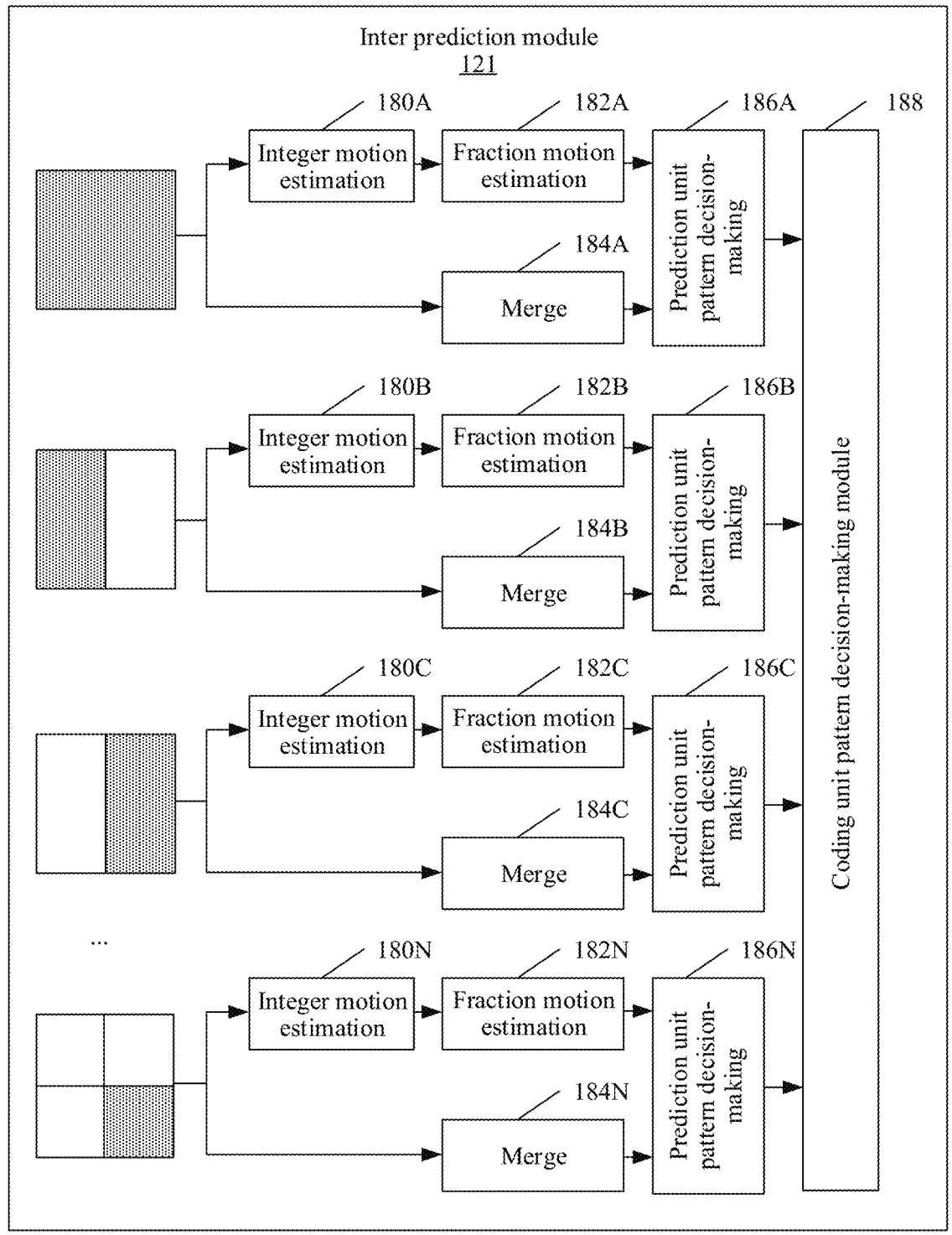
FIG. 4 is a schematic block diagram of an example of an inter prediction module that may be configured for use in an embodiment of this application.

FIG. 4 is a schematic block diagram of an inter prediction module according to an embodiment of this application. The inter prediction module 121 may include, for example, a motion estimation unit 42 and a motion compensation unit 44. A relationship between a PU and a CU varies with a video compression coding standard. The inter prediction module 121 may partition a current CU into PUs according to a plurality of partitioning patterns. For example, the inter prediction module 121 may partition the current CU into the PUs according to 2N×2N, 2N×N, N×2N, and N×N partitioning patterns. In another embodiment, the current CU is a current PU. This is not limited.

The inter prediction module 121 may perform integer motion estimation (IME) and then fraction motion estimation (FME) on each PU. When the inter prediction module 121 performs IME on the PU, the inter prediction module 121 may search one or more reference pictures for a reference block for the PU. After finding the reference block for the PU, the inter prediction module 121 may generate a motion vector that indicates a spatial displacement between the PU and the reference block for the PU with integer precision. When the inter prediction module 121 performs FME on the PU, the inter prediction module 121 may improve the motion vector generated by performing IME on the PU. The motion vector generated by performing FME on the PU may have sub-integer precision (for example, 1/2 pixel precision or 1/4 pixel precision). After generating the motion vector for the PU, the inter prediction module 121 may generate a prediction picture block for the PU by using the motion vector for the PU.

In some embodiments in which the inter prediction module 121 signals motion information for the PU to a decoder in an AMVP mode, the inter prediction module 121 may generate a candidate predicted motion vector list for the PU. The candidate predicted motion vector list may include one or more original candidate predicted motion vectors and one or more additional candidate predicted motion vectors derived from the one or more original candidate predicted motion vectors. After generating the candidate predicted motion vector list for the PU, the inter prediction module 121 may select a candidate predicted motion vector from the candidate predicted motion vector list and generate a motion vector difference (MVD) for the PU. The MVD for the PU may indicate a difference between a motion vector indicated by the selected candidate predicted motion vector and the motion vector generated for the PU through IME and FME. In these feasible implementations, the inter prediction module 121 may output a candidate predicted motion vector index identifying a location of the selected candidate predicted motion vector in the candidate predicted motion vector list. The inter prediction module 121 may further output the MVD for the PU. The following describes in detail a feasible implementation of an advanced motion vector prediction (AMVP) mode in FIG. 11 in the embodiments of this application.

In addition to performing IME and FME on the PU to generate the motion information for the PU, the inter prediction module 121 may further perform a merge operation on the PU. When the inter prediction module 121 performs the merge operation on the PU, the inter prediction module 121 may generate a candidate predicted motion vector list for the PU. The candidate predicted motion vector list for the PU may include one or more original candidate predicted motion vectors and one or more additional candidate predicted motion vectors derived from the one or more original candidate predicted motion vectors. The one or more original candidate predicted motion vectors in the candidate predicted motion vector list may include one or more spatial candidate predicted motion vectors and temporal candidate predicted motion vectors. The spatial candidate predicted motion vector may indicate motion information for another PU in a current picture. The temporal candidate predicted motion vector may be based on motion information for a corresponding PU in a picture different from the current picture. The temporal candidate predicted motion vector may also be referred to as a temporal motion vector predictor (temporal motion vector predictor, TMVP).

Figure 10:
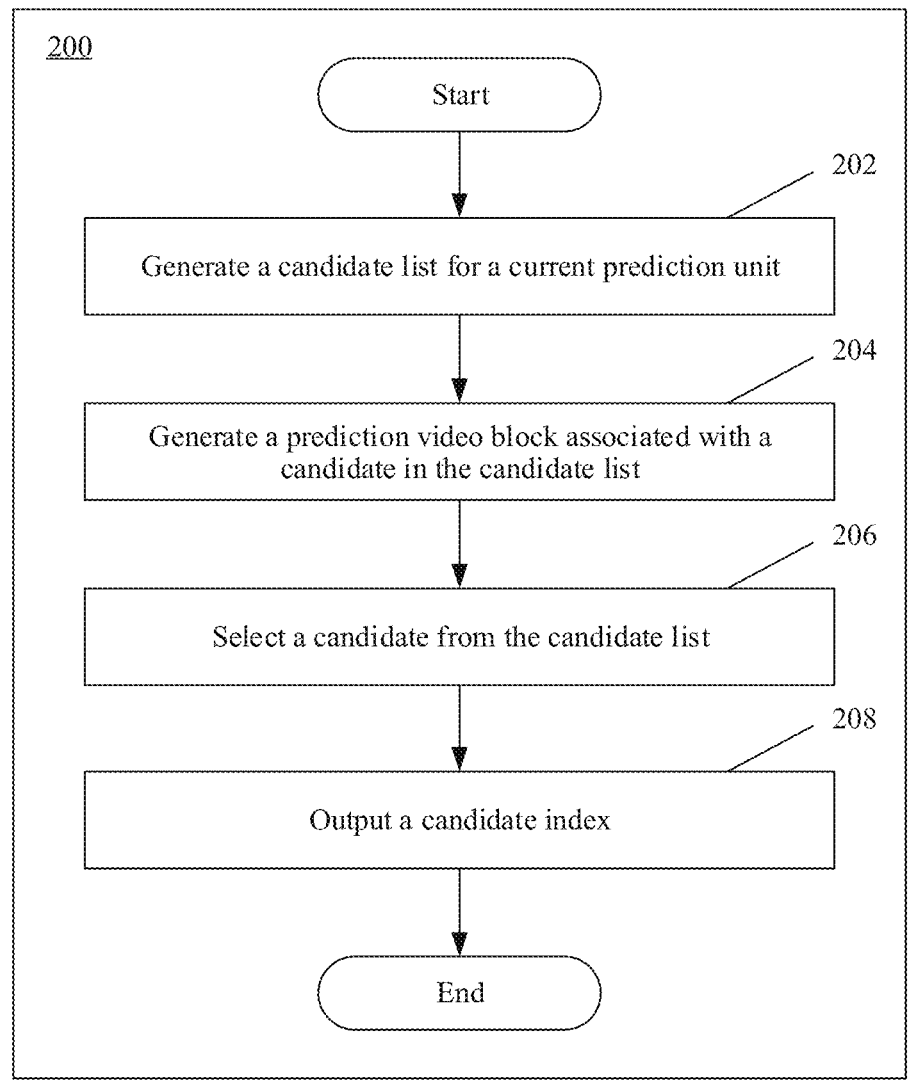
FIG. 10 is a flowchart of an example implementation of a merge prediction mode.

After generating the candidate predicted motion vector list, the inter prediction module 121 may select one candidate predicted motion vector from the candidate predicted motion vector list. Then, the inter prediction module 121 may generate a prediction picture block for the PU based on a reference block indicated by the motion information for the PU. In the merge mode, the motion information for the PU may be the same as motion information indicated by the selected candidate predicted motion vector. FIG. 10 described below is a flowchart of an example of the merge mode.

After generating the prediction picture block for the PU through IME and FME and generating the prediction picture block for the PU through the merge operation, the inter prediction module 121 may select the prediction picture block generated by performing the FME operation or the prediction picture block generated by performing the merge operation. In some feasible implementations, the inter prediction module 121 may select the prediction picture block for the PU by analyzing rate-distortion costs of the prediction picture block generated by performing the FME operation and the prediction picture block generated by performing the merge operation.

After the inter prediction module 121 selects a prediction picture block for a PU generated by partitioning the current CU according to each partitioning pattern (in some implementations, after a coding tree unit CTU is partitioned into CUs, the CU is not further partitioned into smaller PUs, and in this case, the PU is equivalent to the CU), the inter prediction module 121 may select a partitioning pattern for the current CU. In some implementations, the inter prediction module 121 may select the partitioning pattern for the current CU by analyzing a rate-distortion cost of the selected prediction picture block of the PU generated by partitioning the current CU according to each partitioning pattern. The inter prediction module 121 may output a prediction picture block associated with a PU that belongs to the selected partitioning pattern to a residual generation module 102. The inter prediction module 121 may output a syntax element of motion information for the PU that belongs to the selected partitioning pattern to an entropy encoding module 116.

In the schematic diagram shown in FIG. 4, the inter prediction module 121 includes IME modules 180A to 180N (collectively referred to as an "IME module 180"), FME modules 182A to 182N (collectively referred to as an "FME module 182"), merge modules 184A to 184N (collectively referred to as a "merge module 184"), PU pattern decision-making modules 186A to 186N (collectively referred to as a "PU pattern decision-making module 186"), and a CU pattern decision-making module 188 (and may further perform a CTU-to-CU pattern decision-making process).

The IME module 180, the FME module 182, and the merge module 184 may respectively perform an IME operation, an FME operation, and a merge operation on the PU of the current CU. In the schematic diagram shown in FIG. 4, the inter prediction module 121 is described as including a separate IME module 180, a separate FME module 182, and a separate merge module 184 for each PU in each partitioning pattern for the CU. In another feasible implementation, the inter prediction module 121 includes no separate IME module 180, no separate FME module 182, or no separate merge module 184 for each PU in each partitioning pattern of the CU.

As illustrated in the schematic diagram in FIG. 4, the IME module 180A, the FME module 182A, and the merge module 184A may respectively perform an IME operation, an FME operation, and a merge operation on a PU generated by partitioning the CU according to the 2N×2N partitioning pattern. The PU mode decision-making module 186A may select one of prediction picture blocks generated by the IME module 180A, the FME module 182A, and the merge module 184A.

The IME module 180B, the FME module 182B, and the merge module 184B may respectively perform an IME operation, an FME operation, and a merge operation on a left PU generated by partitioning the CU according to the N×2N partitioning pattern. The PU mode decision-making module 186B may select one of prediction picture blocks generated by the IME module 180B, the FME module 182B, and the merge module 184B.

The IME module 180C, the FME module 182C, and the merge module 184C may respectively perform an IME operation, an FME operation, and a merge operation on a right PU generated by partitioning the CU according to the N×2N partitioning pattern. The PU mode decision-making module 186C may select one of prediction picture blocks generated by the IME module 180C, the FME module 182C, and the merge module 184C.

The IME module 180N, the FME module 182N, and the merge module 184 may respectively perform an IME operation, an FME operation, and a merge operation on a bottom-right PU generated by partitioning the CU according to the N×N partitioning pattern. The PU mode decision-making module 186N may select one of prediction picture blocks generated by the IME module 180N, the FME module 182N, and the merge module 184N.

The PU pattern decision-making module 186 may select a prediction picture block by analyzing rate-distortion costs of a plurality of possible prediction picture blocks, and select a prediction picture block that provides an optimal rate-distortion cost in a given decoding scenario. For example, for an application with limited bandwidth, the PU mode decision-making module 186 may prefer a prediction picture block for which a compression ratio is increased, and for another application, the PU mode decision-making module 186 may prefer a prediction picture block for which quality of a reconstructed video is improved. After the PU pattern decision-making module 186 selects prediction picture blocks for the PUs of the current CU, the CU pattern decision-making module 188 selects the partitioning pattern for the current CU and outputs the prediction picture block and motion information for the PU that belongs to the selected partitioning pattern.

Figure 5:
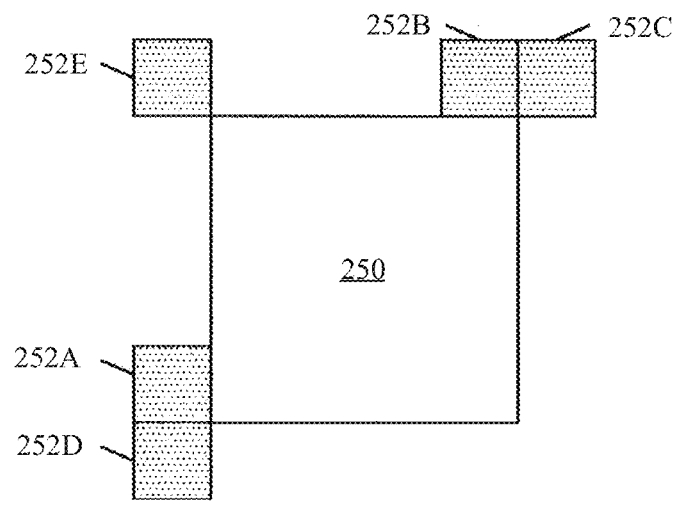
FIG. 5 is a schematic diagram of an example of a coding unit and a neighboring picture block associated with the coding unit.
Figure 8:
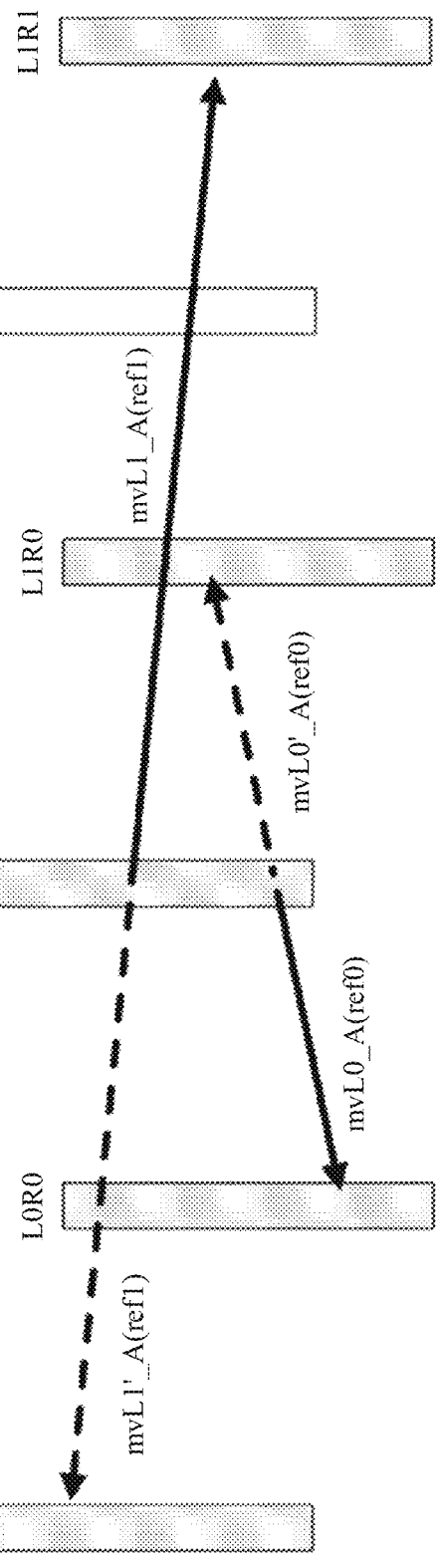
FIG. 8 is a schematic diagram of an example implementation of adding a scaled candidate motion vector to a merge-mode candidate predicted motion vector list.

FIG. 5 is a schematic diagram of an example of a coding unit and a neighboring picture block associated with the coding unit according to an embodiment of this application, and is a schematic diagram for illustrating a CU 250 and example candidate predicted motion vector locations 252A to 252E associated with the CU 250. In this application, the candidate predicted motion vector locations 252A to 252E may be collectively referred to as a candidate predicted motion vector location 252. The candidate predicted motion vector location 252 represents a spatial candidate predicted motion vector that is in a same picture as the CU 250. The candidate predicted motion vector location 252A is on the left of the CU 250. The candidate predicted motion vector location 252B is on the top of the CU 250. The candidate predicted motion vector location 252C is on the top right of the CU 250. The candidate predicted motion vector location 252D is on the bottom left of the CU 250. The candidate predicted motion vector location 252E is on the top left of the CU 250. FIG. 8 shows an example implementation of a manner in which an inter prediction module 121 and a motion compensation module 162 may generate candidate predicted motion vector lists. In the following, the implementation is explained with reference to the inter prediction module 121. However, it should be understood that the motion compensation module 162 may implement a same technology, and therefore generate a same candidate predicted motion vector list. In this embodiment of this application, a picture block in which a candidate predicted motion vector location is located is referred to as a reference block. In addition, the reference block includes a spatial reference block, for example, picture blocks in which 252A to 252E are located, and also includes a temporal reference block, for example, a picture block in which a co-located (co-located) block is located, or a spatially neighboring picture block of a co-located block.

Figure 6:
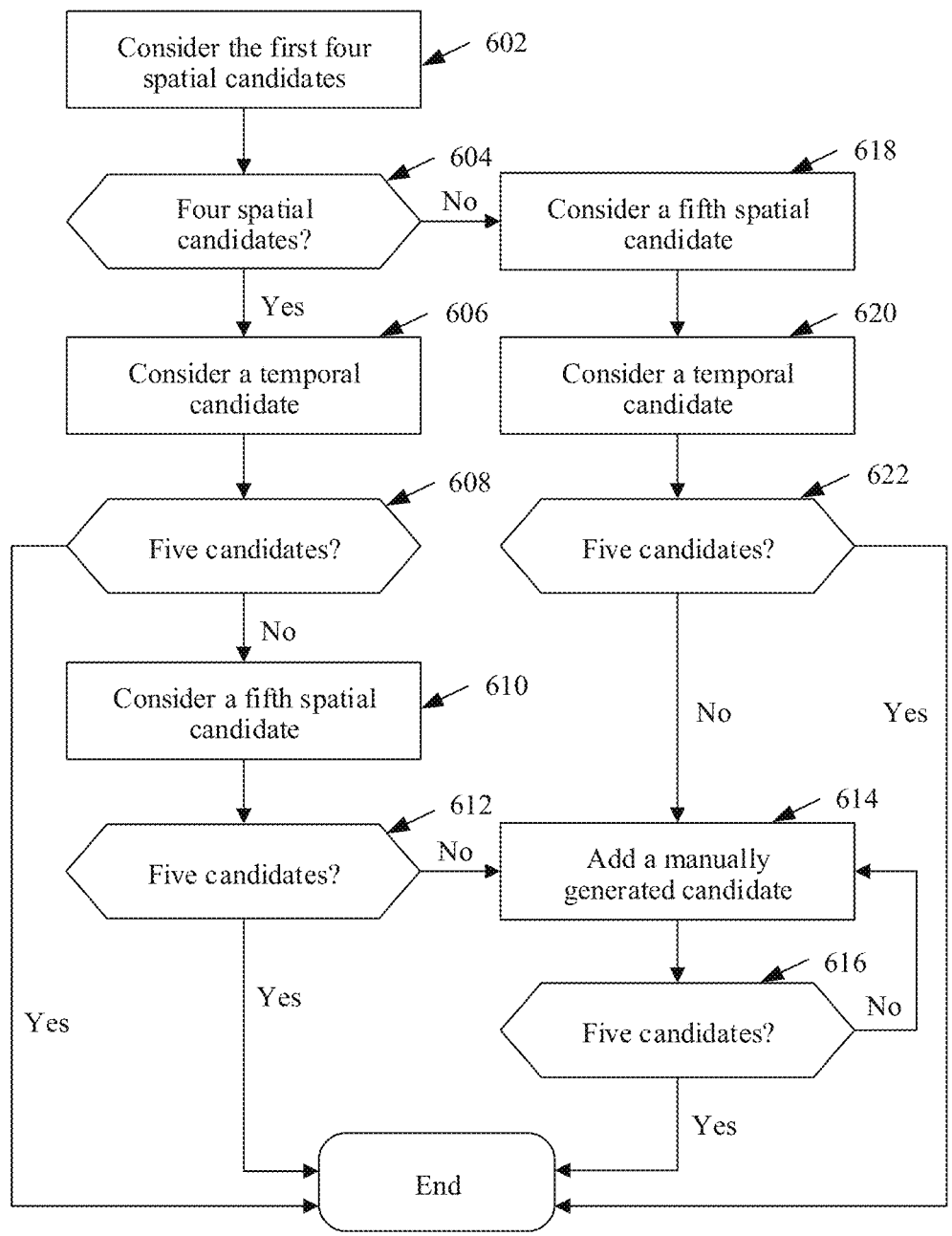
FIG. 6 is a flowchart of an example implementation of constructing a candidate predicted motion vector list.

FIG. 6 is an example flowchart of constructing a candidate predicted motion vector list according to an embodiment of this application. A technology in FIG. 6 is described based on a list including five candidate predicted motion vectors, but the technologies described in this specification may alternatively be used with a list with another size. The five candidate predicted motion vectors each may have an index (for example, 0 to 4). The technology in FIG. 6 is described based on a general video decoder. The general video decoder may be, for example, a video encoder (for example, the video encoder 20) or a video decoder (for example, the video decoder 30).

To reconstruct the candidate predicted motion vector list according to the implementation of FIG. 6, the video decoder first considers four spatial candidates (602), each spatial candidate corresponds to one predicted motion vector, and the four spatial candidate predicted motion vectors may include candidate predicted motion vector locations 252A, 252B, 252C and 252D. The four spatial candidate predicted motion vectors correspond to motion information for four PUs that are in a same picture as a current CU (for example, a CU 250). In other words, the four spatial candidate predicted motion vectors are predicted motion vectors for the four PUs. In this embodiment of this application, when obtaining the four spatial candidate predicted motion vectors, the video decoder first needs to perform determining on the four PUs. For example, a process in which the video decoder performs determining on one of the four PUs may be the following process: When the PU and the current CU are in a same CTB or CTB row range, an unupdated initial motion vector for the PU is used as a spatial candidate predicted motion vector corresponding to the PU; or when the PU and the current CU are not in a same CTB or CTB row range, an updated final motion vector for the PU is used as a spatial candidate predicted motion vector corresponding to the PU. The updated final motion vector for the PU may be obtained from target storage space in which the PU is stored. In this case, the target storage space stores the updated final motion vector. In some embodiments, the target storage space stores an MVD. In this case, the updated final motion vector for the PU may alternatively be obtained based on the unupdated initial motion vector for the PU and the MVD stored in the target storage space.

The video decoder may consider the four spatial candidate predicted motion vectors in the list in a specified order. For example, the candidate predicted motion vector location 252A may be first considered. If the candidate predicted motion vector location 252A is available, the candidate predicted motion vector location 252A may be assigned to an index 0. If the candidate predicted motion vector location 252A is unavailable, the video decoder may not add the candidate predicted motion vector location 252A to the candidate predicted motion vector list. A candidate predicted motion vector location may be unavailable for various reasons. For example, if the candidate predicted motion vector location is not in a current picture, the candidate predicted motion vector location may be unavailable. In another feasible implementation, if the candidate predicted motion vector location undergoes intra prediction, the candidate predicted motion vector location may be unavailable. In another feasible implementation, if the candidate predicted motion vector location is in a slice different from a slice corresponding to the current CU, the candidate predicted motion vector location may be unavailable.

After considering the candidate predicted motion vector location 252A, the video decoder may consider the candidate predicted motion vector location 252B. If the candidate predicted motion vector location 252B is available and different from the candidate predicted motion vector location 252A, the video decoder may add the candidate predicted motion vector location 252B to the candidate predicted motion vector list. In this specific context, the term "same" or "different" means that candidate predicted motion vector locations are associated with same or different motion information. Therefore, if two candidate predicted motion vector locations have same motion information, the two candidate predicted motion vector locations are considered to be the same; or if two candidate predicted motion vector locations have different motion information, the two candidate predicted motion vector locations are considered to be different. If the candidate predicted motion vector location 252A is unavailable, the video decoder may assign the candidate predicted motion vector location 252B to the index 0. If the candidate predicted motion vector location 252A is available, the video decoder may assign the candidate predicted motion vector location 252B to an index 1. If the candidate predicted motion vector location 252B is unavailable or is the same as the candidate predicted motion vector location 252A, the video decoder skips the candidate predicted motion vector location 252B and does not add the candidate predicted motion vector location 252B to the candidate predicted motion vector list.

Similarly, the video decoder considers the candidate predicted motion vector location 252C to determine whether to add the candidate predicted motion vector location 252C to the list. If the candidate predicted motion vector location 252C is available and different from the candidate predicted motion vector locations 252B and 252A, the video decoder may assign the candidate predicted motion vector location 252C to a next available index. If the candidate predicted motion vector location 252C is unavailable or is the same as at least one of the candidate predicted motion vector locations 252A and 252B, the video decoder does not add the candidate predicted motion vector location 252C to the candidate predicted motion vector list. Next, the video decoder considers the candidate predicted motion vector location 252D. If the candidate predicted motion vector location 252D is available and different from the candidate predicted motion vector locations 252A, 252B, and 252C, the video decoder may assign the candidate predicted motion vector location 252D to a next available index. If the candidate predicted motion vector location 252D is unavailable or is the same as at least one of the candidate predicted motion vector locations 252A, 252B, and 252C, the video decoder does not add the candidate predicted motion vector location 252D to the candidate predicted motion vector list. In the foregoing implementation, an example in which the candidate predicted motion vectors 252A to 252D are considered to determine whether the candidate predicted motion vectors 252A to 252D are added to the candidate predicted motion vector list is generally described. However, in some implementations, all of the candidate predicted motion vectors 252A to 252D may be first added to the candidate predicted motion vector list, and then a repeated candidate predicted motion vector location is removed from the candidate predicted motion vector list.

After the video decoder considers the first four spatial candidate predicted motion vectors, the candidate predicted motion vector list may include four spatial candidate predicted motion vectors, or the list may include fewer than four spatial candidate predicted motion vectors. If the list includes four spatial candidate predicted motion vectors (yes in 604), that is, includes four spatial candidates, the video decoder considers a temporal candidate (606), and each temporal candidate corresponds to one candidate predicted motion vector. The temporal candidate predicted motion vector may correspond to motion information for a co-located PU of a picture different from the current picture. If the temporal candidate predicted motion vector is available and different from the first four spatial candidate predicted motion vectors, the video decoder assigns the temporal candidate predicted motion vector to an index 4. If the temporal candidate predicted motion vector is unavailable or is the same as one of the first four spatial candidate predicted motion vectors, the video decoder does not add the temporal candidate predicted motion vector to the candidate predicted motion vector list. Therefore, after the video decoder considers the temporal candidate predicted motion vector (606), the candidate predicted motion vector list may include five candidate predicted motion vectors (the first four spatial candidate predicted motion vectors considered in 602 and the temporal candidate predicted motion vector considered in 604), or may include four candidate predicted motion vectors (the first four spatial candidate predicted motion vectors considered in 602). If the candidate predicted motion vector list includes five candidate predicted motion vectors (yes in 608), that is, includes five candidates, the video decoder completes construction of the list.

If the candidate predicted motion vector list includes four candidate predicted motion vectors (no in 608), the video decoder may consider a fifth spatial candidate predicted motion vector (610). The fifth spatial candidate predicted motion vector may (for example) correspond to a candidate predicted motion vector location 252E. If the candidate predicted motion vector corresponding to the location 252E is available and different from the candidate predicted motion vectors corresponding to the locations 252A, 252B, 252C, and 252D, the video decoder may add the fifth spatial candidate predicted motion vector to the candidate predicted motion vector list, and assign the fifth spatial candidate predicted motion vector to the index 4. If the candidate predicted motion vector corresponding to the location 252E is unavailable or is the same as one of the candidate predicted motion vectors corresponding to the candidate predicted motion vector locations 252A, 252B, 252C, and 252D, the video decoder may not add the candidate predicted motion vector corresponding to the location 252 to the candidate predicted motion vector list. Therefore, after the fifth spatial candidate predicted motion vector is considered (610), the list may include five candidate predicted motion vectors (the first four spatial candidate predicted motion vectors considered in 602 and the fifth spatial candidate predicted motion vector considered in 610), or may include four candidate predicted motion vectors (the first four spatial candidate predicted motion vectors considered in 602).

If the candidate predicted motion vector list includes five candidates (yes in 612), that is, includes five candidate predicted motion vectors, the video decoder completes generation of the candidate predicted motion vector list. If the candidate predicted motion vector list includes four candidate predicted motion vectors (no in 612), the video decoder adds a manually generated candidate predicted motion vector (614) until the list includes five candidates (yes in 616), that is, includes five candidate predicted motion vectors.

If the list includes fewer than four spatial candidate predicted motion vectors (no in 604) after the video decoder considers the first four spatial candidate predicted motion vectors, the video decoder may consider a fifth spatial candidate (618), that is, consider a fifth spatial candidate predicted motion vector. The fifth spatial candidate predicted motion vector may (for example) correspond to a candidate predicted motion vector location 252E. If the candidate predicted motion vector corresponding to the location 252E is available and different from the existing candidate predicted motion vectors in the candidate predicted motion vector list, the video decoder may add the fifth spatial candidate predicted motion vector to the candidate predicted motion vector list, and assign the fifth spatial candidate predicted motion vector to a next available index. If the candidate predicted motion vector corresponding to the location 252E is unavailable or is the same as one of the existing candidate predicted motion vectors in the candidate predicted motion vector list, the video decoder may not add the candidate predicted motion vector corresponding to the location 252E to the candidate predicted motion vector list. The video decoder may then consider a temporal candidate (620), that is, a temporal predicted motion vector. If the temporal candidate predicted motion vector is available and different from the existing candidate predicted motion vectors in the candidate predicted motion vector list, the video decoder may add the temporal candidate predicted motion vector to the candidate predicted motion vector list, and assign the temporal candidate predicted motion vector to a next available index. If the temporal candidate predicted motion vector is unavailable or is the same as one of the existing candidate predicted motion vectors in the candidate predicted motion vector list, the video decoder may not add the temporal candidate predicted motion vector to the candidate predicted motion vector list.

If the candidate predicted motion vector list includes five candidate predicted motion vectors (yes in 622) after the fifth spatial candidate predicted motion vector (in 618) and the temporal candidate predicted motion vector (in 620) are considered, the video decoder completes generation of the candidate predicted motion vector list. If the candidate predicted motion vector list includes fewer than five candidate predicted motion vectors (no in 622), the video decoder adds a manually generated candidate predicted motion vector (614) until the list includes five candidate predicted motion vectors (yes in 616).

According to the technologies in this application, an additional merge candidate predicted motion vector may be manually generated after a spatial candidate predicted motion vector and a temporal candidate predicted motion vector, so that a size of a merge candidate predicted motion vector list is always equal to a specified quantity of merge candidate predicted motion vectors (for example, five candidate predicted motion vectors in the feasible implementation of FIG. 6 above). The additional merge candidate predicted motion vector may include, for example, a combined bi-predictive merge candidate predicted motion vector (a candidate predicted motion vector 1), a scaled bi-predictive merge candidate predicted motion vector (a candidate predicted motion vector 2), and a zero-vector merge candidate predicted motion vector (a candidate predicted motion vector 3). For specific descriptions of the foregoing three cases of the additional merge candidate predicted motion vector, refer to FIG. 7 to FIG. 9.

Figure 7:
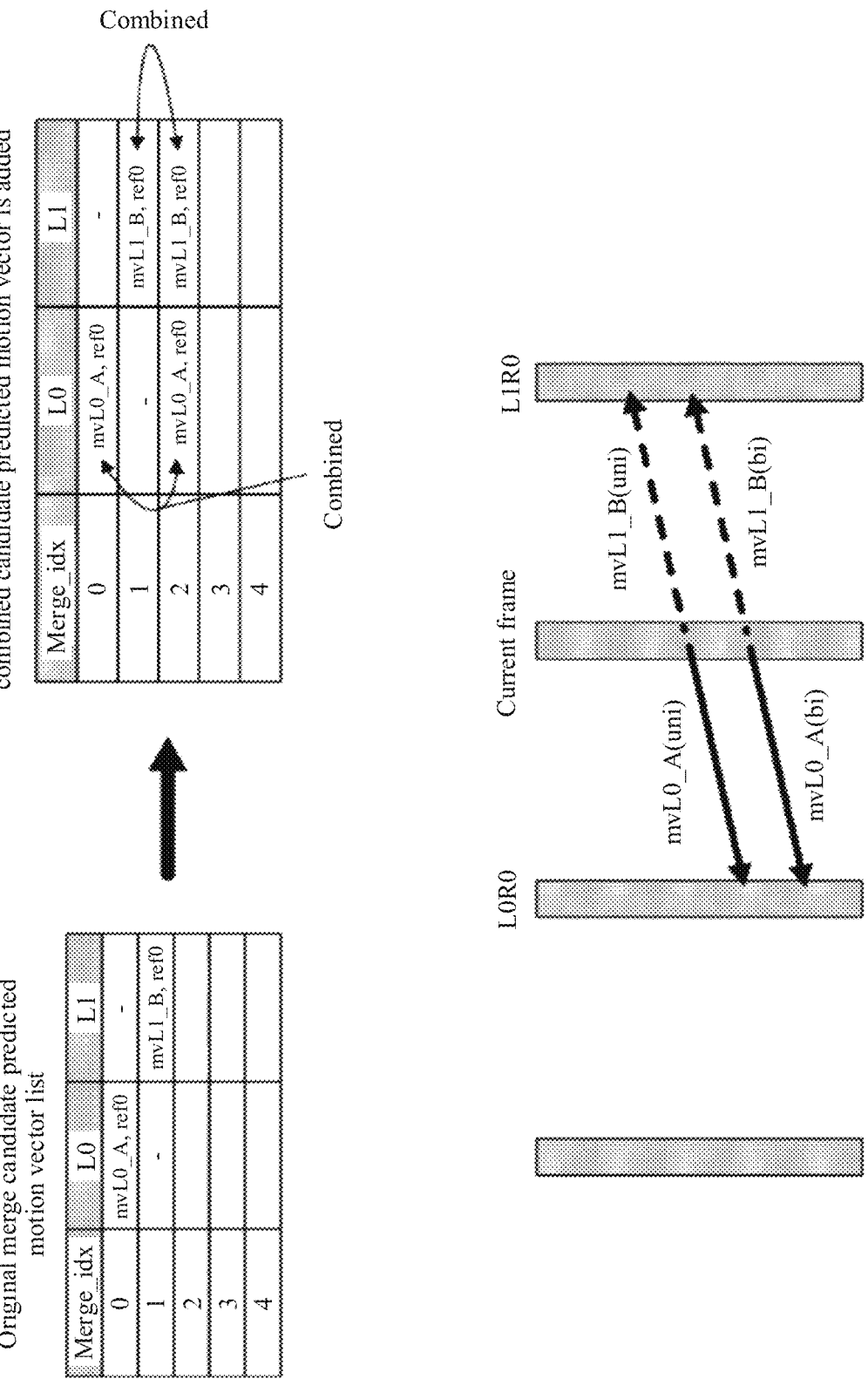
FIG. 7 is a schematic diagram of an example implementation of adding a combined candidate motion vector to a merge-mode candidate predicted motion vector list.

FIG. 7 is a schematic diagram of an example of adding a combined candidate motion vector to a merge-mode candidate predicted motion vector list according to an embodiment of this application. A combined bi-predictive merge candidate predicted motion vector may be generated by combining original merge candidate predicted motion vectors. Specifically, two original candidate predicted motion vectors (which have mvL0 and refIdxL0 or mvL1 and refIdxL1) may be used to generate the bi-predictive merge candidate predicted motion vector. In FIG. 7, two candidate predicted motion vectors are included in an original merge candidate predicted motion vector list. A prediction type of one candidate predicted motion vector is uni-prediction by using a list 0, and a prediction type of the other candidate predicted motion vector is uni-prediction by using a list 1. In this feasible implementation, mvL0_A and ref0 are taken from the list 0, and mvL1_B and ref0 are taken from the list 1. Then, a bi-predictive merge candidate predicted motion vector (which has mvL0_A and ref0 in the list 0 and mvL1_B and ref0 in the list 1) may be generated, and whether the bi-predictive merge candidate predicted motion vector is different from an existing candidate predicted motion vector in the candidate predicted motion vector list is checked. If the bi-predictive merge candidate predicted motion vector is different from the existing candidate predicted motion vector, a video decoder may add the bi-predictive merge candidate predicted motion vector to the candidate predicted motion vector list.

FIG. 8 is a schematic diagram of an example of adding a scaled candidate motion vector to a merge-mode candidate predicted motion vector list according to an embodiment of this application. A scaled bi-predictive merge candidate predicted motion vector may be generated by scaling an original merge candidate predicted motion vector. Specifically, one original candidate predicted motion vector (which has mvLX and refIdxLX) may be used to generate the bi-predictive merge candidate predicted motion vector. In a feasible implementation of FIG. 8, two candidate predicted motion vectors are included in an original merge candidate predicted motion vector list. A prediction type of one candidate predicted motion vector is uni-prediction by using a list 0, and a prediction type of the other candidate predicted motion vector is uni-prediction by using a list 1. In this feasible implementation, mvL0_A and ref0 may be obtained from the list 0, and ref0 may be copied to the list 1 and is denoted as a reference index ref0'. Then, mvL0'_A may be calculated by scaling mvL0_A with ref0 and ref0'. Scaling may depend on a POC (Picture Order Count, POC) distance. Next, a bi-predictive merge candidate predicted motion vector (which has mvL0_A and ref0 in the list 0 and mvL0'_A and ref0' in the list 1) may be generated, and whether the bi-predictive merge candidate predicted motion vector is repeated is checked. If the bi-predictive merge candidate predicted motion vector is not repeated, the bi-predictive merge candidate predicted motion vector may be added to the merge candidate predicted motion vector list.

Figure 9:
FIG. 9 is a schematic diagram of an example implementation of adding a zero motion vector to a merge-mode candidate predicted motion vector list.

FIG. 9 is a schematic diagram of an example of adding a zero motion vector to a merge-mode candidate predicted motion vector list according to an embodiment of this application. A zero-vector merge candidate predicted motion vector may be generated by combining a zero vector and a reference index that can be referenced. If the zero-vector candidate predicted motion vector is not repeated, the zero-vector candidate predicted motion vector may be added to a merge candidate predicted motion vector list. Motion information of each generated merge candidate predicted motion vector may be compared with motion information of a previous candidate predicted motion vector in the list.

In an embodiment, if a newly generated candidate predicted motion vector is different from an existing candidate predicted motion vector in the candidate predicted motion vector list, the generated candidate predicted motion vector is added to the merge candidate predicted motion vector list. A process of determining whether the candidate predicted motion vector is different from the existing candidate predicted motion vector in the candidate predicted motion vector list is sometimes referred to as pruning (pruning). Through pruning, each newly generated candidate predicted motion vector may be compared with the existing candidate predicted motion vector in the list. In some feasible implementations, the pruning operation may include: comparing one or more new candidate predicted motion vectors with the existing candidate predicted motion vector in the candidate predicted motion vector list, and skipping adding a new candidate predicted motion vector that is the same as the existing candidate predicted motion vector in the candidate predicted motion vector list. In some other feasible implementations, the pruning operation may include: adding one or more new candidate predicted motion vectors to the candidate predicted motion vector list, and then removing a repeated candidate predicted motion vector from the list.

In an embodiment of this application, during inter prediction, a method for predicting motion information of a to-be-processed picture block includes: obtaining motion information of at least one picture block whose motion vector is determined in a picture in which the to-be-processed picture block is located, where the at least one picture block whose motion vector is determined includes a picture block that is not neighboring to the to-be-processed picture block and whose motion vector is determined; obtaining first identification information, where the first identification information is used to determine target motion information in the motion information of the at least one picture block whose motion vector is determined; and predicating the motion information of the to-be-processed picture block based on the target motion information.

FIG. 10 is a flowchart of an example of a merge mode according to an embodiment of this application. A video encoder (for example, the video encoder 20) may perform a merge operation 200. In another feasible implementation, the video encoder may perform a merge operation different from the merge operation 200. For example, in another feasible implementation, the video encoder may perform a merge operation, where the video encoder performs operations more or fewer than operations of the merge operation 200 or operations different from operations of the merge operation 200. In another feasible implementation, the video encoder may perform the operations of the merge operation 200 in different orders or in parallel. The encoder may further perform the merge operation 200 on a PU encoded in a skip (skip) mode.

After the video encoder starts the merge operation 200, the video encoder may generate a candidate predicted motion vector list for a current PU (202). The video encoder may generate the candidate predicted motion vector list for the current PU in various manners. For example, the video encoder may generate the candidate predicted motion vector list for the current PU according to one of example technologies described below with respect to FIG. 7 to FIG. 9.

As described above, the candidate predicted motion vector list for the current PU may include a temporal candidate predicted motion vector. The temporal candidate predicted motion vector may indicate motion information for a temporal co-located PU. The co-located PU may be spatially located at a same location as the current PU in a picture frame, but in a reference picture instead of a current picture. In this application, the reference picture including the corresponding temporal PU may be referred to as an associated reference picture. In this application, a reference picture index of the associated reference picture may be referred to as an associated reference picture index. As described above, the current picture may be associated with one or more reference picture lists (for example, a list 0 and a list 1). The reference picture index may indicate the reference picture by indicating a location of the reference picture in a reference picture list. In some feasible implementations, the current picture may be associated with a combined reference picture list.

In some video encoders, the associated reference picture index is a reference picture index for a PU that covers a reference index source location associated with the current PU. In these video encoders, the reference index source located associated with the current PU is neighboring to the left of the current PU or the top of the current PU. In this application, if a picture block associated with a PU includes a specific location, the PU may "cover" the specific location. In these video encoders, the video encoder may use a reference picture index 0 if the reference index source location is unavailable.

However, in some examples, the reference index source location associated with the current PU is within a current CU. In these examples, a PU that covers the reference index source location associated with the current PU may be considered to be available if the PU is above or on the left of the current CU. However, the video encoder may need to access motion information for another PU of the current CU to determine the reference picture including the co-located PU. Therefore, these video encoders may use motion information (for example, a reference picture index) for a PU belonging to the current CU to generate the temporal candidate predicted motion vector for the current PU. In other words, these video encoders may use the motion information for the PU belonging to the current CU to generate the temporal candidate predicted motion vector. Therefore, the video encoder may not be capable of generating, in parallel, candidate predicted motion vector lists for the current PU and the PU that covers the reference index source location associated with the current PU.

According to the technologies in this application, the video encoder may explicitly set the associated reference picture index without referring to a reference picture index for any other PU. In this way, the video encoder can generate candidate predicted motion vector lists for the current PU and another PU of the current CU in parallel. Because the video encoder explicitly sets the associated reference picture index, the associated reference picture index is not based on motion information for any other PU of the current CU. In some feasible implementations in which the video encoder explicitly sets the associated reference picture index, the video encoder may always set the associated reference picture index to a fixed preset reference picture index (for example, 0). In this manner, the video encoder may generate the temporal candidate predicted motion vector based on the motion information for the co-located PU in the reference frame indicated by the preset reference picture index, and may add the temporal candidate predicted motion vector to the candidate predicted motion vector list for the current CU. The candidate predicted motion vector list is also a reference frame list.

In an embodiment in which the video encoder explicitly sets the associated reference picture index, the video encoder may explicitly signal the associated reference picture index in a syntax structure (for example, a picture header, a slice header, an APS, or another syntax structure). In this feasible implementation, the video encoder may signal an associated reference picture index for each LCU (that is, a CTU), CU, PU, TU, or sub-block of another type to a decoder. For example, the video encoder may signal that an associated reference picture index for each PU of the CU is equal to "1".

In some embodiments, the associated reference picture index may be set implicitly rather than explicitly. In these feasible implementations, the video encoder may generate each temporal candidate predicted motion vector in the candidate predicted motion vector list for the PU of the current CU by using motion information for a PU in a reference picture indicated by a reference picture index for a PU that covers locations outside the current CU, even if these locations are not strictly neighboring to the current PU.

After generating the candidate predicted motion vector list for the current PU, the video encoder may generate a prediction picture block associated with a candidate predicted motion vector in the candidate predicted motion vector list (204). The video encoder may determine motion information for the current PU based on motion information of an indicated candidate predicted motion vector and then generate a prediction picture block based on one or more reference blocks indicated by the motion information for the current PU, to generate a prediction picture block associated with the candidate predicted motion vector. Then, the video encoder may select one candidate predicted motion vector from the candidate predicted motion vector list (206). The video encoder may select the candidate predicted motion vector in various manners. For example, the video encoder may select one candidate predicted motion vector by analyzing a rate-distortion cost of each prediction picture block associated with the candidate predicted motion vector.

After selecting the candidate predicted motion vector, the video encoder may output a candidate predicted motion vector index (208). The candidate predicted motion vector index is also a reference frame list index, and the candidate predicted motion vector index may indicate a location of a candidate predicted motion vector selected from the candidate predicted motion vector list. In some feasible implementations, the candidate predicted motion vector index may be represented as "merge_idx".

Figure 11:
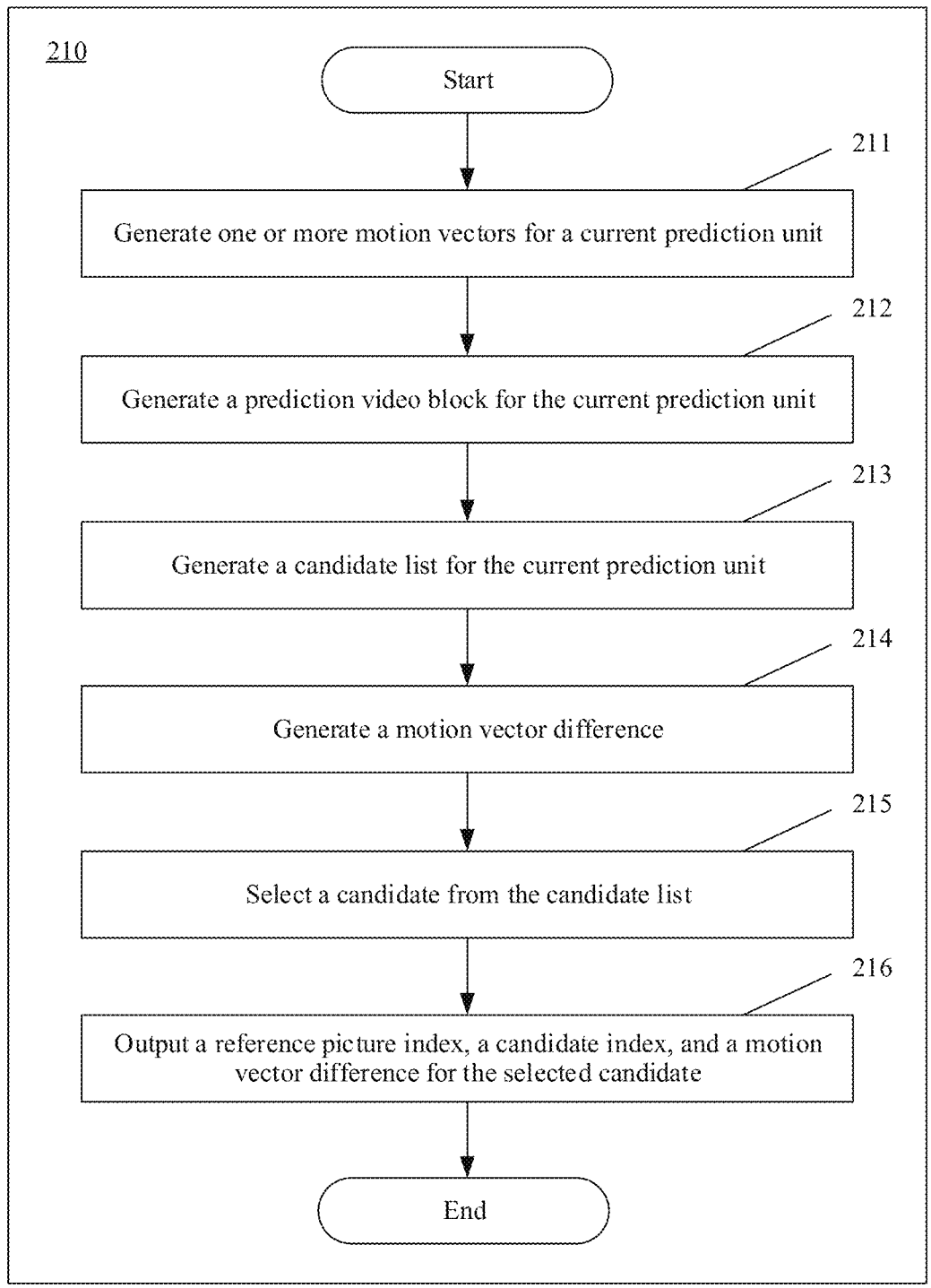
FIG. 11 is a flowchart of an example implementation of an advanced motion vector prediction mode.

FIG. 11 is a flowchart of an example of an advanced motion vector prediction mode according to an embodiment of this application. A video encoder (for example, the video encoder 20) may perform an AMVP operation 210.

After the video encoder starts the AMVP operation 210, the video encoder may generate one or more motion vectors for a current PU (211). The video encoder may perform integer motion estimation and fraction motion estimation to generate the motion vector for the current PU. As described above, a current picture may be associated with two reference picture lists (a list 0 and a list 1). If uni-prediction is performed on the current PU, the video encoder may generate a list-0 motion vector or a list-1 motion vector for the current PU. The list-0 motion vector may indicate a spatial displacement between a picture block for the current PU and a reference block in a reference picture in the list 0. The list-1 motion vector may indicate a spatial displacement between the picture block for the current PU and a reference block in a reference picture in the list 1. If bi-prediction is performed on the current PU, the video encoder may generate the list-0 motion vector and the list-1 motion vector for the current PU.

After generating the one or more motion vectors for the current PU, the video encoder may generate a prediction picture block for the current PU (212). The video encoder may generate the prediction picture block for the current PU based on one or more reference blocks indicated by the one or more motion vectors for the current PU.

In addition, the video encoder may generate a candidate predicted motion vector list for the current PU (213). The video encoder may generate the candidate predicted motion vector list for the current PU in various manners. For example, the video encoder may generate the candidate predicted motion vector list for the current PU according to one or more feasible implementations described below with respect to FIG. 6 to FIG. 9. In some feasible implementations, when the video encoder generates the candidate predicted motion vector list in the AMVP operation 210, the candidate predicted motion vector list may be limited to two candidate predicted motion vectors. In contrast, when the video encoder generates the candidate predicted motion vector list in a merge operation, the candidate predicted motion vector list may include more candidate predicted motion vectors (for example, five candidate predicted motion vectors).

After generating the candidate predicted motion vector list for the current PU, the video encoder may generate one or more motion vector differences (MVD) for each candidate predicted motion vector in the candidate predicted motion vector list (214). The video encoder may determine a difference between a motion vector indicated by a candidate predicted motion vector and a corresponding motion vector for the current PU, to generate a motion vector difference for the candidate predicted motion vector.

If uni-prediction is performed on the current PU, the video encoder may generate a single MVD for each candidate predicted motion vector. If bi-prediction is performed on the current PU, the video encoder may generate two MVDs for each candidate predicted motion vector. A first MVD may indicate a difference between the motion vector indicated by the candidate predicted motion vector and the list-0 motion vector for the current PU. A second MVD may indicate a difference between the motion vector indicated by the candidate predicted motion vector and the list-1 motion vector for the current PU.

The video encoder may select one or more candidate predicted motion vectors from the candidate predicted motion vector list (215). The video encoder may select the one or more candidate predicted motion vectors in various manners. For example, the video encoder may select a candidate predicted motion vector that matches an associated motion vector of a to-be-encoded motion vector with a minimum error. This can reduce a quantity of bits required for representing a motion vector difference for the candidate predicted motion vector.

After selecting the one or more candidate predicted motion vectors, the video encoder may output one or more reference picture indexes for the current PU, one or more candidate predicted motion vector indexes for the current PU, and one or more motion vector differences for the one or more selected candidate predicted motion vectors (216).

In an example in which the current picture is associated with the two reference picture lists (the list 0 and the list 1) and uni-prediction is performed on the current PU, the video encoder may output a reference picture index ("ref_idx_l0") for the list 0 or a reference picture index ("ref_idx_l1") for the list 1. The video encoder may further output a candidate predicted motion vector index ("mvp_l0_flag") that indicates a location of a selected candidate predicted motion vector of the list-0 motion vector for the current PU in the candidate predicted motion vector list. Alternatively, the video encoder may output a candidate predicted motion vector index ("mvp_l1_flag") that indicates a location of a selected candidate predicted motion vector of the list-1 motion vector for the current PU in the candidate predicted motion vector list. The video encoder may further output an MVD for the list-0 motion vector or the list-1 motion vector for the current PU.

In an example in which the current picture is associated with the two reference picture lists (the list 0 and the list 1) and bi-prediction is performed on the current PU, the video encoder may output a reference picture index ("ref_idx_l0") for the list 0 and a reference picture index ("ref_idx_l1") for the list 1. The video encoder may further output a candidate predicted motion vector index ("mvp_l0_flag") that indicates a location of a selected candidate predicted motion vector of the list-0 motion vector for the current PU in the candidate predicted motion vector list. In addition, the video encoder may output a candidate predicted motion vector index ("mvp_l1_flag") that indicates a location of a selected candidate predicted motion vector of the list-1 motion vector for the current PU in the candidate predicted motion vector list. The video encoder may further output an MVD for the list-0 motion vector for the current PU and an MVD for the list-1 motion vector for the current PU.

Figure 12:
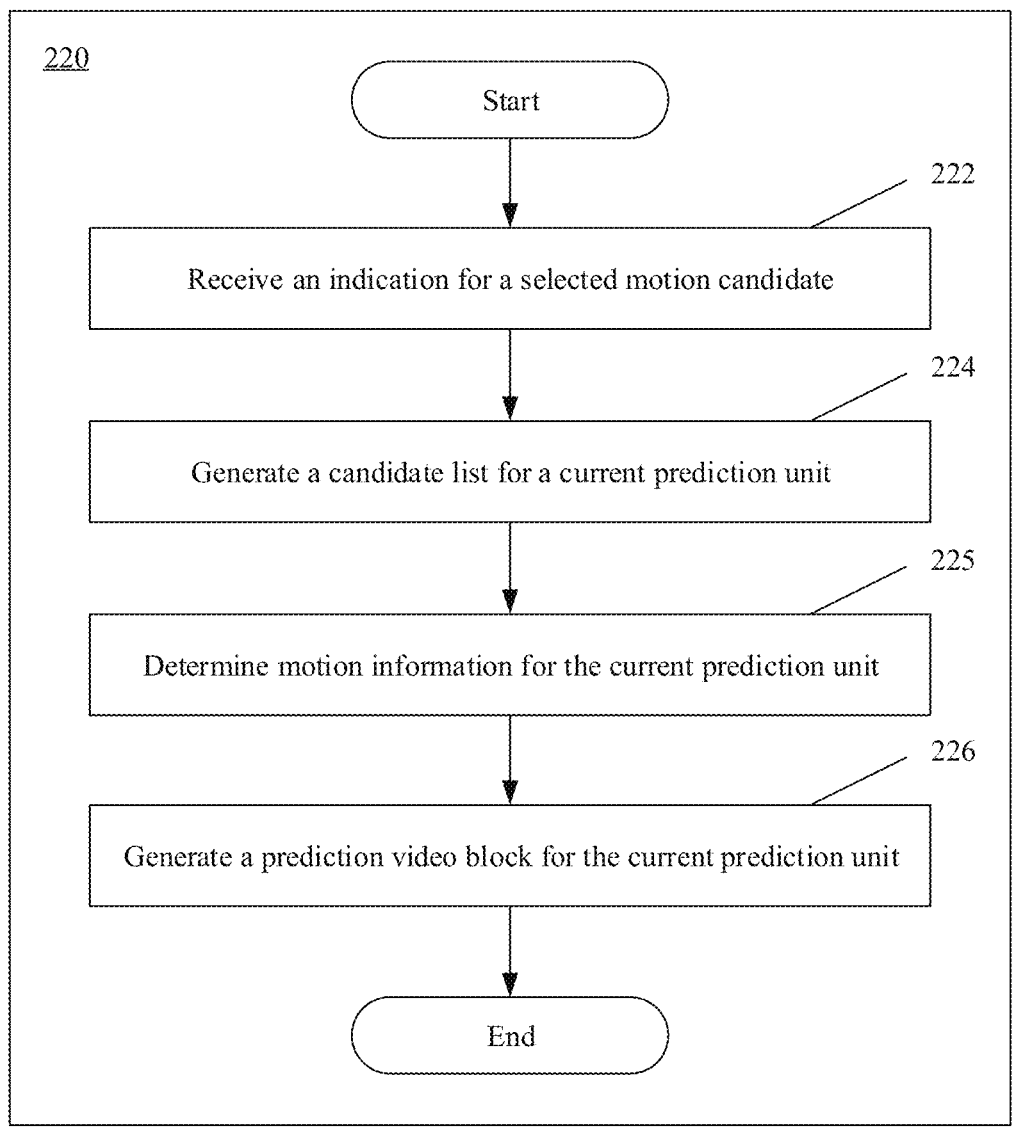
FIG. 12 is a flowchart of an example implementation of motion compensation performed by a video decoder that may be configured for use in an embodiment of this application.

FIG. 12 is a flowchart of an example of motion compensation performed by a video decoder (for example, the video decoder 30) according to an embodiment of this application.

When the video decoder performs a motion compensation operation 220, the video decoder may receive an indication for a selected candidate predicted motion vector for a current PU (222). For example, the video decoder may receive a candidate predicted motion vector index indicating a location of the selected candidate predicted motion vector in a candidate predicted motion vector list for the current PU.

If motion information for the current PU is encoded in an AMVP mode and bi-prediction is performed on the current PU, the video decoder may receive a first candidate predicted motion vector index and a second candidate predicted motion vector index. The first candidate predicted motion vector index indicates a location of a selected candidate predicted motion vector of a list-0 motion vector for the current PU in the candidate predicted motion vector list. The second candidate predicted motion vector index indicates a location of a selected candidate predicted motion vector of a list-1 motion vector for the current PU in the candidate predicted motion vector list. In some feasible implementations, a single syntax element may be used to identify two candidate predicted motion vector indexes.

In addition, the video decoder may generate the candidate predicted motion vector list for the current PU (224). The video decoder may generate the candidate predicted motion vector list for the current PU in various manners. For example, the video decoder may generate the candidate predicted motion vector list for the current PU by using technologies described below with reference to FIG. 5 to FIG. 9. When the video decoder generates a temporal candidate predicted motion vector for the candidate predicted motion vector list, the video decoder may explicitly or implicitly set a reference picture index identifying a reference picture including a co-located PU, as described above with respect to FIG. 10.

After generating the candidate predicted motion vector list for the current PU, the video decoder may determine the motion information for the current PU based on motion information indicated by one or more selected candidate predicted motion vectors in the candidate predicted motion vector list for the current PU (225). For example, if the motion information for the current PU is encoded in a merge mode, the motion information for the current PU may be the same as the motion information indicated by the selected candidate predicted motion vector. If the motion information for the current PU is encoded in the AMVP mode, the video decoder may reconstruct one or more motion vectors for the current PU by using one or more motion vectors indicated by the selected candidate predicted motion vector and one or more MVDs indicated in a bitstream. A reference picture index and a prediction direction identifier of the current PU may be the same as one or more reference picture indexes and one or more prediction direction identifiers of the one or more selected candidate predicted motion vectors. After determining the motion information for the current PU, the video decoder may generate a prediction picture block for the current PU based on one or more reference blocks indicated by the motion information for the current PU (226).

Figure 13:
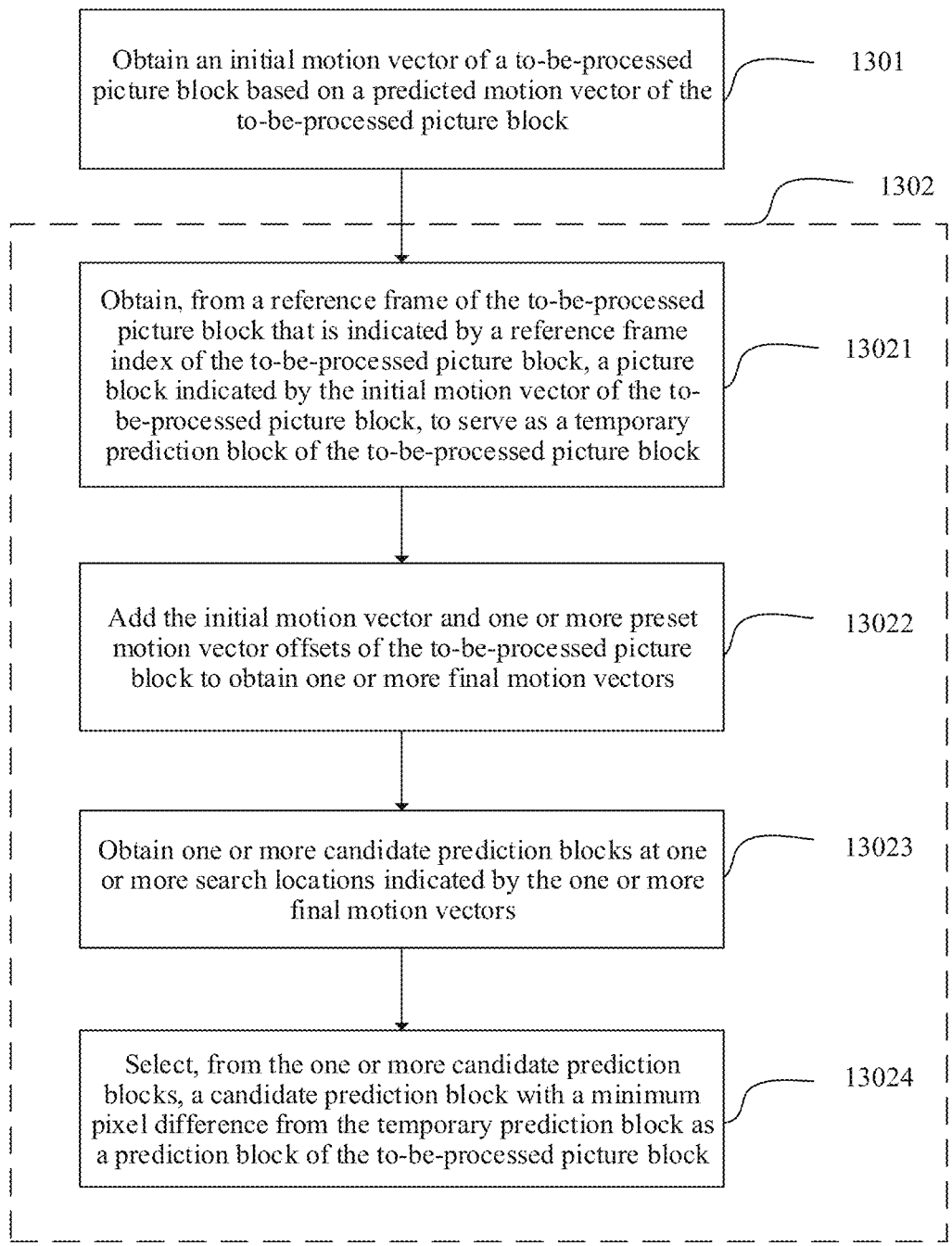
FIG. 13 is a schematic flowchart of a motion vector update method during video encoding according to an embodiment of this application.

FIG. 13 is a flowchart of an example of updating a motion vector during video encoding according to an embodiment of this application. A to-be-processed picture block is a to-be-encoded block.

1301: Obtain an initial motion vector of the to-be-processed picture block based on a predicted motion vector of the to-be-processed picture block.

In a feasible implementation, for example, in a merge mode, the predicted motion vector of the to-be-processed picture block is used as the initial motion vector of the to-be-processed picture block.

The predicted motion vector of the to-be-processed picture block may be obtained according to the methods shown in FIG. 6 to FIG. 9 in the embodiments of this application or any one of existing predicted motion vector obtaining methods in the H.265 standard or a JEM reference mode.

This is not limited. A motion vector difference may be obtained with reference to the to-be-processed picture block. Motion estimation is performed within a search range determined based on the predicted motion vector of the to-be-processed picture block, and a difference between a motion vector of the to-be-processed picture block that is obtained after the motion estimation and the predicted motion vector of the to-be-processed picture block is used as the motion vector difference.

During bidirectional prediction, this operation includes: obtaining a first initial motion vector of the to-be-processed picture block based on a forward predicted motion vector of the to-be-processed picture block, and obtaining a second initial motion vector of the to-be-processed picture block based on a backward predicted motion vector of the to-be-processed picture block.

1302: Obtain a prediction block of the to-be-processed picture block based on the initial motion vector and one or more preset motion vector offsets. Details are as follows:

S13021: Obtain, from a reference frame of the to-be-processed picture block that is indicated by a reference frame index of the to-be-processed picture block, a picture block indicated by the initial motion vector of the to-be-processed picture block, to serve as a temporary prediction block of the to-be-processed picture block.

The initial motion vector includes a first initial motion vector and a second initial motion vector. The first initial motion vector indicates a first motion compensation block based on a first reference frame list of the to-be-processed picture block, and the first motion compensation block is a reference block for performing motion compensation on the to-be-processed picture block. The second initial motion vector indicates a second motion compensation block based on a second reference frame list of the to-be-processed picture block, and the second motion compensation block is a reference block for performing motion compensation on the to-be-processed picture block.

13022: Add the initial motion vector and the one or more preset motion vector offsets of the to-be-processed picture block to obtain one or more final motion vectors, where each final motion vector indicates a search location.

The preset motion vector offset may be a preset offset vector value, or may be preset offset vector precision, or may be a preset offset vector range. A specific value of the preset motion vector offset and a quantity of preset motion vector offsets are not limited in this embodiment of the present invention.

The final motion vector includes a first final motion vector and a second final motion vector. The first final motion vector indicates a first motion compensation block based on a first reference frame list of the to-be-processed picture block, and the first motion compensation block is a prediction block for performing motion compensation on the to-be-processed picture block. The second final motion vector indicates a second motion compensation block based on a second reference frame list of the to-be-processed picture block, and the second motion compensation block is a prediction block for performing motion compensation on the to-be-processed picture block.

13023: Obtain one or more candidate prediction blocks at one or more search locations indicated by the one or more final motion vectors, where each search location corresponds to one candidate prediction block.

13024: Select, from the one or more candidate prediction blocks, a candidate prediction block with a minimum pixel difference from the temporary prediction block as the prediction block of the to-be-processed picture block.

The minimum pixel difference may also be understood as a minimum distortion cost. In this case, the final motion vector of the prediction block is a candidate final motion vector corresponding to a minimum distortion cost in a plurality of candidate final motion vectors. It should be understood that the distortion cost may be calculated in a plurality of manners. For example, a sum of absolute differences between pixel matrices of the candidate prediction block and the temporary prediction block may be calculated, or a sum of absolute differences after means of pixel matrices are removed may be calculated, or another relatively accurate value of a pixel matrix may be calculated. Specific content of the minimum distortion cost is not limited in this embodiment of the present invention.

During bidirectional prediction, this operation includes: obtaining, from a first reference frame list of the to-be-processed picture block that is indicated by a first reference frame list index of the to-be-processed picture block, a first picture block indicated by the first initial motion vector of the to-be-processed picture block, where the first picture block is a forward reference block, and correspondingly, the first initial motion vector may be a forward initial motion vector, and obtaining, from a second reference frame list of the to-be-processed picture block that is indicated by a second reference frame list index of the to-be-processed picture block, a second picture block indicated by the second initial motion vector of the to-be-processed picture block, where the second picture block is a backward reference block, and correspondingly, the second initial motion vector may be a backward initial motion vector; performing weighted processing on the first picture block and the second picture block to obtain the temporary prediction block of the to-be-processed picture block; adding the first initial motion vector and the one or more preset motion vector offsets of the to-be-processed picture block to obtain one or more first final motion vectors, and adding the second initial motion vector and the one or more preset motion vector offsets of the to-be-processed picture block to obtain one or more second final motion vectors; obtaining one or more first candidate prediction blocks at one or more search locations indicated by the one or more first final motion vectors, and obtaining one or more second candidate prediction blocks at one or more search locations indicated by the one or more second final motion vectors; selecting, from the one or more first candidate prediction blocks, a candidate prediction block with a minimum pixel difference from the temporary prediction block as the first prediction block of the to-be-processed picture block, and selecting, from the one or more backward candidate prediction blocks, a candidate prediction block with a minimum pixel difference from the temporary prediction block as the second prediction block of the to-be-processed picture block; and performing weighted processing on the first prediction block and the second prediction block to obtain the prediction block of the to-be-processed picture block.

In some embodiments, another motion vector in a direction indicated by a candidate final motion vector that corresponds to a minimum distortion cost in a plurality of candidate final motion vectors may alternatively be used as a final motion vector of the prediction block. Specifically, the final motion vector of the prediction block may be selected based on a first preset condition.

In an embodiment, the plurality of candidate final motion vectors may be a plurality of motion vectors in a plurality of directions. Specific precision in each direction may be first selected. For example, a candidate final motion vector with integer pixel precision is used as a first vector in each direction, and a first vector corresponding to a minimum distortion cost is selected from the plurality of first vectors as a reference vector. When a first preset relationship among a distortion cost A corresponding to the reference vector, a distortion cost C corresponding to a second vector corresponding to the reference vector in a negative direction, and a distortion cost B corresponding to the initial motion vector meets the first preset condition, the reference vector is used as the final motion vector of the prediction block. When the first preset relationship among the distortion cost A corresponding to the reference vector, the distortion cost C corresponding to the second vector corresponding to the reference vector in the negative direction, and the distortion cost B corresponding to the initial motion vector does not meet the first preset condition, if A and B meet a second preset condition, a length of the first vector is reduced by preset precision to obtain a third vector, and the third vector is used as a first target vector of the prediction block. When A and B do not meet the second preset condition, if B and C meet a third preset condition, the length of the first vector is increased by preset precision to obtain a fourth vector, and the fourth vector is used as the first target vector of the prediction block. When B and C do not meet the third preset condition, a specific loop count is set. In each loop, an offset of the reference vector is first updated. Specifically, when a second preset relationship among A, B, and C meets a fourth preset condition, the offset of the reference vector is updated. When the second preset relationship among A, B, and C does not meet the fourth preset condition or the loop count is reduced to 0, the offset of the reference vector is not updated, and the loop ends. After the loop ends, a direction of the offset is determined based on a value relationship between A and C, and the direction of the offset includes a positive direction or a negative direction. A fifth vector is obtained based on the reference vector, the offset, and the direction of the offset, and the fifth vector is used as the first target vector of the prediction block. Finally, the first target vector is used as the final motion vector of the prediction block. The first preset relationship may be a proportion relationship, a difference relationship, or a value relationship. The first preset condition may be that the first preset relationship among A, C, and B is equal to a preset value, the second preset condition may be that A is equal to B, and the third preset condition may be that B is equal to C. The first preset relationship, the first preset condition, the preset value, the second preset condition, the third preset condition, the second preset relationship, and the fourth preset condition are not limited in this embodiment of the present invention.

For example, there are eight candidate motion vectors, and the eight candidate motion vectors are located in four directions of the prediction block: a top direction, a bottom direction, a left direction, and a right direction. There are two candidate motion vectors in each direction. A candidate motion vector with a maximum length is first selected from each of the four directions to obtain the four first vectors. When the first vector in the top direction corresponds to a minimum distortion cost, the first vector in the top direction is used as the reference vector, that is, the final vector of the prediction block is a motion vector in a positive direction. It is assumed that the first preset condition is that a proportion relationship among the distortion cost A corresponding to the reference vector, the distortion cost C corresponding to the second vector, and the distortion cost B corresponding to the initial motion vector is 1, where the second vector is a candidate motion vector in an opposite direction to the reference vector, and the preset precision is 1/4 precision. In this case, when the distortion cost corresponding to the reference vector is 2, the distortion cost corresponding to the first vector in the bottom direction is 4, and the distortion cost corresponding to the initial motion vector is 3, it is assumed that a proportion relationship among the distortion cost corresponding to the reference vector, the distortion cost corresponding to the first vector in the bottom direction, and the distortion cost corresponding to the initial motion vector is $(2 \times B)/(A+C)$, and the proportion relationship is 1. In this case, the reference vector is used as the final motion vector of the prediction block. If the distortion cost corresponding to the first vector in the bottom direction is 5, and the proportion relationship $(2 \times B)/(A+C)$ is not 1, the proportion does not meet the first preset condition. In this case, if A is equal to B, a length of the reference vector is reduced by the preset precision 1/4 to obtain a third vector, and the third vector is used as the final motion vector of the prediction block. If A is not equal to B, when B is equal to C, the length of the reference vector is increased by the preset precision 1/4 to obtain a fourth vector, and the fourth vector is used as the final motion vector of the prediction block. When B is not equal to C, the loop count is set to 3, precision of the offset of the reference vector is first updated to 1/8 in each loop, and it is assumed that the second preset relationship among A, B, and C is $K=|(A-C) \times 16|$, and $T=((A+C)-2 \times B) \times 8$. When K is greater than or equal to T, the fourth preset condition is met, and the precision of the offset of the reference vector is updated to 1/16. It is assumed that K and T are updated in each loop, $K=K-T$, and $T=T/2$. When the loop count is reduced to 0, the loop ends. After the loop ends, the direction of the offset is determined based on the value relationship between A and C. When A is greater than or equal to C, the direction of the offset is a positive direction. When A is less than C, the direction of the offset is a negative direction. A fifth vector is obtained based on the reference vector, the offset, and the direction of the offset, and the fifth vector is used as the first target vector of the prediction block. Finally, the first target vector is used as the final motion vector of the prediction block.

Certainly, in some embodiments, when a third preset relationship between the distortion cost corresponding to the reference vector and a distortion cost corresponding to a third vector in a target direction does not meet a fifth preset condition, the length of the first vector may be increased by the preset precision, until an increased distortion cost corresponding to a second target vector meets a second target condition. When the third preset relationship between the distortion cost corresponding to the reference vector and the distortion cost corresponding to the third vector in the target direction meets the fifth preset condition, the length of the first vector may be reduced by the preset precision, until a reduced distortion cost corresponding to the second target vector meets the target condition. The target direction is any direction other than a direction of the reference vector. The third preset relationship, the fifth preset condition, and the target condition are not limited in this embodiment of the present invention.

In some embodiments, when a fourth preset relationship among the distortion cost corresponding to the reference vector, the distortion cost corresponding to the third vector in the target direction, and a distortion cost corresponding to an intermediate vector meets a sixth preset condition, a third target vector is determined by increasing a length of the reference vector by the preset precision. When the fourth preset relationship among the distortion cost corresponding to the reference vector, the distortion cost corresponding to the third vector in the target direction, and the distortion cost corresponding to the intermediate vector does not meet the sixth preset condition, the third target vector is determined by reducing the length of the reference vector by the preset precision. The intermediate vector is a motion vector located between the reference vector and the second vector. A process of increasing the reference vector by the preset precision and reducing the reference vector by the preset precision is described above, and details are not described herein again. The fourth preset relationship and the sixth preset condition are not limited in this embodiment of the present invention.

Figure 14:
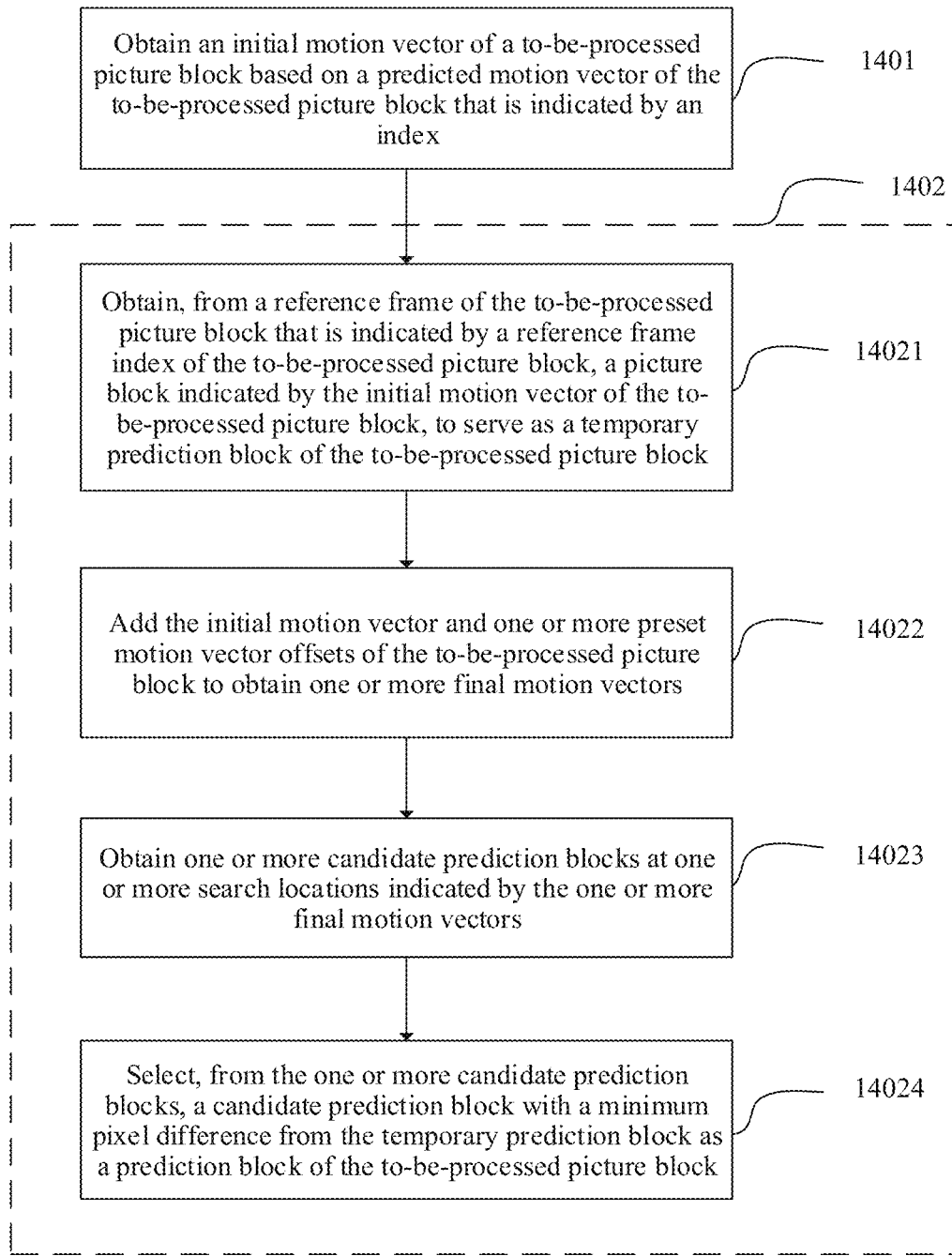
FIG. 14 is a schematic flowchart of a motion vector update method during video decoding according to an embodiment of this application.

FIG. 14 is a flowchart of an example of updating a motion vector during video decoding according to an embodiment of this application. A to-be-processed picture block is a to-be-decoded block.

1401: Obtain an initial motion vector of the to-be-processed picture block based on a predicted motion vector of the to-be-processed picture block that is indicated by an index.

In a feasible implementation, for example, in a merge mode, the predicted motion vector of the to-be-processed picture block is used as the initial motion vector of the to-be-processed picture block.

The predicted motion vector of the to-be-processed picture block may be obtained according to the methods shown in FIG. 6 to FIG. 9 in the embodiments of this application or any one of existing predicted motion vector obtaining methods in the H.265 standard or a JEM reference mode. This is not limited. The motion vector difference may be obtained by parsing a bitstream.

During bidirectional prediction, this operation includes: obtaining a first initial motion vector of the to-be-processed picture block based on a forward predicted motion vector of the to-be-processed picture block, and obtaining a second initial motion vector of the to-be-processed picture block based on a backward predicted motion vector of the to-be-processed picture block.

1402: Obtain a prediction block of the to-be-processed picture block based on the initial motion vector and one or more preset motion vector offsets. Details are as follows:

S14021: Obtain, from a reference frame of the to-be-processed picture block that is indicated by a reference frame index of the to-be-processed picture block, a picture block indicated by the initial motion vector of the to-be-processed picture block, to serve as a temporary prediction block of the to-be-processed picture block.

14022: Add the initial motion vector and the one or more preset motion vector offsets of the to-be-processed picture block to obtain one or more final motion vectors, where each final motion vector indicates a search location.

14023: Obtain one or more candidate prediction blocks at one or more search locations indicated by the one or more final motion vectors, where each search location corresponds to one candidate prediction block.

14024: Select, from the one or more candidate prediction blocks, a candidate prediction block with a minimum pixel difference from the temporary prediction block as the prediction block of the to-be-processed picture block.

During bidirectional prediction, this operation includes: obtaining, from a first reference frame of the to-be-processed picture block that is indicated by a first reference frame index of the to-be-processed picture block, a first picture block indicated by the first initial motion vector of the to-be-processed picture block, and obtaining, from a second reference frame of the to-be-processed picture block that is indicated by a second reference frame index of the to-be-processed picture block, a second picture block indicated by the second initial motion vector of the to-be-processed picture block; performing weighted processing on the first picture block and the second picture block to obtain the temporary prediction block of the to-be-processed picture block; adding the first initial motion vector and the one or more preset motion vector offsets of the to-be-processed picture block to obtain one or more first final motion vectors, and adding the second initial motion vector and the one or more preset motion vector offsets of the to-be-processed picture block to obtain one or more second final motion vectors; obtaining one or more forward candidate prediction blocks at one or more search locations indicated by the one or more first final motion vectors, and obtaining one or more backward candidate prediction blocks at one or more search locations indicated by the one or more second final motion vectors; selecting, from the one or more forward candidate prediction blocks, a candidate prediction block with a minimum pixel difference from the temporary prediction block as a forward prediction block of the to-be-processed picture block, and selecting, from the one or more backward candidate prediction blocks, a candidate prediction block with a minimum pixel difference from the temporary prediction block as a backward prediction block of the to-be-processed picture block; and performing weighted processing on the forward prediction block and the backward prediction block to obtain the prediction block of the to-be-processed picture block.

By using several specific embodiments, the following describes in detail an implementation of updating a motion vector. It should be understood that, as described in the encoding method in FIG. 13 and the decoding method in FIG. 14, updating of a motion vector is consistent on an encoder and a decoder. Therefore, the following embodiments are described only from the encoder or the decoder. It should be understood that when description is provided from the encoder, implementation on the decoder keeps consistent with that on the encoder; when description is provided from the decoder, implementation on the encoder keeps consistent with that on the decoder.

Figure 15:
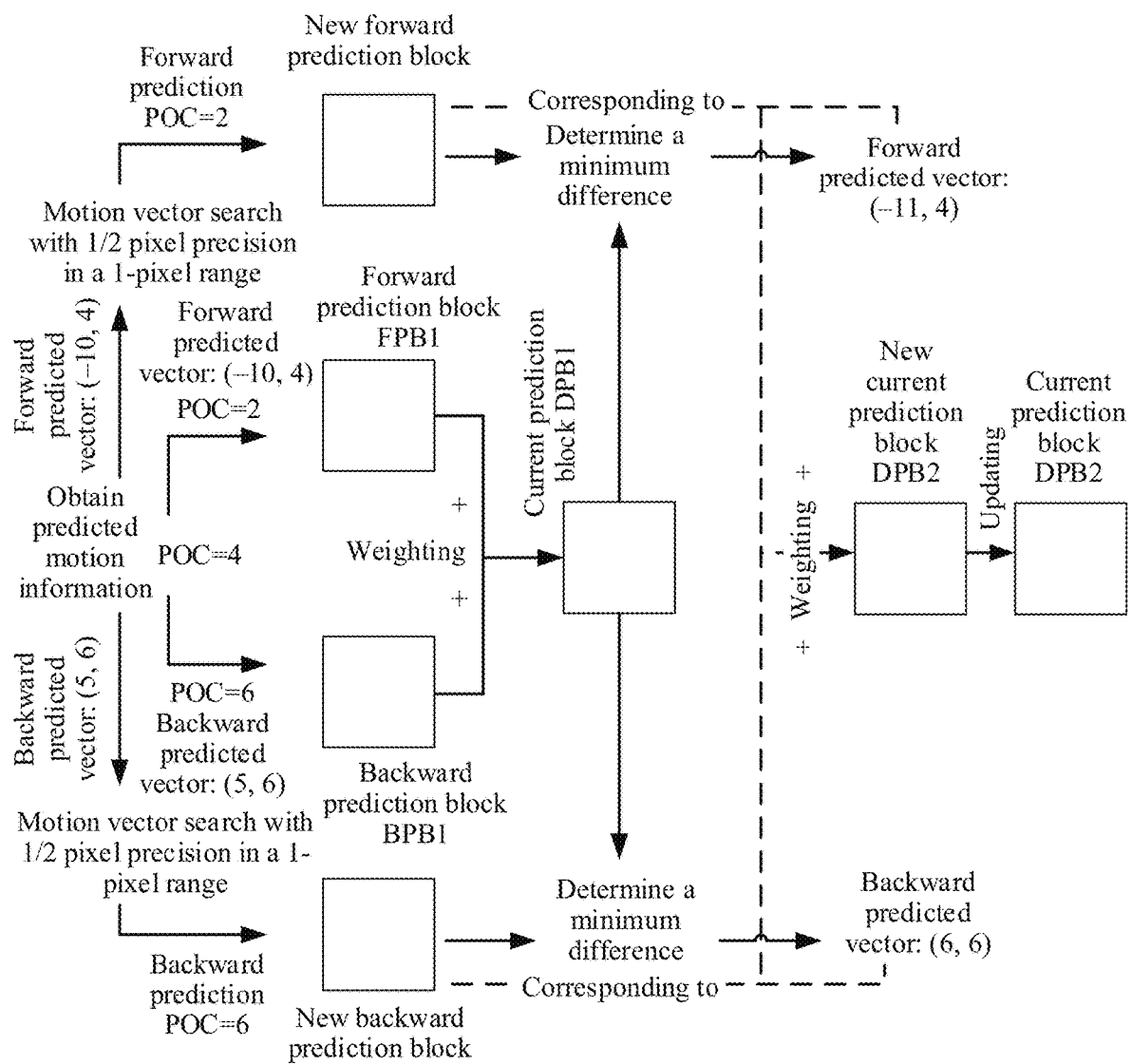
FIG. 15 is a schematic flowchart of updating a motion vector according to an embodiment of this application.

As shown in FIG. 15, a current decoding block is a first decoding block, and predicted motion information of the current decoding block is obtained. It is assumed that forward and backward motion vector predictors of the current decoding block are respectively (−10, 4) and (5, 6), and a picture order count (picture order count, POC) POC of the current decoding block is 4. The POC is used to indicate a picture display order, and POCs of reference pictures indicated by index values of displayed reference pictures of a picture are respectively 2 and 6. In this case, the POC corresponding to the current decoding block is 4, a POC corresponding to a forward prediction reference picture block is 2, and a POC corresponding to a backward prediction reference picture block is 6.

Forward prediction and backward prediction are separately performed on the current decoding block to obtain an initial forward prediction block (forward prediction block, FPB) and an initial backward prediction block (backward prediction block, BPB) of the current decoding block, and it is assumed that the initial forward decoding prediction block and the initial backward decoding prediction block are respectively FPB1 and BPB1. A first decoding prediction block (decoding prediction block, DPB) of the current decoding block is obtained by performing weighted summation on FPB1 and BPB1, and is assumed to be DPB1.

(−10, 4) and (5, 6) are used as reference inputs of the forward and backward motion vector predictors, and motion search with first precision is separately performed on the forward prediction reference picture block and the backward prediction reference picture block. In this case, the first precision is 1/2 pixel precision in a 1-pixel range. The first decoding prediction block DPB1 is used as a reference. Corresponding new forward and backward decoding prediction blocks obtained through each motion search are compared with the first decoding prediction block DPB1, to obtain a new decoding prediction block with a minimum difference from DPB1, and forward and backward motion vector predictors corresponding to the new decoding prediction block are used as target motion vector predictors, and are assumed to be (−11, 4) and (6, 6) respectively.

The target motion vector predictors are updated to (−11, 4) and (6, 6), forward prediction and backward prediction are separately performed on the first decoding block based on the target motion vector predictors, a target decoding prediction block is obtained by performing weighted summation on obtained new forward and backward decoding prediction blocks, and is assumed to be DPB2, and the decoding prediction block of the current decoding block is updated to DPB2.

It should be noted that, when the motion search with the first precision is performed on the forward prediction reference picture block and the backward prediction reference picture block, the first precision may be any specified precision, for example, may be integer pixel precision, 1/2 pixel precision, 1/4 pixel precision, or 1/8 pixel precision.

Figure 16:
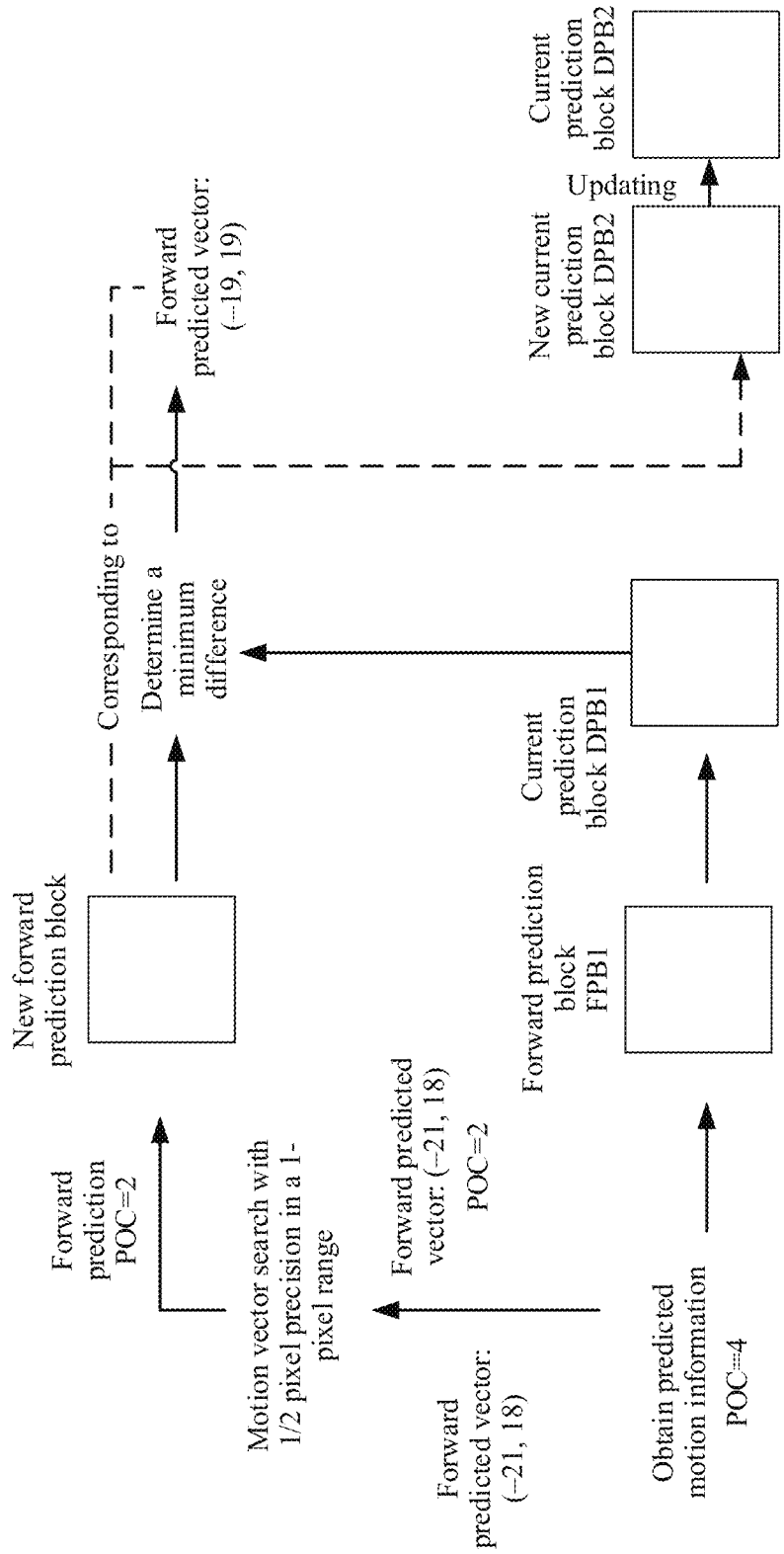
FIG. 16 is a schematic flowchart of updating a motion vector according to an embodiment of this application.

As shown in FIG. 16, a current decoding block is a first decoding block, and predicted motion information of the current decoding block is obtained. It is assumed that a forward motion vector predictor of the current decoding block is (−21, 18), a POC of a picture in which the current decoding block is located is 4, and a POC of a reference picture that is indicated by an index value of the reference picture is 2. In this case, a POC corresponding to the current decoding block is 4, and a POC corresponding to a forward prediction reference picture block is 2.

Forward prediction is performed on the current decoding block to obtain an initial forward decoding prediction block of the current decoding block, and it is assumed that the initial forward decoding prediction block is FPB1. In this case, FPB1 is used as a first decoding prediction block of the current decoding block, and the first decoding prediction block is denoted as DPB1.

(−21, 18) is used as a reference input of the forward motion vector predictor, and motion search with first precision is performed on the forward prediction reference picture block. In this case, the first precision is 1 pixel precision in a 5-pixel range. The first decoding prediction block DPB1 is used as a reference. A corresponding new forward decoding prediction block obtained through each motion search is compared with the first decoding prediction block DPB1, to obtain a new decoding prediction block with a minimum difference from DPB1, and a forward motion vector predictor corresponding to the new decoding prediction block is used as a target motion vector predictor, and is assumed to be (−19, 19).

The target motion vector predictor is updated to (−19, 19), forward prediction is performed on the first decoding block based on the target motion vector predictor, an obtained new forward decoding prediction block is used as a target decoding prediction block, and is assumed to be DPB2, and the decoding prediction block of the current decoding block is updated to DPB2.

It should be noted that, when the motion search with the first precision is performed on the forward prediction reference picture block and the backward prediction reference picture block, the first precision may be any specified precision, for example, may be integer pixel precision, 1/2 pixel precision, 1/4 pixel precision, or 1/8 pixel precision.

Figure 17A:
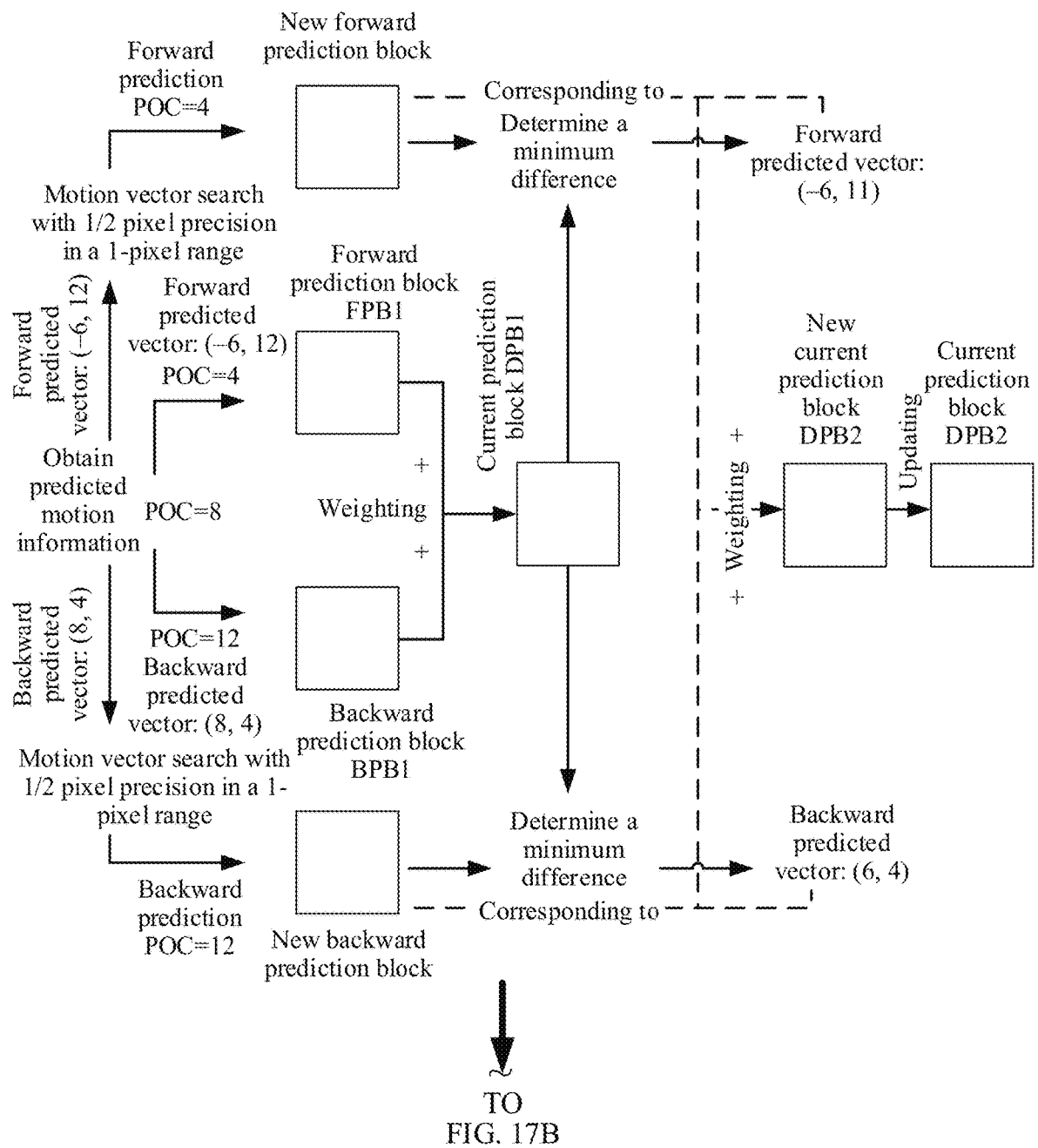
FIG. 17A and FIG. 17B are a schematic flowchart of updating a motion vector according to an embodiment of this application.
Figure 17B:
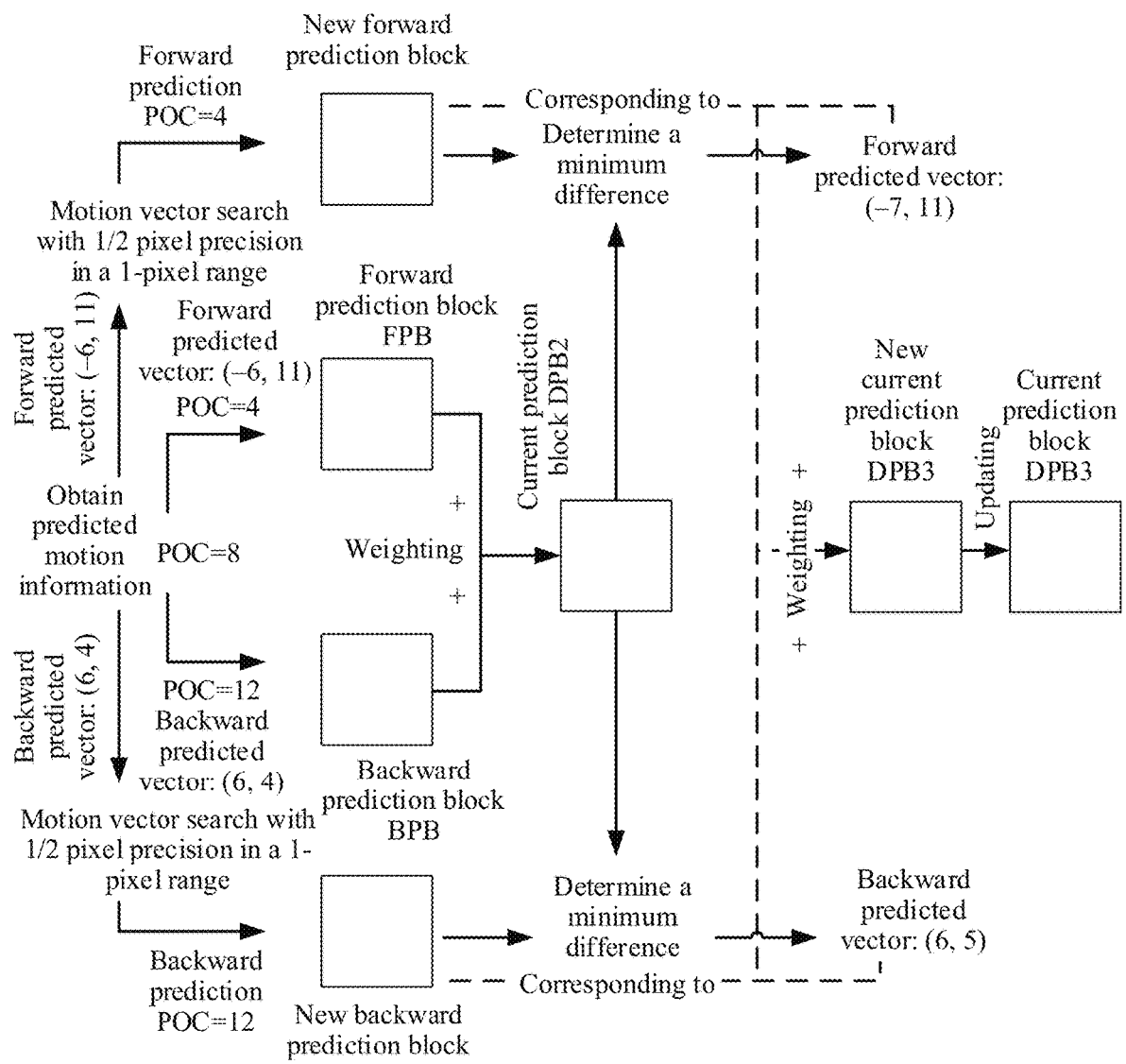

As shown in FIG. 17A and FIG. 17B, a current coding block is a first coding block, and predicted motion information of the current coding block is obtained. It is assumed that forward and backward motion vector predictors of the current coding block are respectively (−6, 12) and (8, 4), a POC of a picture in which the current coding block is located is 8, and POCs of reference pictures that are indicated by index values of the reference pictures are respectively 4 and 12. In this case, a POC corresponding to the current coding block is 4, a POC corresponding to a forward prediction reference picture block is 4, and a POC corresponding to a backward prediction reference picture block is 12.

Forward prediction and backward prediction are separately performed on the current coding block to obtain an initial forward encoding prediction block and an initial backward encoding prediction block of the current coding block, and it is assumed that the initial forward encoding prediction block and the initial backward encoding prediction block are respectively FPB1 and BPB1. A first encoding prediction block of the current coding block is obtained by performing weighted summation on FPB1 and BPB1, and is assumed to be DPB1.

(−6, 12) and (8, 4) are used as reference inputs of the forward and backward motion vector predictors, and motion search with first precision is separately performed on the forward prediction reference picture block and the backward prediction reference picture block. The first encoding prediction block DPB1 is used as a reference. Corresponding new forward and backward encoding prediction blocks obtained in each motion search are compared with the first encoding prediction block DPB1, to obtain a new encoding prediction block with a minimum difference from DPB1, and forward and backward motion vector predictors corresponding to the new encoding prediction block are used as target motion vector predictors, and are assumed to be (−11, 4) and (6, 6) respectively.

The target motion vector predictors are updated to (−11, 4) and (6, 6), forward prediction and backward prediction are separately performed on the first coding block based on the target motion vector predictors, a target encoding prediction block is obtained by performing weighted summation on obtained new forward and backward encoding prediction blocks, and is assumed to be DPB2, and the encoding prediction block of the current coding block is updated to DPB2.

Then, (−11, 4) and (6, 6) are used as reference inputs of the forward and backward motion vector predictors, and the motion search with the first precision is separately performed on the forward prediction reference picture block and the backward prediction reference picture block. The encoding prediction block DPB2 of the current coding block is used as a reference. Corresponding new forward and backward encoding prediction blocks obtained in each motion search are compared with the first encoding prediction block DPB2, to obtain a new encoding prediction block with a minimum difference from DPB2, and forward and backward motion vector predictors corresponding to the new encoding prediction block are used as new target motion vector predictors, and are assumed to be (−7, 11) and (6, 5) respectively.

Then, the target motion vector predictors are updated to (−7, 11) and (6, 5), forward prediction and backward prediction are separately performed on the first coding block based on the latest target motion vector predictors, a target encoding prediction block is obtained by performing weighted summation on obtained new forward and backward encoding prediction blocks, and is assumed to be DPB3, and the encoding prediction block of the current coding block is updated to DPB3.

Further, the target motion vector predictors may be continuously updated according to the foregoing method, and a quantity of cycles is not limited.

It should be noted that, when the motion search with the first precision is performed on the forward prediction reference picture block and the backward prediction reference picture block, the first precision may be any specified precision, for example, may be integer pixel precision, 1/2 pixel precision, 1/4 pixel precision, or 1/8 pixel precision.

It should be understood that, in some feasible embodiments, the cycle ends when a condition is satisfied. For example, the cycle ends when a difference between DPBn and DPBn−1 is less than a threshold, where n is a positive integer greater than 2.

Figure 18:
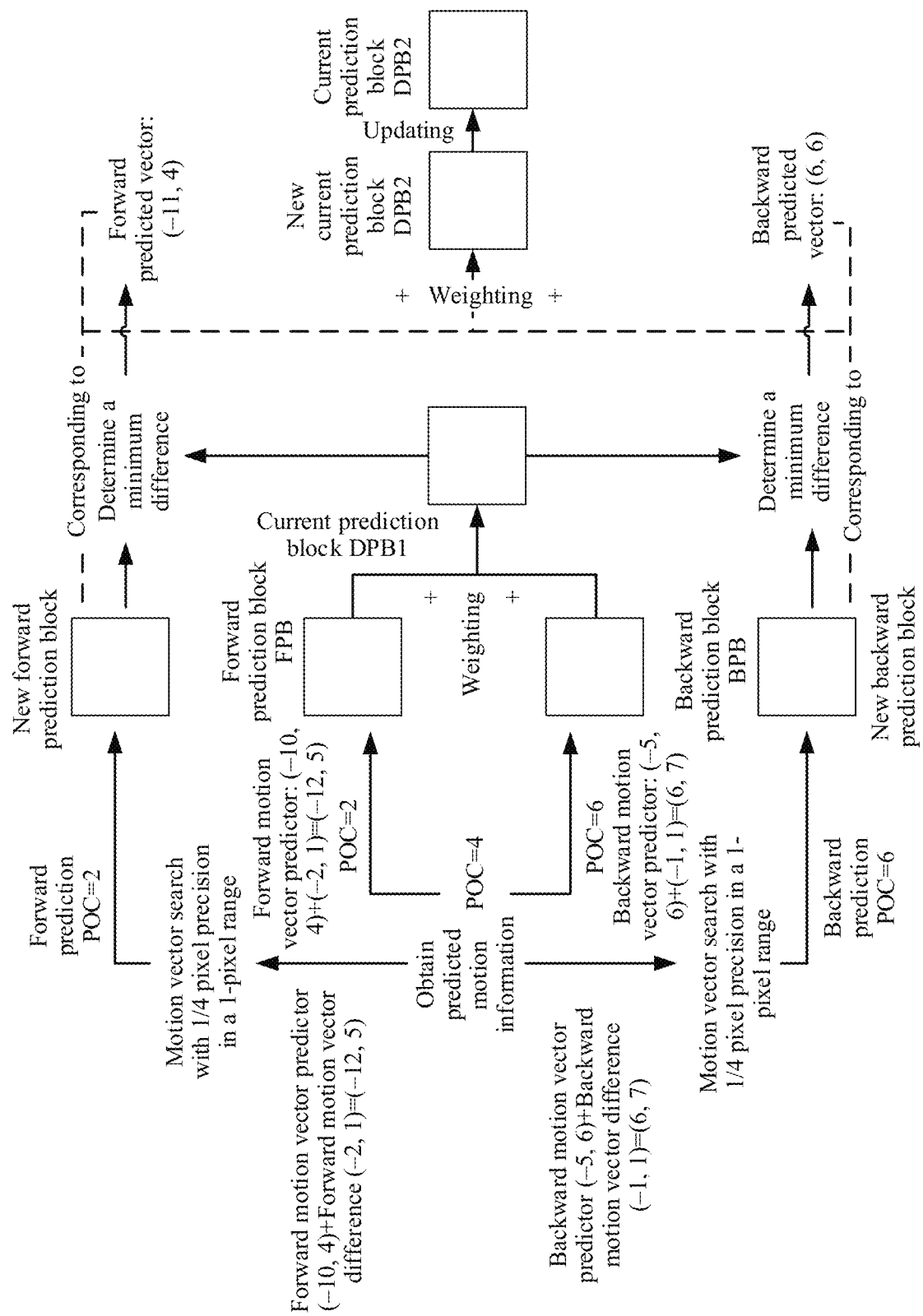
FIG. 18 is a schematic flowchart of updating a motion vector according to an embodiment of this application.

As shown in FIG. 18, a current decoding block is a first decoding block, and predicted motion information of the current decoding block is obtained. It is assumed that forward and backward motion vector values of the current decoding block are respectively (−10, 4) and (5, 6), forward and backward motion vector differences of the current decoding block are (−2, 1) and (1, 1) respectively, a POC of a picture in which the current decoding block is located is 4, and POCs of reference pictures that are indicated by index values of the reference pictures are respectively 2 and 6. Therefore, a POC corresponding to the current decoding block is 4, a POC corresponding to a forward prediction reference picture block is 2, and a POC corresponding to a backward prediction reference picture block is 6.

Forward prediction and backward prediction are separately performed on the current decoding block to obtain an initial forward decoding prediction block (FPB) and an initial backward decoding prediction block (BPB) of the current decoding block, and it is assumed that the initial forward decoding prediction block and the initial backward decoding prediction block are respectively FPB1 and BPB1. A first decoding prediction block (DPB) of the current decoding block is obtained by performing weighted summation on FPB1 and BPB1, and is assumed to be DPB1.

A sum of the forward motion vector predictor and the forward motion vector difference and a sum of the backward motion vector predictor and the backward motion vector difference, namely (−10, 4)+(−2, 1)=(−12, 5) and (5, 6)+(1, 1)=(6, 7), are used a forward motion vector and a backward motion vector respectively, and motion search with first precision is separately performed on the forward prediction reference picture block and the backward prediction reference picture block. In this case, the first precision is 1/4 pixel precision in a 1-pixel range. The first decoding prediction block DPB1 is used as a reference. Corresponding new forward and backward decoding prediction blocks obtained in each motion search are compared with the first decoding prediction block DPB1, to obtain a new decoding prediction block with a minimum difference from DPB1, and forward and backward motion vectors corresponding to the new decoding prediction block are used as target motion vector predictors, and are assumed to be (−11, 4) and (6, 6) respectively.

Target motion vectors are updated to (−11, 4) and (6, 6), forward prediction and backward prediction are separately performed on the first decoding block based on the target motion vectors, a target decoding prediction block is obtained by performing weighted summation on obtained new forward and backward decoding prediction blocks, and is assumed to be DPB2, and the decoding prediction block of the current decoding block is updated to DPB2.

Figure 19:
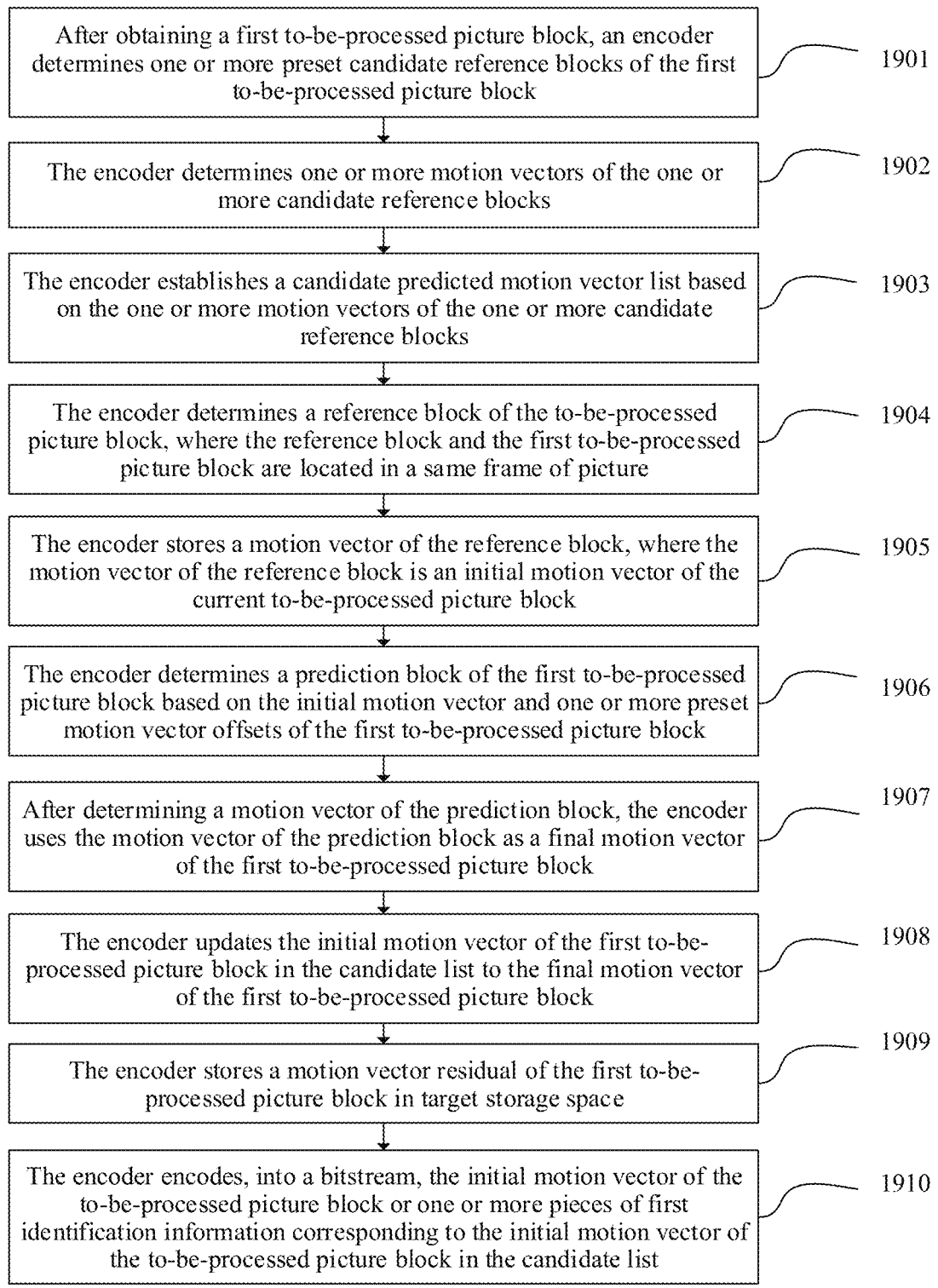
FIG. 19 is a schematic flowchart of a motion vector obtaining method according to an embodiment of this application.

To further reflect core technical content of this application, a process of storing a motion vector by an encoder in a merge mode is described below by using a specific embodiment. FIG. 19 is a schematic flowchart of a method for obtaining a motion vector by an encoder according to an embodiment of this application. The method includes the following operations.

1901: After obtaining a first to-be-processed picture block, the encoder determines one or more preset candidate reference blocks of the first to-be-processed picture block.

Referring to FIG. 3, the first to-be-processed picture block is a to-be-processed picture block, that is, a to-be-encoded picture block, obtained after a partitioning unit of the encoder partitions obtained video data. It should be noted that the first to-be-processed picture block may be a current PU, or may be a current CU. This is not limited in this embodiment of the present invention.

The candidate reference block includes a picture block that has a preset spatial location relationship with the first to-be-processed picture block. The preset spatial location relationship may be the location relationship shown in FIG. 5. Because the candidate reference block shown in FIG. 5 is neighboring to the first to-be-processed picture block, that is, pixel information of the candidate reference block is relatively similar to that of the first to-be-processed picture block, a motion vector of the candidate reference block may be used as a predicted motion vector of the first to-be-processed picture block, to predict the first to-be-processed picture block. In some embodiments, the candidate reference block further includes another actual picture block or a virtual picture block that has a preset spatial correlation with the first to-be-processed picture block. In this embodiment of this application, the location relationship between the candidate reference block and the first to-be-processed picture block is not limited by a quantity of candidate reference blocks.

1902: The encoder determines one or more motion vectors of the one or more candidate reference blocks.

In an embodiment of this application, a motion vector update process is performed on the candidate reference block. When the update process on the candidate reference block is completed, the candidate reference block has an initial motion vector and a final motion vector, that is, the candidate reference block correspondingly stores the initial motion vector and the final motion vector. In some embodiments, the candidate reference block correspondingly stores an initial motion vector and a motion vector residual, and a final motion vector of the candidate reference block may be obtained by adding the initial motion vector and the motion vector residual of the candidate reference block.

However, when the update process on the candidate reference block is not completed, the candidate reference block has only an initial motion vector, that is, the candidate reference block correspondingly stores only the initial motion vector of the candidate reference block.

Because the candidate reference block has the initial motion vector and the final motion vector, the encoder may use the initial motion vector or the final motion vector of the candidate reference block as the motion vector of the candidate reference block, so that the motion vector of the candidate reference block is used as a spatial candidate predicted motion vector of the first to-be-processed picture block.

It should be noted that, for the motion vector update process on the reference block, refer to the embodiment of this application related to FIG. 13. It should be understood that the reference block in the embodiment related to FIG. 19 is the to-be-processed picture block in the embodiment related to FIG. 13.

In operation 1902, the motion vector of the candidate reference block may be determined based on a preset range of the candidate reference block. For example, when the candidate reference block falls within the preset range, the initial motion vector of the candidate reference block is used as the motion vector of the candidate reference block, or when the candidate reference block falls beyond the preset range, the final motion vector of the candidate reference block is used as the motion vector of the candidate reference block. Therefore, the one or more motion vectors of the one or more candidate reference blocks can be determined.

Figure 21:
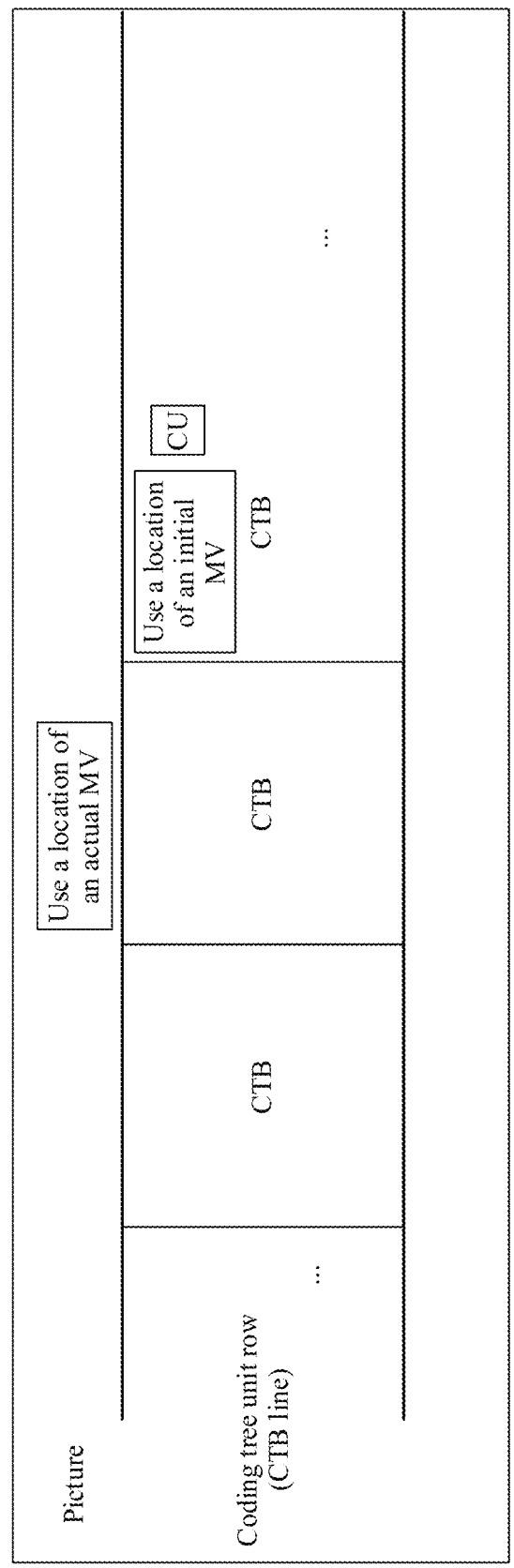
FIG. 21 is a schematic diagram of selecting a motion vector in a specified range according to an embodiment of this application.

In an embodiment, the preset range may be a CTB row range. For example, when a CTB in which the candidate reference block is located and a CTB in which the first to-be-processed picture block is located are located in a same row, the initial motion vector of the candidate reference block is used as the motion vector of the candidate reference block. Correspondingly, when the CTB in which the candidate reference block is located and the CTB in which the first to-be-processed picture block is located are not located in a same row, the final motion vector of the candidate reference block is used as the motion vector of the candidate reference block. Referring to FIG. 21, it may be understood that, when the coding tree block in which the candidate reference block is located and the coding tree block in which the first to-be-processed picture block is located are located in different rows, and the coding tree block in which the candidate reference block is located and the coding tree block in which the first to-be-processed picture block is located are located in neighboring space of the different rows, the initial motion vector of the candidate reference block is used as the motion vector of the candidate reference block. The neighboring space of the different rows may be top space, top left space, or the like of the different rows. A specific range of the neighboring space of the different rows is not limited in this embodiment of the present invention.

In a related technology, an encoder may simultaneously encode a plurality of to-be-processed picture blocks. However, when the plurality of to-be-processed picture blocks are located in a same CTB row, the plurality of to-be-processed picture blocks may be candidate reference blocks of each other. Once the plurality of to-be-processed picture blocks are candidate reference blocks of each other, an updated final motion vector of another block can be used as a spatial candidate predicted motion vector of a current to-be-processed picture block only after the another block is updated. Consequently, an encoding delay exists. In addition, because the plurality of to-be-processed picture blocks are candidate reference blocks of each other, there is a need to wait until the other blocks are updated. Consequently, an encoding delay is increased.

Therefore, the initial motion vector of the candidate reference block may be directly used as the motion vector of the candidate reference block, and then the motion vector of the candidate reference block is used as the spatial candidate predicted motion vector of the first to-be-processed picture block. For this, refer to operation 1903.

When the CTB in which the candidate reference block is located and the CTB in which the first to-be-processed picture block is located are located in a same row, the update process on the candidate reference block may not be completed. Therefore, the initial motion vector of the candidate reference block may be directly used as the motion vector of the candidate reference block, and there is no need to wait until the candidate reference block is updated, reducing an encoding delay. When the CTB in which the candidate reference block is located and the CTB in which the first to-be-processed picture block is located are not located in a same row, it indicates that there is enough time to complete the update process on the candidate reference block. Therefore, the candidate reference block has the final motion vector, and the final motion vector of the candidate reference block may be used as the motion vector of the candidate reference block. In addition, because the final motion vector is a motion vector obtained after the initial motion vector is refined, using the final motion vector as the motion vector of the candidate reference block can ensure encoding quality.

The preset range may alternatively be a CTB block range. For example, when the candidate reference block and the first to-be-processed picture block are located in a same CTB, the initial motion vector of the candidate reference block is used as the motion vector of the candidate reference block. Correspondingly, when the candidate reference block and the first to-be-processed picture block are not located in a same CTB, the final motion vector of the candidate reference block is used as the motion vector of the candidate reference block.

When the candidate reference block and the first to-be-processed picture block are located in a same CTB, it indicates that the update process on the candidate reference block may not be completed, and the initial motion vector of the candidate reference block is directly used as the motion vector of the candidate reference block without a need to wait until the candidate reference block is updated, reducing an encoding delay. In addition, when the candidate reference block and the first to-be-processed picture block are not located in a same CTB, it indicates that there is enough time to complete the update process on the candidate reference block. In addition, because the final motion vector is a motion vector obtained after the initial motion vector is refined, using the final motion vector of the candidate reference block that is not located in the same CTB as the first to-be-processed picture block as the motion vector of the candidate reference block can ensure encoding quality.

The preset range may alternatively be a same CTB block range or a range of left neighboring and right neighboring CTB blocks. For example, when a CTB in which the candidate reference block is located is the same as a CTB in which the first to-be-processed picture block is located, or a CTB in which the candidate reference block is located is a left neighboring or right neighboring block of a CTB in which the first to-be-processed picture block is located, the initial motion vector of the candidate reference block is used as the motion vector of the candidate reference block. Correspondingly, when the CTB in which the candidate reference block is located is not the same as the CTB in which the first to-be-processed picture block is located, or the CTB in which the candidate reference block is located is not a left neighboring or right neighboring block of the CTB in which the first to-be-processed picture block is located, the final motion vector of the candidate reference block is used as the motion vector of the candidate reference block.

When the CTB in which the candidate reference block is located is the same as the CTB in which the first to-be-processed picture block is located, or the CTB in which the candidate reference block is located is a left neighboring or right neighboring block of the CTB in which the first to-be-processed picture block is located, it indicates that the update process on the candidate reference block may not be completed, and the initial motion vector of the candidate reference block is directly used as the motion vector of the candidate reference block without a need to wait until the candidate reference block is updated, reducing an encoding delay. In addition, when the CTB in which the candidate reference block is located is not the same as the CTB in which the first to-be-processed picture block is located, or the CTB in which the candidate reference block is located is not a left neighboring or right neighboring block of the CTB in which the first to-be-processed picture block is located, it indicates that there is enough time to complete the update process on the candidate reference block. In addition, because the final motion vector is a motion vector obtained after the initial motion vector is refined, using the final motion vector of the candidate reference block as the motion vector of the candidate reference block can ensure encoding quality.

1903: The encoder establishes a candidate predicted motion vector list based on the one or more motion vectors of the one or more candidate reference blocks.

For a manner of establishing the candidate predicted motion vector list, refer to FIG. 6 to FIG. 9. Details are not described herein again.

1904: The encoder determines a reference block of the to-be-processed picture block, where the reference block and the first to-be-processed picture block are located in a same frame of picture.

A candidate reference block with a minimum rate-distortion cost is selected from the one or more candidate reference blocks of the first to-be-processed picture block as the reference block of the first to-be-processed picture block.

1905: The encoder stores a motion vector of the reference block, where the motion vector of the reference block is an initial motion vector of the first to-be-processed picture block.

The motion vector of the reference block may be obtained from a corresponding location in the established candidate predicted motion vector list.

Operation 1901 to operation 1905 are a process in which the encoder obtains an initial motion vector of the first to-be-processed picture block.

1906: The encoder determines a prediction block of the first to-be-processed picture block based on the initial motion vector and one or more preset motion vector offsets of the first to-be-processed picture block.

Operation 1906 may be completed by using 13021 to 13024 in FIG. 13. Details are not described herein again.

The one or more preset motion vector offsets may be set based on a pixel unit. For example, a picture block indicated by the initial motion vector of the first to-be-processed picture block is used as a temporary prediction block of the first to-be-processed picture block, and one or more candidate prediction blocks within one pixel unit or 1/2 pixel unit of the temporary prediction block are searched for by using the temporary prediction block as a center. Certainly, another length or another pixel unit may be used. The one or more preset motion vector offsets are not limited in this embodiment of this application.

1907: After determining a motion vector of the prediction block, the encoder uses the motion vector of the prediction block as a final motion vector of the first to-be-processed picture block.

In operation 1907, the motion vector of the prediction block may be determined based on a preset range of the prediction block. For example, when the prediction block falls within the preset range, an initial motion vector of the prediction block is used as the motion vector of the prediction block, or when the prediction block falls beyond the preset range, a final motion vector of the prediction block is used as the motion vector of the prediction block.

In an embodiment, the preset range may be a CTB row range. For example, when a CTB in which the prediction block is located and a CTB in which the first to-be-processed picture block is located are located in a same row, the initial motion vector of the prediction block is used as the motion vector of the prediction block. Correspondingly, when the CTB in which the prediction block is located and the CTB in which the first to-be-processed picture block is located are not located in a same row, the initial motion vector of the prediction block is used as the motion vector of the prediction block. Referring to FIG. 21, it may be understood that, when the coding tree block in which the prediction block is located and the coding tree block in which the first to-be-processed picture block is located are located in different rows, and the coding tree block in which the prediction block is located and the coding tree block in which the first to-be-processed picture block is located are located in neighboring space of the different rows, the initial motion vector of the prediction block is used as the motion vector of the prediction block. The neighboring space of the different rows may be top space, top left space, or the like of the different rows. A specific range of the neighboring space of the different rows is not limited in this embodiment of the present invention.

When the CTB in which the prediction block is located and the CTB in which the first to-be-processed picture block is located are located in a same row, an update process on the prediction block may not be completed. Therefore, the initial motion vector of the prediction block may be directly used as the motion vector of the prediction block, and there is no need to wait until the prediction block is updated, reducing an encoding delay. When the CTB in which the prediction block is located and the CTB in which the first to-be-processed picture block is located are not located in a same row, it indicates that there is enough time to complete an update process on the prediction block. Therefore, the prediction block has the final motion vector, and the final motion vector of the prediction block may be used as the motion vector of the prediction block. In addition, because the final motion vector is a motion vector obtained after the initial motion vector is refined, using the final motion vector as the motion vector of the prediction block can ensure encoding quality.

In some embodiments, the preset range may alternatively be a CTB block range. In some other embodiments, the preset range may alternatively be a same CTB block. Determining of the motion vector of the prediction block is similar to determining of the motion vector of the candidate reference block. For this, refer to operation 1902. Details are not described herein again.

1908: The encoder updates the initial motion vector of the first to-be-processed picture block in the candidate list to the final motion vector of the first to-be-processed picture block.

1909: The encoder stores a motion vector residual of the first to-be-processed picture block in target storage space.

The motion vector residual is a motion vector difference between the final motion vector of the first to-be-processed picture block and the initial motion vector of the first to-be-processed picture block.

The target storage space is space for storing the motion vector residual by the encoder. For example, the target storage space may be the reference picture storage 64 in FIG. 2.

It should be noted that, in a merge mode in a related technology, the target storage space stores a zero vector, or the target storage space stores no data. However, in the merge mode in this embodiment of this application, the motion vector residual of the to-be-processed picture block is stored in the target storage space, so that not only the target storage space can be fully used, but also a motion vector of another picture block can be flexibly selected when the motion vector of the another picture block is required for the first to-be-processed picture block. As shown in operations 1902 and 1907, encoding efficiency of the encoder is further improved.

In addition, in some implementations, in operation 1909, the final motion vector of the first to-be-processed picture block may alternatively be used as the motion vector residual of the first to-be-processed picture block and stored in the target storage space, that is, the final motion vector of the first to-be-processed picture block is stored in the target storage space, and the motion vector residual of the first to-be-processed picture block is not stored in the target storage space. In this case, when the final motion vector of the first to-be-processed picture block is required for another block, the final motion vector of the first to-be-processed picture block can be directly obtained from the target storage space of the encoder without a need to add the initial motion vector of the first to-be-processed picture block and the motion vector residual of the first to-be-processed picture block.

For a specific storage manner of operation 1909, refer to FIG. 21.

It should be noted that there is no strict requirement on a sequence of operations 1908 and 1909, and the encoder may alternatively perform operation 1909 before operation 1908. This is not limited in this embodiment of this application.

Operations 1906 to 1909 are a process in which the encoder obtains the final motion vector of the first to-be-processed picture block.

1910: The encoder encodes, into a bitstream, the initial motion vector of the to-be-processed picture block or one or more pieces of first identification information corresponding to the initial motion vector of the to-be-processed picture block in the candidate list.

The identification information may include an index. Certainly, in some implementations, the identification information may further include a prediction mode. The index is used to indicate a corresponding motion vector in the candidate predicted motion vector list, the motion vector is the initial motion vector or the final motion vector of the first to-be-processed picture block, and the prediction mode includes a merge mode, an AMVPA mode, and a skip mode. In this embodiment of this application, the prediction mode is the merge mode. Certainly, in another embodiment, the prediction mode may be another mode. This is not limited in this embodiment of this application.

In the foregoing embodiment, when encoding the current coding block, the encoder uses the unupdated initial motion vector of the reference block as the predicted motion vector of the current coding block instead of the final motion vector of the reference block. In this way, when the motion vector of the reference block is required for the current coding block, a related operation can be performed without a need to wait until the final motion vector of the reference block is updated, ensuring that an encoding delay is reduced while encoding efficiency is improved because the motion vector is updated.

It should be noted that, when an inter prediction mode used by the encoder is forward prediction or backward prediction, the motion vector of the candidate reference block, the motion vector of the reference block, and the motion vector of the prediction block include a forward motion vector or a backward motion vector. Correspondingly, when the candidate predicted motion vector list is established, the candidate predicted motion vector list includes only a list 0 or a list 1, the initial motion vector of the to-be-processed picture block includes a forward initial motion vector or a backward initial motion vector, and the final motion vector of the to-be-processed picture block includes a forward final motion vector or a backward final motion vector.

When the inter prediction mode used by the encoder is bidirectional prediction, the motion vector of the candidate reference block, the motion vector of the reference block, and the motion vector of the prediction block include a first motion vector and a second motion vector, the first motion vector is a forward motion vector, and the second motion vector is a backward motion vector. Correspondingly, when the candidate predicted motion vector list is established, the candidate predicted motion vector list includes a list 0 and a list 1, the initial motion vector of the to-be-processed picture block includes a first initial motion vector and a second initial motion vector, and the final motion vector of the to-be-processed picture block includes a first final motion vector and a second final motion vector. The first initial motion vector and the first final motion vector are forward motion vectors, and the second initial motion vector and the second final motion vector are backward motion vectors.

Figure 20:
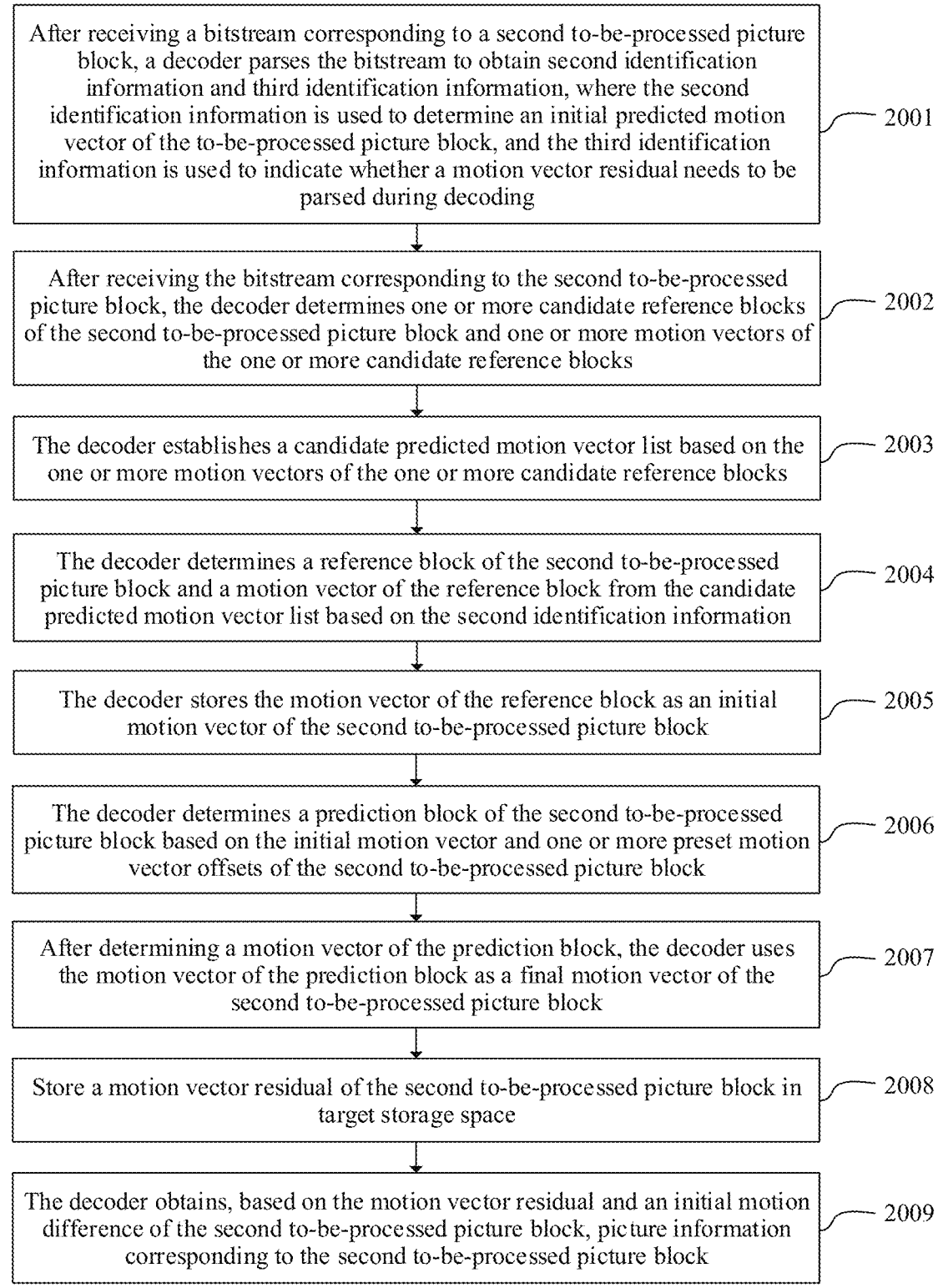
FIG. 20 is a schematic flowchart of a motion vector obtaining method according to an embodiment of this application.

The foregoing content is described for the encoder. Correspondingly, a process of storing a motion vector by a decoder in a merge mode is described below by using a specific embodiment. FIG. 20 is a schematic flowchart of a method for obtaining a motion vector by a decoder according to an embodiment of this application. The method includes the following operations.

2001: After receiving a bitstream corresponding to a second to-be-processed picture block, the decoder parses the bitstream to obtain second identification information and third identification information, where the second identification information is used to determine an initial predicted motion vector of the to-be-processed picture block, and the third identification information is used to indicate whether a motion vector residual needs to be parsed during decoding.

The second identification information may include an index that is used to determine the initial motion vector of the to-be-processed picture block. Referring to operations 2002 and 2004, in some embodiments, the second identification information may further include a prediction mode type.

The third identification information is used to indicate whether the motion vector residual needs to be parsed during decoding. In this embodiment of this application, the motion vector residual does not need to be parsed in the merge mode, but the motion vector residual may be parsed in another embodiment. For example, in an SMVP mode, when adding the motion vector residual of the second to-be-processed picture block to the bitstream according to the indication of the third identification information, the decoder can obtain the motion vector residual by parsing the bitstream. In this case, the decoder directly stores the motion vector residual in target storage space.

2002: After receiving the bitstream corresponding to the second to-be-processed picture block, the decoder determines one or more candidate reference blocks of the second to-be-processed picture block and one or more motion vectors of the one or more candidate reference blocks.

The one or more candidate reference blocks include a picture block that has a preset spatial location relationship with the second to-be-processed picture block. For determining of the candidate reference block, refer to FIG. 5. Details are not described herein again.

In an embodiment of this application, a motion vector update process is performed on the candidate reference block. When the update process on the candidate reference block is completed, the candidate reference block has an initial motion vector and a final motion vector, that is, the candidate reference block stores the initial motion vector and the final motion vector. In some embodiments, the candidate reference block stores an initial motion vector and a motion vector residual, and a final motion vector of the candidate reference block may be obtained by adding the initial motion vector and the motion vector residual of the candidate reference block.

However, when the update process on the candidate reference block is not completed, the candidate reference block has only an initial motion vector, that is, the candidate reference block stores only the initial motion vector of the candidate reference block.

Because the candidate reference block has the initial motion vector and the final motion vector, the decoder needs to use the initial motion vector or the final motion vector of the candidate reference block as the motion vector of the candidate reference block, so that the motion vector of the candidate reference block is used as a spatial candidate predicted motion vector of the second to-be-processed picture block.

It should be noted that, for the motion vector update process on the reference block and obtaining of the initial motion vector, refer to the embodiment of this application related to FIG. 14. It should be understood that the reference block in the embodiment related to FIG. 20 is the to-be-processed picture block in the embodiment related to FIG. 14.

In operation 2002, the motion vector of the candidate reference block may be determined based on a preset range of the candidate reference block. For example, when the candidate reference block falls within the preset range, the initial motion vector of the candidate reference block is used as the motion vector of the candidate reference block, or when the candidate reference block falls beyond the preset range, the final motion vector of the candidate reference block is used as the motion vector of the candidate reference block. Therefore, the one or more motion vectors of the one or more candidate reference blocks can be determined.

In an embodiment, the preset range may be a CTB row range. For example, when a CTB in which the candidate reference block is located and a CTB in which the second to-be-processed picture block is located are located in a same row, the initial motion vector of the candidate reference block is used as the motion vector of the candidate reference block. Correspondingly, when the CTB in which the candidate reference block is located and the CTB in which the second to-be-processed picture block is located are not located in a same row, the initial motion vector of the candidate reference block is used as the motion vector of the candidate reference block. Referring to FIG. 21, it may be understood that, when the coding tree block in which the candidate reference block is located and the coding tree block in which the second to-be-processed picture block is located are located in different rows, and the coding tree block in which the candidate reference block is located and the coding tree block in which the second to-be-processed picture block is located are located in neighboring space of the different rows, the initial motion vector of the candidate reference block is used as the motion vector of the candidate reference block. The neighboring space of the different rows may be top space, top left space, or the like of the different rows. A specific range of the neighboring space of the different rows is not limited in this embodiment of the present invention.

In a related technology, a decoder may simultaneously decode a plurality of to-be-processed picture blocks. However, when the plurality of to-be-processed picture blocks are located in a same CTB row, the plurality of to-be-processed picture blocks may be candidate reference blocks of each other. Once the plurality of to-be-processed picture blocks are candidate reference blocks of each other, an updated final motion vector of another block can be used as a spatial candidate predicted motion vector of a current to-be-processed picture block only after the another block is updated. Consequently, a decoding delay exists. In addition, because the plurality of to-be-processed picture blocks are candidate reference blocks of each other, there is no need to wait until the other blocks are updated. Consequently, a decoding delay is increased.

Therefore, the initial motion vector of the candidate reference block may be directly used as the motion vector of the candidate reference block, and then the motion vector of the candidate reference block is used as the spatial candidate predicted motion vector of the second to-be-processed picture block. For this, refer to operation 2003.

When the CTB in which the candidate reference block is located and the CTB in which the second to-be-processed picture block is located are located in a same row, the update process on the candidate reference block may not be completed. Therefore, the initial motion vector of the candidate reference block may be directly used as the motion vector of the candidate reference block, and there is no need to wait until the candidate reference block is updated, reducing a decoding delay. When the CTB in which the candidate reference block is located and the CTB in which the second to-be-processed picture block is located are not located in a same row, it indicates that there is enough time to complete the update process on the candidate reference block. Therefore, the candidate reference block has the final motion vector, and the final motion vector of the candidate reference block may be used as the motion vector of the candidate reference block. In addition, because the final motion vector is a motion vector obtained after the initial motion vector is refined, using the final motion vector as the motion vector of the candidate reference block can ensure decoding quality.

The preset range may alternatively be a CTB block range. For example, when the candidate reference block and the second to-be-processed picture block are located in a same CTB, the initial motion vector of the candidate reference block is used as the motion vector of the candidate reference block. Correspondingly, when the candidate reference block and the second to-be-processed picture block are not located in a same CTB, the final motion vector of the candidate reference block is used as the motion vector of the candidate reference block.

When the candidate reference block and the second to-be-processed picture block are located in a same CTB, it indicates that the update process on the candidate reference block may not be completed, and the initial motion vector of the candidate reference block is directly used as the motion vector of the candidate reference block without a need to wait until the candidate reference block is updated, reducing a decoding delay. In addition, when the candidate reference block and the second to-be-processed picture block are not located in a same CTB, it indicates that there is enough time to complete the update process on the candidate reference block. In addition, because the final motion vector is a motion vector obtained after the initial motion vector is refined, using the final motion vector of the candidate reference block that is not located in the same CTB as the second to-be-processed picture block as the motion vector of the candidate reference block can ensure decoding quality.

The preset range may alternatively be a same CTB block range or a range of left neighboring and right neighboring CTB blocks. For example, when a CTB in which the candidate reference block is located is the same as a CTB in which the second to-be-processed picture block is located, or a CTB in which the candidate reference block is located is a left neighboring or right neighboring block of a CTB in which the second to-be-processed picture block is located, the initial motion vector of the candidate reference block is used as the motion vector of the candidate reference block. Correspondingly, when the CTB in which the candidate reference block is located is not the same as the CTB in which the second to-be-processed picture block is located, or the CTB in which the candidate reference block is located is not a left neighboring or right neighboring block of the CTB in which the second to-be-processed picture block is located, the final motion vector of the candidate reference block is used as the motion vector of the candidate reference block.

When the CTB in which the candidate reference block is located is the same as the CTB in which the second to-be-processed picture block is located, or the CTB in which the candidate reference block is located is a left neighboring or right neighboring block of the CTB in which the second to-be-processed picture block is located, it indicates that the update process on the candidate reference block may not be completed, and the initial motion vector of the candidate reference block is directly used as the motion vector of the candidate reference block without a need to wait until the candidate reference block is updated, reducing a decoding delay. In addition, when the CTB in which the candidate reference block is located is not the same as the CTB in which the second to-be-processed picture block is located, or the CTB in which the candidate reference block is located is not a left neighboring or right neighboring block of the CTB in which the second to-be-processed picture block is located, it indicates that there is enough time to complete the update process on the candidate reference block. In addition, because the final motion vector is a motion vector obtained after the initial motion vector is refined, using the final motion vector of the candidate reference block as the motion vector of the candidate reference block can ensure decoding quality.

2003: The decoder establishes a candidate predicted motion vector list based on the one or more motion vectors of the one or more candidate reference blocks.

Operation 2003 is the same as operation 1903, that is, a manner in which the decoder establishes the candidate predicted motion vector list is consistent with the manner in which the encoder establishes the candidate predicted motion vector list, and the established candidate predicted motion vector lists are the same. The encoder is an encoder that encodes the bitstream received by the decoder.

2004: The decoder determines a reference block of the second to-be-processed picture block and a motion vector of the reference block from the candidate predicted motion vector list based on the second identification information.

A motion vector indicated by an index in the second identification information is selected from the candidate predicted motion vector list based on the index. The motion vector is an initial motion vector of the second to-be-processed picture block, and the motion vector is also the motion vector of the reference block of the second to-be-processed picture block.

2005: The decoder stores the motion vector of the reference block as an initial motion vector of the second to-be-processed picture block.

Operations 2001 to 2005 are a process in which the decoder obtains the initial motion vector of the second to-be-processed picture block.

2006: The decoder determines a prediction block of the second to-be-processed picture block based on the initial motion vector and one or more preset motion vector offsets of the second to-be-processed picture block.

Operation 2006 may be completed by using 14021 to 14024 in FIG. 14. Details are not described herein again.

For the one or more preset motion vector offsets, refer to operation 1906. Details are not described herein again.

It should be noted that there is no specific sequence of performing operations 2005 and 2006, and operation 2006 may alternatively be performed before operation 2005. A sequence of performing operations 2005 and 2006 is not limited in this embodiment of this application.

2007: After determining a motion vector of the prediction block, the decoder uses the motion vector of the prediction block as a final motion vector of the second to-be-processed picture block.

In operation 2007, the motion vector of the candidate reference block may be determined based on a preset range of the prediction block. For example, when the prediction block falls within the preset range, an initial motion vector of the prediction block is used as the motion vector of the prediction block, or when the prediction block falls beyond the preset range, a final motion vector of the prediction block is used as the motion vector of the prediction block.

Specifically, the preset range may be a CTB row range. For example, when a CTB in which the prediction block is located and a CTB in which the second to-be-processed picture block is located are located in a same row, the initial motion vector of the prediction block is used as the motion vector of the prediction block. Correspondingly, when the CTB in which the prediction block is located and the CTB in which the second to-be-processed picture block is located are not located in a same row, the initial motion vector of the prediction block is used as the motion vector of the prediction block. Referring to FIG. 21, it may be understood that, when the coding tree block in which the prediction block is located and the coding tree block in which the second to-be-processed picture block is located are located in different rows, and the coding tree block in which the prediction block is located and the coding tree block in which the second to-be-processed picture block is located are located in neighboring space of the different rows, the initial motion vector of the prediction block is used as the motion vector of the prediction block. The neighboring space of the different rows may be top space, top left space, or the like of the different rows. A specific range of the neighboring space of the different rows is not limited in this embodiment of the present invention.

When the CTB in which the prediction block is located and the CTB in which the second to-be-processed picture block is located are located in a same row, an update process on the prediction block may not be completed. Therefore, the initial motion vector of the prediction block may be directly used as the motion vector of the prediction block, and there is no need to wait until the prediction block is updated, reducing a decoding delay. When the CTB in which the prediction block is located and the CTB in which the second to-be-processed picture block is located are not located in a same row, it indicates that there is enough time to complete an update process on the prediction block. Therefore, the prediction block has the final motion vector, and the final motion vector of the prediction block may be used as the motion vector of the prediction block. In addition, because the final motion vector is a motion vector obtained after the initial motion vector is refined, using the final motion vector as the motion vector of the prediction block can ensure decoding quality.

In some embodiments, the preset range may alternatively be a CTB block range. In some other embodiments, the preset range may alternatively be a same CTB block range. Determining of the motion vector of the prediction block is similar to determining of the motion vector of the candidate reference block. For this, refer to operation 1802. Details are not described herein again.

Operations 2006 and 2007 are a process in which the decoder obtains the final motion vector of the second to-be-processed picture block.

2008: Store a motion vector residual of the second to-be-processed picture block in target storage space.

The target storage space is space for storing the motion vector residual by the decoder. For example, the target storage space may be the reference picture storage 92 in FIG. 3.

It should be noted that, in a merge mode in a related technology, the target storage space stores a zero vector, or the target storage space stores no data. However, in the merge mode in this embodiment of this application, the motion vector residual of the to-be-processed picture block is stored in the target storage space, so that not only the target storage space can be fully used, but also a motion vector of another picture block can be flexibly selected when the motion vector of the another picture block is required for the second to-be-processed picture block. As shown in operations 2002 and 2007, decoding efficiency of the decoder is further improved.

In addition, in some embodiments, in operation 2008, the final motion vector of the second to-be-processed picture block may alternatively be used as the motion vector residual of the second to-be-processed picture block and stored in target storage space, that is, the final motion vector of the second to-be-processed picture block is stored in the target storage space, and the motion vector residual of the second to-be-processed picture block is not stored in the target storage space. In this case, when the final motion vector of the second to-be-processed picture block is required for another block, the final motion vector of the second to-be-processed picture block can be directly obtained from the target storage space of the decoder without a need to add the initial motion vector of the second to-be-processed picture block and the motion vector residual of the second to-be-processed picture block.

For a specific storage manner in this operation 2008, refer to FIG. 21.

It should be noted that there is no strict requirement on a sequence between operations 2007 and 2008, and the decoder may alternatively perform operation 2007 before operation 2008. This is not limited in this embodiment of this application.

2009: The decoder obtains, based on the motion vector residual and an initial motion difference of the second to-be-processed picture block, picture information corresponding to the second to-be-processed picture block.

The picture information includes pixel information that is used to identify original graphics of the second to-be-processed picture block.

The decoder obtains, based on the motion vector residual and the initial motion difference of the second to-be-processed picture block, the picture information corresponding to the second to-be-processed picture block. For this, refer to FIG. 3. Details are not described herein again.

Correspondingly, the decoder may alternatively obtain, based on the final motion vector of the second to-be-processed picture block, the picture information corresponding to the second to-be-processed picture block.

In the foregoing embodiment, when decoding the current decoding block, the decoder uses the unupdated initial motion vector of the reference block as the predicted motion vector of the current decoding block instead of the final motion vector of the reference block. In this way, when the motion vector of the reference block is required for the current decoding block, a related operation can be performed without a need to wait until the final motion vector of the reference block is updated, ensuring that a decoding delay is reduced while decoding efficiency is improved because the motion vector is updated.

To further reflect a motion vector storage manner, a specific embodiment is used herein to describe a storage operation. Specific descriptions are as follows:

In the merge mode, there may be two MVs in each prediction direction, which are respectively first MV information and second MV information. For example, the first MV and the second MV may be respectively an initial motion vector of the reference block and a candidate final motion vector of the reference block. An MVD derivation process is introduced into the merge mode. For example, in a forward prediction process, when the first MV is MV0 and the second MV is MV0', a derivation relationship exists: MV0'=MV0+(−) MVD0. By storing two MVs, for example, an index value of an initial motion vector and the foregoing MVD, that is, a difference between the two MVs, the first MV can be used under a specific condition and the second MV can be used under a specific condition, avoiding a delay.

For the specific condition, refer to operation 1902 or 2002. Details are not described herein again.

In an embodiment, in a non-merge mode, target storage space is used to store a motion vector residual of the reference block, and the motion vector residual of the reference block is a difference between the final motion vector of the reference block and a predicted motion vector of the reference block. In the merge mode, the target storage space is used to store the selected final motion vector, or the target storage space is used to store a difference between the initial motion vector and the selected final motion vector of the reference block.

Figure 22:
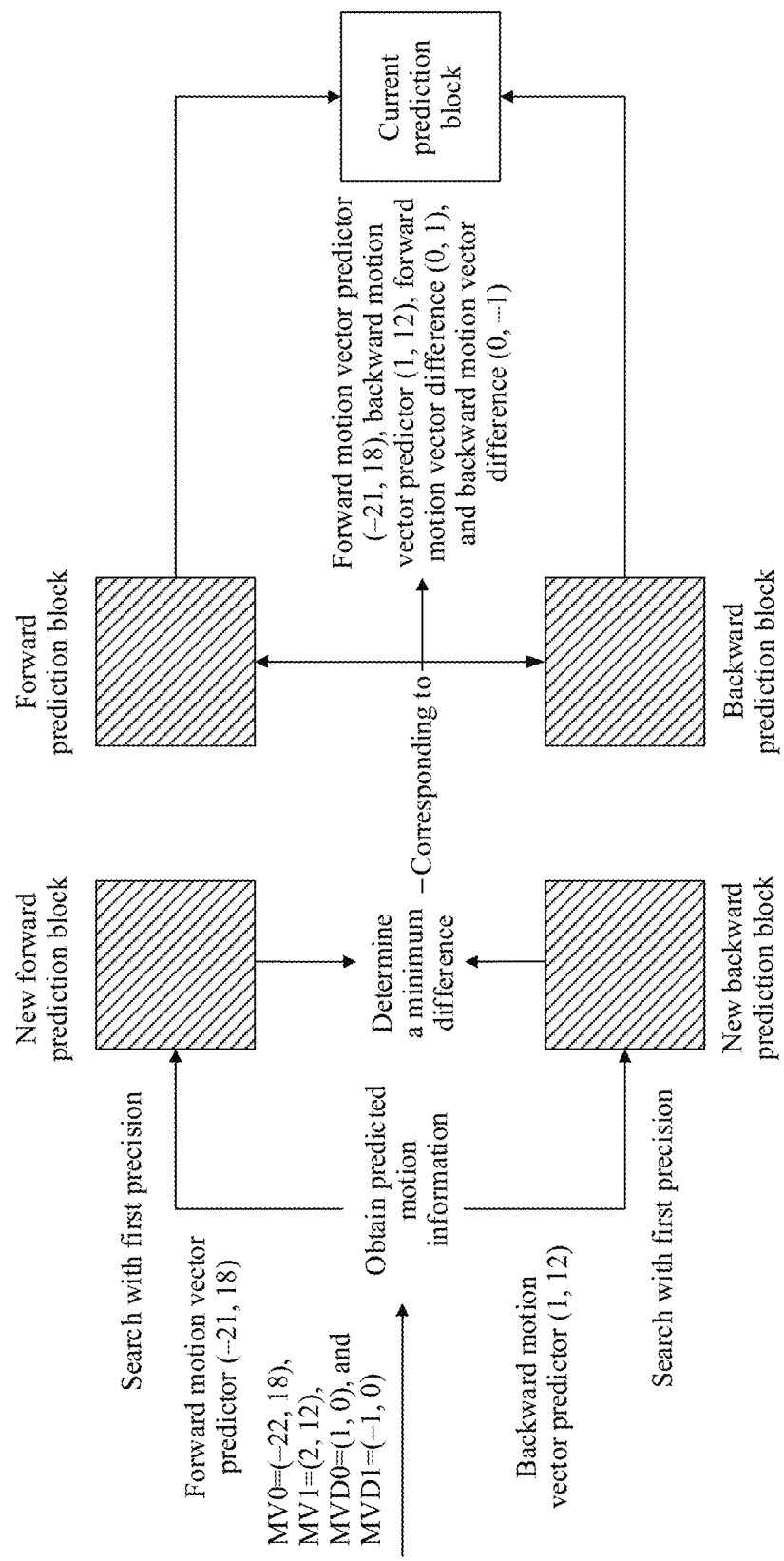
FIG. 22 is a schematic diagram of a current prediction block obtaining method according to an embodiment of this application.

Another embodiment of this application is as follows:

As shown in FIG. 22, a current coding block is a first coding block, predicted motion information of the current coding block is obtained, a reference block is in a merge mode, and a location of motion information of the reference block is not in a same CTB row range as the current coding block. In this case, a forward motion vector predictor of the current coding block (−21, 18) is obtained by adding a forward motion vector (−22, 18) of the reference block and a forward MVD (1, 0), a backward motion vector predictor (1, 12) of the current coding block is obtained by adding a backward motion vector (2, 12) of the reference block and a backward MVD (−1, 0), a POC of a picture in which the current coding block is located is 4, a POC of a forward reference picture that is indicated by an index value of the reference picture is 2, and a POC of a backward reference picture that is indicated by an index value of the reference picture is 6. In this case, a POC corresponding to the current coding block is 4, a POC corresponding to a forward prediction reference picture block is 2, and a POC corresponding to a backward prediction reference picture block is 6.

(−21, 18) is used as a reference input of the forward motion vector predictor, and motion search with first precision is performed on the forward prediction reference picture block. In this case, the first precision is 1 pixel precision in a 1-pixel range. A first forward prediction block is used as a reference, and a corresponding new forward prediction block is obtained through each motion search. (1, 12) is used as a reference input of the backward motion vector predictor, and motion search with first precision is performed on the backward prediction reference picture block. In this case, the first precision is 1 pixel precision in a 1-pixel range. A first backward prediction block is used as a reference, and a corresponding new backward prediction block is obtained through each motion search. The new forward prediction block is compared with the new backward prediction block, to obtain a forward prediction block with a minimum difference and a backward prediction block with a minimum difference, and a forward motion vector predictor corresponding to the forward prediction block and a backward motion vector predictor corresponding to the backward prediction block are used as target motion vector predictors, and are assumed to be (−21, 19) and (1, 11) respectively.

A forward MVD of the current coding block (0, 1) is obtained by subtracting the forward motion vector predictor (−21, 18) from the forward target motion vector predictor (−21, 19), and a backward MVD of the current coding block (0, −1) is obtained by subtracting the backward motion vector predictor (1, 12) from the backward target motion vector predictor (1, 11). MVD calculation method 1 is as follows: MVD0=(−21, 19) (−21, 18), and MVD1=(1, 11)-(1, 12); or MVD0=(−21, 19)−(−21, 18), and MVD1=−MVD0.

In addition, forward prediction and backward prediction are separately performed on the first coding block based on the target motion vector predictors, obtained forward and backward prediction blocks are used as target decoding prediction blocks, and the prediction blocks of the current coding block are updated.

It should be noted that, when the motion search with the first precision is performed on the forward prediction reference picture block and the backward prediction reference picture block, the first precision may be any specified precision, for example, may be integer pixel precision, 1/2 pixel precision, 1/4 pixel precision, or 1/8 pixel precision.

Another embodiment of this application is as follows:

As shown in FIG. 22, a current coding block is a first coding block, predicted motion information of the current coding block is obtained, a reference block is in a merge mode, and a location of motion information of the reference block is not in a same CTB range as the current coding block. In this case, a forward motion vector predictor of the current coding block (−21, 18) is obtained by adding a forward motion vector (−22, 18) of the reference block and a forward MVD (1, 0), a backward motion vector predictor (1, 12) of the current coding block is obtained by adding a backward motion vector (2, 12) of the reference block and a backward MVD (−1, 0), a POC of a picture in which the current coding block is located is 4, a POC of a forward reference picture that is indicated by an index value of the reference picture is 2, and a POC of a backward reference picture that is indicated by an index value of the reference picture is 6. In this case, a POC corresponding to the current coding block is 4, a POC corresponding to a forward prediction reference picture block is 2, and a POC corresponding to a backward prediction reference picture block is 6.

(−21, 18) is used as a reference input of the forward motion vector predictor, and motion search with first precision is performed on the forward prediction reference picture block. In this case, the first precision is 1 pixel precision in a 1-pixel range. A first forward prediction block is used as a reference, and a corresponding new forward prediction block is obtained through each motion search. (1, 12) is used as a reference input of the backward motion vector predictor, and motion search with first precision is performed on the backward prediction reference picture block. In this case, the first precision is 1 pixel precision in a 1-pixel range. A first backward prediction block is used as a reference, and a corresponding new backward prediction block is obtained through each motion search. The new forward prediction block is compared with the new backward prediction block, to obtain a forward prediction block with a minimum difference and a backward prediction block with a minimum difference, and a forward motion vector predictor corresponding to the forward prediction block and a backward motion vector predictor corresponding to the backward prediction block are used as target motion vector predictors, and are assumed to be (−21, 19) and (1, 11) respectively.

A forward MVD of the current coding block (0, 1) is obtained by subtracting the forward motion vector predictor (−21, 18) from the forward target motion vector predictor (−21, 19), and a backward MVD of the current coding block (0, −1) is obtained by subtracting the backward motion vector predictor (1, 12) from the backward target motion vector predictor (1, 11). MVD calculation method 1 is as follows: MVD0=(−21, 19) (−21, 18), and MVD1=(1, 11)-(1, 12); or MVD0=(−21, 19)−(−21, 18), and MVD1=−MVD0.

In addition, forward prediction and backward prediction are separately performed on the first coding block based on the target motion vector predictors, obtained forward and backward prediction blocks are used as target decoding prediction blocks, and the prediction blocks of the current coding block are updated.

It should be noted that, when the motion search with the first precision is performed on the forward prediction reference picture block and the backward prediction reference picture block, the first precision may be any specified precision, for example, may be integer pixel precision, 1/2 pixel precision, 1/4 pixel precision, or 1/8 pixel precision.

Another embodiment of this application is as follows:

As shown in FIG. 22, a current coding block is a first coding block, predicted motion information of the current coding block is obtained, a reference block is in a merge mode, and a location of motion information of the reference block is not in a same CTB line range as the current coding block. In this case, a forward motion vector predictor of the current coding block (−21, 18) is obtained by adding a forward motion vector (−22, 18) of the reference block and a forward MVD (1, 0), a backward motion vector predictor (1, 12) of the current coding block is obtained by adding a backward motion vector (2, 12) of the reference block and a backward MVD (−1, 0), a POC of a picture in which the current coding block is located is 4, a POC of a forward reference picture that is indicated by an index value of the reference picture is 2, and a POC of a backward reference picture that is indicated by an index value of the reference picture is 6. In this case, a POC corresponding to the current coding block is 4, a POC corresponding to a forward prediction reference picture block is 2, and a POC corresponding to a backward prediction reference picture block is 6.

(−21, 18) is used as a reference input of the forward motion vector predictor, and motion search with first precision is performed on the forward prediction reference picture block. In this case, the first precision is 1 pixel precision in a 1-pixel range. A first forward prediction block is used as a reference, and a corresponding new forward prediction block is obtained through each motion search. (1, 12) is used as a reference input of the backward motion vector predictor, and motion search with first precision is performed on the backward prediction reference picture block. In this case, the first precision is 1 pixel precision in a 1-pixel range. A first backward prediction block is used as a reference, and a corresponding new backward prediction block is obtained through each motion search. The new forward prediction block is compared with the new backward prediction block, to obtain a forward prediction block with a minimum difference and a backward prediction block with a minimum difference, and a forward motion vector predictor corresponding to the forward prediction block and a backward motion vector predictor corresponding to the backward prediction block are used as target motion vector predictors, and are assumed to be (−21, 19) and (1, 11) respectively.

Then, (−21, 19) is used as a reference input of the forward motion vector predictor, and motion search with first precision is performed on the forward prediction reference picture block. In this case, the first precision is 1/2 pixel precision. A first forward prediction block is used as a reference, and a corresponding new forward prediction block is obtained through each motion search. (1, 11) is used as a reference input of the backward motion vector predictor, and motion search with first precision is performed on the backward prediction reference picture block. In this case, the first precision is 1/2 pixel precision. A first backward prediction block is used as a reference, and a corresponding new backward prediction block is obtained through each motion search. The new forward prediction block is compared with the new backward prediction block, to obtain a forward prediction block with a minimum difference and a backward prediction block with a minimum difference, and a forward motion vector predictor corresponding to the forward prediction block and a backward motion vector predictor corresponding to the backward prediction block are used as target motion vector predictors.

A forward MVD of the current coding block (0, 1) is obtained by subtracting the forward motion vector predictor (−21, 18) from the forward target motion vector predictor (−21, 19), and a backward MVD of the current coding block (0, −1) is obtained by subtracting the backward motion vector predictor (1, 12) from the backward target motion vector predictor (1, 11). MVD calculation method 1 is as follows: MVD0=(−21, 19)−(−21, 18), and MVD1=(1, 11)−(1, 12); or MVD0=(−21, 19)−(−21, 18), and MVD1=−MVD0.

In addition, forward prediction and backward prediction are separately performed on the first coding block based on the target motion vector predictors, obtained forward and backward prediction blocks are used as target decoding prediction blocks, and the prediction blocks of the current coding block are updated.

It should be noted that, when the motion search with the first precision is performed on the forward prediction reference picture block and the backward prediction reference picture block, the first precision may be any specified precision, for example, may be integer pixel precision, 1/2 pixel precision, 1/4 pixel precision, or 1/8 pixel precision.

Another embodiment of this application is as follows:

A current coding block is a first coding block, predicted motion information of the current coding block is obtained. In this case, a forward motion vector predictor of the current coding block (−21, 18) is a forward motion vector (−21, 18) of a reference block, a backward motion vector predictor (1, 12) of the current coding block is a backward motion vector (1, 12) of the reference block, a POC of a picture in which the current coding block is located is 4, a POC of a forward reference picture that is indicated by an index value of the reference picture is 2, and a POC of a backward reference picture that is indicated by an index value of the reference picture is 6. In this case, a POC corresponding to the current coding block is 4, a POC corresponding to a forward prediction reference picture block is 2, and a POC corresponding to a backward prediction reference picture block is 6.

(−21, 18) is used as a reference input of the forward motion vector predictor, and motion search with first precision is performed on the forward prediction reference picture block. In this case, the first precision is 1 pixel precision in a 1-pixel range. A first forward prediction block is used as a reference, and a corresponding new forward prediction block is obtained through each motion search. (1, 12) is used as a reference input of the backward motion vector predictor, and motion search with first precision is performed on the backward prediction reference picture block. In this case, the first precision is 1 pixel precision in a 1-pixel range. A first backward prediction block is used as a reference, and a corresponding new backward prediction block is obtained through each motion search. The new forward prediction block is compared with the new backward prediction block, to obtain a forward prediction block with a minimum difference and a backward prediction block with a minimum difference, and a forward motion vector predictor corresponding to the forward prediction block and a backward motion vector predictor corresponding to the backward prediction block are used as target motion vector predictors, and are assumed to be (−21, 19) and (1, 11) respectively.

A forward MVD of the current coding block (0, 1) is obtained by subtracting the forward motion vector predictor (−21, 18) from the forward target motion vector predictor (−21, 19), and a backward MVD of the current coding block (0, −1) is obtained by subtracting the backward motion vector predictor (1, 12) from the backward target motion vector predictor (1, 11). MVD calculation method 1 is as follows: MVD0=(−21, 19)−(−21, 18), and MVD1=(1, 11)−(1, 12); or MVD0=(−21, 19)−(−21, 18), and MVD1=−MVD0.

In addition, forward prediction and backward prediction are separately performed on the first coding block based on the target motion vector predictors, obtained forward and backward prediction blocks are used as target decoding prediction blocks, and the prediction blocks of the current coding block are updated.

It should be noted that, when the motion search with the first precision is performed on the forward prediction reference picture block and the backward prediction reference picture block, the first precision may be any specified precision, for example, may be integer pixel precision, 1/2 pixel precision, 1/4 pixel precision, or 1/8 pixel precision.

In some embodiments, the to-be-processed picture block may include a plurality of sub-blocks, and a codec may obtain a final motion vector of the to-be-processed picture block based on a final motion vector of each sub-block. In an embodiment, each sub-block has an initial motion vector and a plurality of preset offset vectors of the sub-block. The codec may separately add an initial motion vector and a plurality of preset offset vectors of any one of the plurality of sub-blocks to obtain a plurality of candidate final motion vectors of the any sub-block. The codec uses a candidate final motion vector corresponding to a minimum distortion cost in the plurality of candidate final motion vectors of the any sub-block as a final motion vector of the any sub-block. Similarly, the codec may obtain a final motion vector of each sub-block, and then the codec may obtain a final motion vector of the to-be-processed picture block based on the final motion vector of each sub-block. A process of obtaining the final motion vector of the to-be-processed picture block based on the final motion vector of each sub-block is not limited in this embodiment of the present invention.

It should be noted that, before obtaining the plurality of candidate final motion vectors of the any sub-block, the codec needs to first determine the initial motion vector and the plurality of preset offset vectors of the any sub-block. A manner of determining the initial motion vector of the any sub-block is similar to the manner of determining the initial motion vector of the to-be-processed picture block, and is not described in this embodiment of the present invention. In addition, a manner of determining the plurality of preset offset vectors of the any sub-block is similar to the manner of determining the plurality of preset offset vectors of the to-be-processed picture block, and is not described in this embodiment of the present invention.

Figure 23:
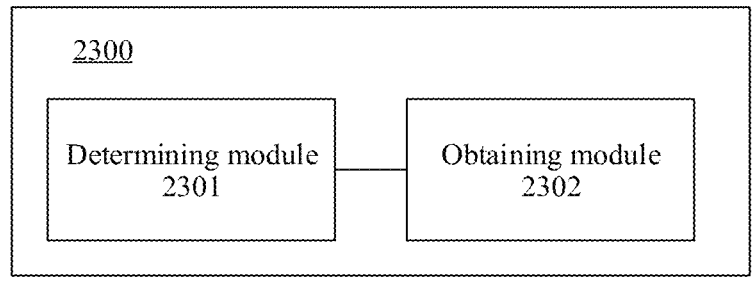
FIG. 23 is a schematic block diagram of a motion vector obtaining apparatus during video decoding according to an embodiment of this application.

FIG. 23 is a schematic block diagram of a motion vector obtaining apparatus 2300 according to an embodiment of this application. The apparatus 2300 includes:
  a determining module 2301, configured to determine a reference block of a to-be-processed picture block, where the reference block and the to-be-processed picture block have a preset temporal or spatial correlation, the reference block has an initial motion vector and one or more preset motion vector offsets, the initial motion vector of the reference block is obtained based on a predicted motion vector of the reference block, and a prediction block of the reference block is obtained based on the initial motion vector and the one or more preset motion vector offsets; and
  an obtaining module 2302, configured to use the initial motion vector of the reference block as a predicted motion vector of the to-be-processed picture block.

In an embodiment, the obtaining module 2302 is further configured to: use the predicted motion vector of the reference block as the initial motion vector of the reference block; or add the predicted motion vector of the reference block and a motion vector difference of the reference block to obtain the initial motion vector of the reference block.

In an embodiment, the obtaining module 2302 is further configured to: obtain, from a reference frame of the reference block, a picture block indicated by the initial motion vector of the reference block, to serve as a temporary prediction block of the reference block; add the initial motion vector and the one or more preset motion vector offsets of the reference block to obtain one or more actual motion vectors, where each actual motion vector indicates one search location; obtain one or more candidate prediction blocks at one or more search locations indicated by the one or more actual motion vectors, where each search location corresponds to one candidate prediction block; and select, from the one or more candidate prediction blocks, a candidate prediction block with a minimum pixel difference from the temporary prediction block as the prediction block of the reference block.

In an embodiment, the apparatus 2300 is used for bidirectional prediction, the reference frame includes a first-direction reference frame and a second-direction reference frame, the initial motion vector includes a first-direction initial motion vector and a second-direction initial motion vector, and the obtaining module 2302 is configured to: obtain, from the first-direction reference frame of the reference block, a first picture block indicated by the first-direction initial motion vector of the reference block; obtain, from the second-direction reference frame of the reference block, a second picture block indicated by the second-direction initial motion vector of the reference block; and perform weighted processing on the first picture block and the second picture block to obtain the temporary prediction block of the reference block.

In an embodiment, the obtaining module 2302 is configured to use the predicted motion vector of the to-be-processed picture block as an initial motion vector of the to-be-processed picture block.

In an embodiment, the obtaining module 2302 is configured to add the predicted motion vector of the to-be-processed picture block and a motion vector difference of the to-be-processed picture block to obtain an initial motion vector of the to-be-processed picture block.

In an embodiment, the apparatus 2300 is used for video decoding, and the motion vector difference of the to-be-processed picture block is obtained by parsing first identification information in a bitstream.

In an embodiment, the apparatus 2300 is used for video decoding, and the determining module 2301 is configured to: parse a bitstream to obtain second identification information; and determine the reference block of the to-be-processed picture block based on the second identification information.

In an embodiment, the apparatus 2300 is used for video encoding, and the determining module 2301 is configured to: select, from one or more candidate reference blocks of the to-be-processed picture block, a candidate reference block with a minimum rate-distortion cost as the reference block of the to-be-processed picture block.

Figure 24:
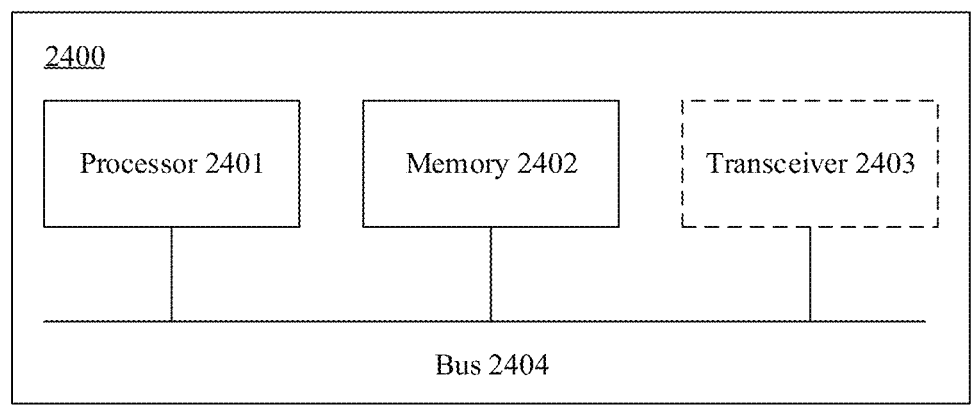
FIG. 24 is a schematic block diagram of a video coding device according to an embodiment of this application.

FIG. 24 is a schematic block diagram of a video coding device according to an embodiment of this application. The device 2400 may be applied to an encoder, or may be applied to a decoder. The device 2400 includes a processor 2401 and a memory 2402. The processor 2401 and the memory 2402 are connected to each other (for example, through a bus 2404). In a possible implementation, the device 2400 may further include a transceiver 2403. The transceiver 2403 is connected to the processor 2401 and the memory 2402, and is configured to receive/send data.

The memory 2402 includes but is not limited to a random access memory (RAM), a read-only memory (ROM), an erasable programmable read-only memory (EPROM), or a compact disc read-only memory (CD-ROM). The memory 2402 is configured to store related program code and video data.

The processor 2401 may be one or more central processing units (CPU). When the processor 2401 is one CPU, the CPU may be a single-core CPU or a multi-core CPU.

The processor 2401 is configured to read the program code stored in the memory 2402, to perform operations in any implementation solution corresponding to FIG. 13 to FIG. 20 and various embodiments of the solution.

For example, an embodiment of this application further provides a computer-readable storage medium. The computer-readable storage medium stores an instruction. When the instruction is run on a computer, the computer is enabled to perform operations in any implementation solution corresponding to FIG. 13 to FIG. 20 and various feasible implementations of the implementation solution.

For example, an embodiment of this application further provides a computer program product including an instruction. When the computer program product is run on a computer, the computer is enabled to perform operations in any implementation solution corresponding to FIG. 13 to FIG. 20 and various feasible implementations of the implementation solution.

Figure 25:
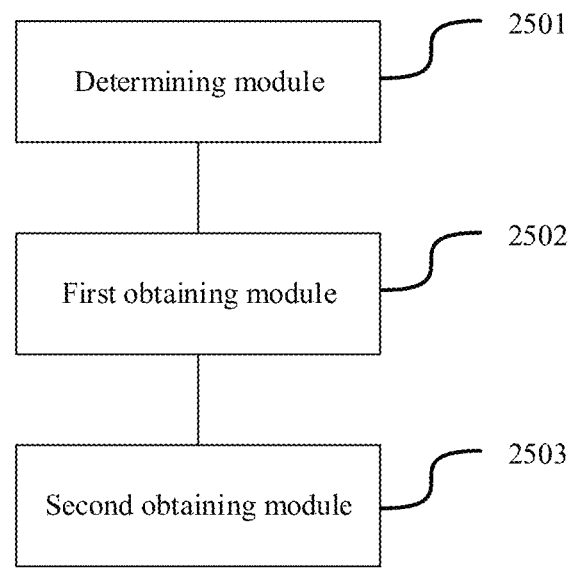
FIG. 25 is a structural diagram of a motion vector obtaining apparatus according to an embodiment of this application.

FIG. 25 shows a motion vector obtaining apparatus according to an embodiment of this application. The apparatus includes a determining module 2501, a first obtaining module 2502, and a second obtaining module 2503.

The determining module 2501 is configured to perform operation 1904.

The first obtaining module 2502 is configured to perform operation 1907.

The second obtaining module 2503 is configured to perform operation 1907.

In an embodiment, that the reference block falls within a preset range includes: a coding tree block CTB in which the reference block is located and a coding tree block in which the to-be-processed picture block is located are located in a same row; and correspondingly, that the reference block falls beyond the preset range includes: the coding tree block in which the reference block is located and the coding tree block in which the to-be-processed picture block is located are located in different rows, referring to operation 1907.

In an embodiment, that the reference block falls within a preset range includes: the reference block and the to-be-processed picture block are located in a same coding tree block; and correspondingly, that the reference block falls beyond the preset range includes: the reference block and the to-be-processed picture block are located in different coding tree blocks, referring to operation 1907.

In an embodiment, that the reference block falls within a preset range includes: a coding tree block in which the reference block is located is the same as a coding tree block in which the to-be-processed picture block is located, or a coding tree block in which the reference block is located is a left neighboring or right neighboring block of a coding tree block in which the to-be-processed picture block is located; and correspondingly, that the reference block falls beyond the preset range includes: the coding tree block in which the reference block is located is not the same as the coding tree block in which the to-be-processed picture block is located, or the coding tree block in which the reference block is located is not a left neighboring or right neighboring block of the coding tree block in which the to-be-processed picture block is located, referring to operation 1907.

Figure 26:
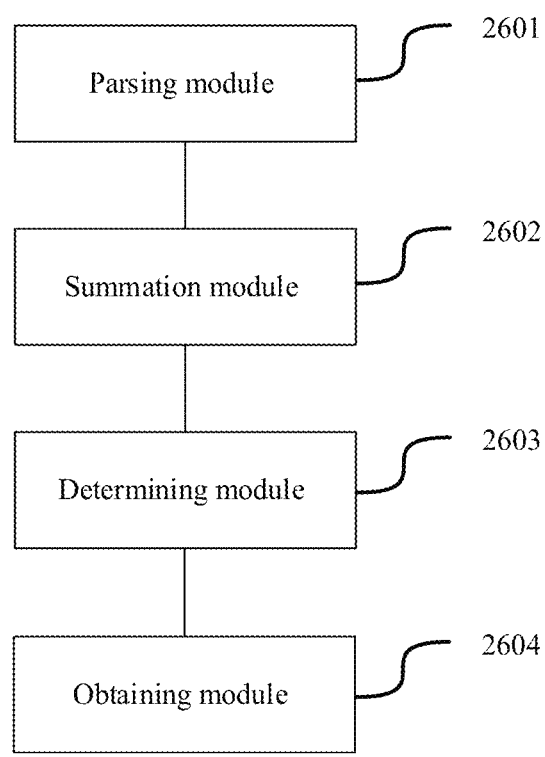
FIG. 26 is a structural diagram of a motion vector residual determining apparatus according to an embodiment of this application.

FIG. 26 shows a motion vector residual determining apparatus according to an embodiment of this application. The apparatus includes a parsing module 2601, a summation module 2602, a determining module 2603, and an obtaining module 2604.

The parsing module 2601 is configured to perform operation 2001.

The summation module 2602 is configured to perform operation 2002.

The determining module 2603 is configured to perform operation 1422.

The obtaining module 2604 is configured to perform operation 2008.

In an embodiment, the apparatus is used for bidirectional inter prediction, the final motion vector includes a first final motion vector and a second final motion vector, and the initial motion vector includes a first initial motion vector and a second initial motion vector; the first final motion vector and the first initial motion vector indicate a motion compensation block based on a first reference frame list of the to-be-processed picture block, and the second final motion vector and the second initial motion vector indicate a motion compensation block based on a second reference frame list of the to-be-processed picture block; and the using a difference between the final motion vector and the initial motion vector as a motion vector residual of the to-be-processed picture block includes:

using a difference between the first final motion vector and the first initial motion vector as a first motion vector residual of the to-be-processed picture block.

Figure 27:
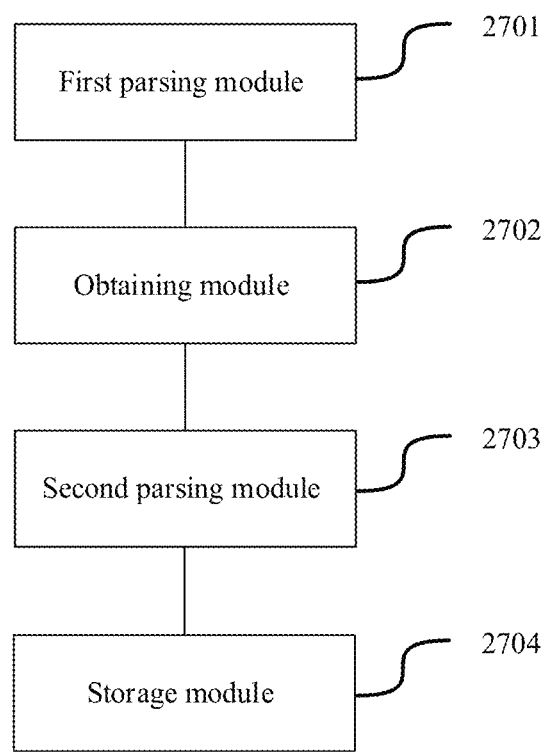
FIG. 27 is a structural diagram of a motion vector data storage apparatus according to an embodiment of this application.

FIG. 27 shows a motion vector data storage apparatus according to an embodiment of this application. The apparatus includes a first parsing module 2701, an obtaining module 2702, a second parsing module 2703, and a storage module 2704.

The first parsing module 2701 is configured to perform operation 2001.

The obtaining module 2702 is configured to perform operation 2007.

The second parsing module 2703 is configured to perform operation 2001.

The storage module 2704 is configured to perform operation 2008.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that such an implementation goes beyond the scope of this application.

It may be clearly understood by a person skilled in the art that for the purpose of convenient and brief description, for detailed working processes of the foregoing system, apparatus, and unit, refer to corresponding processes in the foregoing method embodiments, and details are not described herein again.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instruction is loaded and executed on a computer, all or some of the procedures or functions are generated according to the embodiments of this application. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc), a semiconductor medium (for example, a solid-state drive), or the like.

In the foregoing embodiments, the descriptions in each embodiment have respective focuses. For a part that is not described in detail in an embodiment, refer to related descriptions in other embodiments.

The foregoing description describes merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for determining motion vector residual, comprising:
    obtaining identification information;
    obtaining an initial motion vector of a coding unit of a picture based on the identification information;
    obtaining a plurality of candidate final motion vectors based on the initial motion vector and a plurality of preset offset vectors;
    obtaining a final motion vector from the plurality of candidate final motion vectors, wherein the final motion vector has a minimum distortion cost amongst the plurality of candidate final motion vectors, wherein the distortion cost is calculated by using a sum of absolute differences; and
    calculating a difference between the final motion vector and the initial motion vector, wherein the difference represents a motion vector residual of a picture block to be processed,
    wherein the final motion vector comprises a first forward motion vector and a first backward motion vector, and the initial motion vector comprises a second forward motion vector and a second backward motion vector; the first forward motion vector and the second forward motion vector indicate a motion compensation block based on a first reference frame list of the picture block, the distortion cost of the first forward motion vector is same as that of the first backward motion vector, and the first backward motion vector and the second backward motion vector indicate a motion compensation block based on a second reference frame list of the picture block.

2. The method according to claim 1, wherein the method is applied for an inter prediction mode.

3. An encoder, comprising:
    at least one processor; and
    one or more memories coupled to the at least one processor and storing programming instructions, which when executed by the at least one processor, cause the encoder to:
        obtain identification information;
        obtain an initial motion vector of a coding unit of a picture based on the identification information;
        obtain a plurality of candidate final motion vectors based on the initial motion vector and a plurality of preset offset vectors;
        obtain a final motion vector from the plurality of candidate final motion vectors, wherein the final motion vector has a minimum distortion cost amongst the plurality of candidate final motion vectors, wherein the distortion cost is calculated by using a sum of absolute differences; and
        calculate a difference between the final motion vector and the initial motion vector, wherein the difference represents a motion vector residual of a picture block to be processed,
        wherein the final motion vector comprises a first forward motion vector and a first backward motion vector, and the initial motion vector comprises a second forward motion vector and a second backward motion vector; the first forward motion vector and the second forward motion vector indicate a motion compensation block based on a first reference frame list of the picture block, the distortion cost of the first forward motion vector is same as that of the first backward motion vector, and the first backward motion vector and the second backward motion vector indicate a motion compensation block based on a second reference frame list of the picture block.

4. The encoder according to claim 3, wherein the encoder performs in an inter prediction mode.

5. A coding apparatus, comprising:
    at least one processor;
    a memory for storing a bitstream having identification information, wherein the identification information is used to obtain an initial motion vector of a coding unit; and
    an encoder operatively coupled to the memory and configured by the at least one processor to:
        obtain identification information;
        obtain an initial motion vector of a coding unit of a picture based on the identification information;
        obtain a plurality of candidate final motion vectors based on the initial motion vector and a plurality of preset offset vectors;
        obtain a final motion vector from the plurality of candidate final motion vectors, wherein the final motion vector has a minimum distortion cost amongst the plurality of candidate final motion vectors, wherein the distortion cost is calculated by using a sum of absolute differences; and
        calculate a difference between the final motion vector and the initial motion vector, wherein the difference represents a motion vector residual of a picture block to be processed,
        wherein the final motion vector comprises a first forward motion vector and a first backward motion vector, and the initial motion vector comprises a second forward motion vector and a second backward motion vector; the first forward motion vector and the second forward motion vector indicate a motion compensation block based on a first reference frame list of the picture block, the distortion cost of the first forward motion vector is same as that of the first backward motion vector, and the first backward motion vector and the second backward motion vector indicate a motion compensation block based on a second reference frame list of the picture block.

6. The coding apparatus according to claim 5, wherein the encoder performs in an inter prediction mode.

7. The method according to claim 1,
wherein the calculating a difference between the final motion vector and the initial motion vector comprises:
calculating a difference between the first forward motion vector and the second forward motion vector as a first motion vector residual of the picture block.

8. The method according to claim 7, further comprising:
calculating a difference between the first backward motion vector and the second backward motion vector as a second motion vector residual of the picture block.

9. The method according to claim 7, further comprising:
using the first forward motion vector as the first motion vector residual of the picture block.

10. The method according to claim 9, further comprising:
using the first backward motion vector as a second motion vector residual of the picture block.

11. The encoder according to claim 3,
wherein the calculate a difference between the final motion vector and the initial motion vector comprises:
calculate a difference between the first forward motion vector and the second forward motion vector as a first motion vector residual of the picture block.

12. The encoder according to claim 11, wherein the programming instructions, which when executed by the at least one processor, cause the encoder further to:
calculate a difference between the first backward motion vector and the second backward motion vector as a second motion vector residual of the picture block.

13. The encoder according to claim 11, wherein the programming instructions, which when executed by the at least one processor, cause the encoder further to:
use the first forward motion vector as the first motion vector residual of the picture block.

14. The encoder according to claim 13, wherein the programming instructions, which when executed by the at least one processor, cause the encoder further to:
use the first backward motion vector as a second motion vector residual of the picture block.

15. The coding apparatus according to claim 5,
wherein the calculate a difference between the final motion vector and the initial motion vector comprises:
calculate a difference between the first forward motion vector and the second forward motion vector as a first motion vector residual of the picture block.

16. The coding apparatus according to claim 15, wherein the encoder is configured to:
calculate a difference between the first backward motion vector and the second backward motion vector as a second motion vector residual of the picture block.

17. The coding apparatus according to claim 15, wherein the encoder is configured to:
use the first forward motion vector as the first motion vector residual of the picture block.

18. The coding apparatus according to claim 17, wherein the encoder is configured to:
use the first backward motion vector as a second motion vector residual of the picture block.

* * * * *